(12) United States Patent
Hoff et al.

(10) Patent No.: US 12,172,259 B2
(45) Date of Patent: Dec. 24, 2024

(54) STRAIGHT EDGE GUIDE

(71) Applicant: Kreg Enterprises, Inc., Huxley, IA (US)

(72) Inventors: Elliot Hoff, Ames, IA (US); Paul Eilts, Zearing, IA (US); Christian Ewoldt, Ankeny, IA (US); Kevin Choi, Nevada, IA (US); Stacy Peterson, Ames, IA (US)

(73) Assignee: Kreg Enterprises, Inc., Huxley, IA (US)

( * ) Notice: Subject to any disclaimer, the term of this patent is extended or adjusted under 35 U.S.C. 154(b) by 342 days.

(21) Appl. No.: 17/078,864

(22) Filed: Oct. 23, 2020

(65) Prior Publication Data

US 2021/0121996 A1   Apr. 29, 2021

Related U.S. Application Data

(60) Provisional application No. 62/926,252, filed on Oct. 25, 2019.

(51) Int. Cl.
*B23Q 9/00* (2006.01)
*B23D 47/02* (2006.01)
*B27B 9/04* (2006.01)

(52) U.S. Cl.
CPC .......... *B23Q 9/0042* (2013.01); *B23D 47/02* (2013.01); *B27B 9/04* (2013.01)

(58) Field of Classification Search
CPC ..... Y10T 83/667; Y10T 83/674; Y10T 83/68; B25H 1/0078; B25B 5/085; B25B 5/166; B25B 1/08; B25B 5/02; B25B 1/2489; B25B 5/067; B25B 5/068; F16B 2/12; F16B 2/18; B23Q 9/0042; B23D 47/02; B27B 9/04

See application file for complete search history.

(56) References Cited

U.S. PATENT DOCUMENTS

| | | | |
|---|---|---|---|
| 1,452,753 A * | 4/1923 | Otto ........................ | B25B 5/102 269/189 |
| 2,571,569 A | 10/1951 | Walter | |
| 3,586,077 A | 6/1971 | Pease | |
| 4,056,028 A * | 11/1977 | Patterson ........... | B23Q 17/2233 83/745 |

(Continued)

FOREIGN PATENT DOCUMENTS

| | | | | |
|---|---|---|---|---|
| EP | 0354290 A1 * | 2/1990 | | |
| GB | 2177647 A * | 1/1987 | ............. | B25B 5/102 |

*Primary Examiner* — Jonathan G Riley
(74) *Attorney, Agent, or Firm* — Christopher A. Proskey; BrownWinick Law Firm

(57) ABSTRACT

A straight edge guide system is presented that makes clamping of a workpiece faster and easier. The straight edge guide system includes a guide member that extends a length from a first end to a second end. A clamp member is connected to the first end of the guide member and includes a compressible bias member therein. An adjustable stop member is connected to the guide member that moves between a locked position and a free position. When the adjustable stop member is in the free position, the adjustable stop member slides along the length of the guide member. When the straight edge guide system is placed on top of a workpiece, the workpiece is clamped under spring bias force between the clamp member and the stop member.

34 Claims, 48 Drawing Sheets

(56) References Cited

U.S. PATENT DOCUMENTS

| | | | |
|---|---|---|---|
| 4,078,781 A * | 3/1978 | Fraser | B25B 5/102 |
| | | | 269/171 |
| 4,381,105 A * | 4/1983 | Goff | B25B 5/085 |
| | | | 269/235 |
| 4,522,098 A * | 6/1985 | Bliss | B23Q 9/0042 |
| | | | 30/372 |
| 4,524,662 A * | 6/1985 | Carley | B23Q 9/0042 |
| | | | 269/208 |
| 4,642,898 A | 2/1987 | Miller | |
| 5,182,975 A | 2/1993 | Warner | |
| 5,365,822 A | 11/1994 | Stapleton | |
| 5,390,425 A | 2/1995 | Gilberts | |
| 5,481,810 A | 1/1996 | Hastings | |
| 5,509,338 A | 4/1996 | Ekker | |
| 5,787,599 A | 8/1998 | Clifton | |
| 6,079,309 A * | 6/2000 | Molburg | B23Q 9/0078 |
| | | | 83/745 |
| 6,226,885 B1 | 5/2001 | Korich | |
| 6,393,710 B1 | 5/2002 | Hastings | |
| 6,505,411 B2 | 1/2003 | Gooden | |
| 6,604,296 B2 | 8/2003 | Mastrobattista | |
| 6,880,442 B2 | 4/2005 | Duginske | |
| 7,020,978 B1 | 4/2006 | Nelson | |
| 7,219,440 B2 | 5/2007 | Lewis | |
| 7,464,737 B2 | 12/2008 | Duginske | |
| 7,484,313 B1 | 2/2009 | Ogilvie | |
| 7,798,187 B1 | 9/2010 | Duginske | |
| 8,479,630 B2 | 7/2013 | Osbourne | |
| 8,616,108 B2 | 12/2013 | Lukas | |
| 8,646,368 B1 | 2/2014 | Clark | |
| 9,114,546 B1 | 8/2015 | Francis | |
| 9,593,925 B2 | 3/2017 | Couture | |
| 9,815,177 B2 | 11/2017 | Ursell et al. | |
| 9,975,221 B2 | 5/2018 | Ursell et al. | |
| 10,875,109 B1 | 12/2020 | Gibson et al. | |
| 11,052,565 B2 | 7/2021 | Strempke et al. | |
| 11,168,965 B2 | 11/2021 | Strempke et al. | |
| 11,325,215 B1 | 5/2022 | Clark | |
| 11,383,312 B2 | 7/2022 | Gibson et al. | |
| 11,701,721 B2 | 7/2023 | Gibson et al. | |
| 2003/0037453 A1 | 2/2003 | Mastrobattista | |
| 2004/0172846 A1 | 9/2004 | McRae | |
| 2005/0016349 A1 * | 1/2005 | Molburg | B27B 9/04 |
| | | | 83/745 |
| 2005/0172776 A1 | 8/2005 | Beleski | |
| 2006/0196072 A1 | 9/2006 | Lewis | |
| 2007/0003364 A1 * | 1/2007 | Hubbard | B25B 5/068 |
| | | | 403/344 |
| 2008/0289206 A1 | 11/2008 | Mastrobattista | |
| 2009/0308218 A1 | 12/2009 | Raff | |
| 2011/0083540 A1 | 4/2011 | Xing | |
| 2012/0079931 A1 | 4/2012 | Hansen | |
| 2013/0247738 A1 | 9/2013 | Stoffel | |
| 2015/0283679 A1 * | 10/2015 | Ursell | B25B 5/085 |
| | | | 269/147 |
| 2015/0283680 A1 * | 10/2015 | Ursell | B25B 1/2489 |
| | | | 269/149 |
| 2018/0180394 A1 | 6/2018 | Ursell | |
| 2021/0121996 A1 | 4/2021 | Hoff et al. | |
| 2021/0122080 A1 | 4/2021 | Eilts et al. | |
| 2021/0146570 A1 | 5/2021 | Miller et al. | |
| 2021/0283797 A1 | 9/2021 | Strempke et al. | |

* cited by examiner

STRAIGHT EDGE GUIDE

CROSS REFERENCE TO RELATED APPLICATION

This application claims the benefit of U.S. Provisional Application No. 62/926,252 filed on Oct. 25, 2019, the entirety of which is incorporated herein fully by reference.

FIELD OF THE DISCLOSURE

This disclosure relates generally to wood working. More particularly, and without limitation, this disclosure relates to cutting sheet material workpieces with a straight edge guide.

OVERVIEW OF THE DISCLOSURE

A number of systems and devices have been developed for cutting wood and other materials. Common types of cutting systems include: band saws, circular saws, miter saws and table saws. Each of these saw configurations have their own unique benefits as well as their own unique disadvantages and drawbacks.

Band saws are formed of a rotating saw blade that is formed in the shape of a band or continuous loop. This blade is relatively narrow and therefore band saws are tremendously well suited for cutting intricate shapes or features in both large and small pieces of material. While effective in many applications, band saws suffer from many disadvantages.

Namely, band saws are not well suited for making long straight cuts due to the narrow configuration of the blade. In addition, due to the large blade, band saws are generally large in stature which makes them stationary, and not portable, tools limited to use within the confines of a workshop. In addition, band saw blades are generally expensive. Also, band saws generally have a slow through-put. Another disadvantage of band saws is that the blade can be easily moved by grains in the wood due to the flexible nature and narrow width of the blade, which adds inaccuracy to straight cuts. For these reasons, band saws are not well suited or desirable for many cutting operations or many users.

Table saws are generally formed of a rotating blade that that sticks upward from a table top surface. Table saws are generally well suited for making straight cuts in pieces of plank material. While table saws can be used with great precision to make straight cuts, table saws suffer from many disadvantages.

Namely, due to the rotating blade sticking up from the table top surface, table saws have a generally sinister appearance and therefore many users are scared or intimidated by table saws. While some of the bad reputation table saws have is partially fiction, it is true that the exposed blade is very dangerous, especially when used by the novice user. Another disadvantage of table saws is that due to the fact that the blade protrudes from a table-top-like surface, table saws are relatively large, heavy, complicated and expensive devices. Due to their large size, table saws cannot be used in many settings or are not convenient for use in many applications such as on a jobsite as they are not very mobile or easy to set up on-site. Instead, table saws, like band saws, are generally reserved for use within the confines of a workshop. Yet another disadvantage of table saws is that they have a tendency to kick-back material during cutting.

A kick back occurs when a piece of material binds between the rotating blade and a guide surface or when a workpiece begins to twist or rotate while being cut. This often results in the blade pushing, kicking or throwing the workpiece back toward the user, sometimes in a catastrophic manner. Obviously, this can be a very dangerous situation, not to mention a very scary one.

Another disadvantage of table saws is that they can be very difficult to use when cutting large sheets of material because the entire piece of material must be moved, not to mention moved in a manner that prevents binding and kick-back. If the piece of material is not precisely moved it can bind on the blade and kick back. Yet another disadvantage of table saws is that they require a lot of skill and experience to fully utilize the table saw in a safe manner. For these reasons, table saws are not well suited or desirable for many cutting operations or many users.

Circular saws are generally formed of a handheld motor connected to a rotating blade. Circular saws are relatively inexpensive, and unlike table saws, circular saws generally have a blade cover that at least tries to protect the user from the blade when not in use. This blade cover provides at least the appearance of safety which makes many users much more comfortable using a circular saw as opposed to a table saw. Also, due to their small size, circular saws are relatively easy to move and operate. In addition, circular saws are easy to transport and therefore circular saws are well suited for job-site use and are not constrained to use only within a workshop.

While circular saws have many advantages, they also have many disadvantages. Namely, due to their small size it is hard to accurately make cuts. In addition, it is difficult to make a long and straight cut with circular saws. Another disadvantage to circular saws is that the cuts are often not clean and precise, especially at the start of a cut. For these and other reasons, despite their advantages, circular saws suffer from many substantial disadvantages and limitations.

Miter saws are generally formed of a rotating saw blade that vertically pivots on a hinge and plunges toward a base and into and through a workpiece placed on the base. Miter saws are particularly well suited to make perpendicular cuts in smaller width workpieces that may be anywhere from extremely long to extremely short. Miter saws also angularly pivot so as to facilitate a wide range of angular cuts. Miter saws can be used to make highly precise and repeatable cuts. Miter saws are relatively inexpensive, and unlike table saws, miter saws generally have a blade cover that at least tries to protect the user from the blade. Miter saws are relatively portable.

While miter saws have many advantages, they also have many disadvantages. Namely, miter saws cannot be used for cutting through wide and/or thick workpieces. In addition, it is difficult to see exactly where a cut is going to be made on a workpiece prior to making the cut, which leads to inaccurate cuts as well as delay in making the cuts. That is, there is no easily perceptible indication where the cut is going to be made on the workpiece prior to actually performing the cut. For these and other reasons, despite their advantages, miter saws suffer from many substantial disadvantages and limitations.

As such, the prior art cutting systems suffer from many substantial disadvantages including being: unsafe, inaccurate, large, expensive, hard to use, they have limited accuracy, they are hard to guide, and they form low quality cuts, among many other disadvantages.

Therefore, for all the reasons stated above, and the reasons stated below, there is a need in the art for an improved straight edge guide that provides functionalities and capabilities never before present in a system.

Thus, it is a primary object of the disclosure to provide a straight edge guide system that improves upon the state of the art.

Another object of the disclosure is to provide a straight edge guide system that is safe to use.

Yet another object of the disclosure is to provide a straight edge guide system that is efficient to use.

Another object of the disclosure is to provide a straight edge guide system that is relatively inexpensive.

Yet another object of the disclosure is to provide a straight edge guide system that is capable of making long straight cuts.

Another object of the disclosure is to a straight edge guide system that is accurate.

Yet, another object of the disclosure is to provide a straight edge guide system that is efficient to use.

Another object of the disclosure is to provide a straight edge guide system that provides precise alignment for a cutting tool.

Yet another object of the disclosure is to provide a straight edge guide system that can be used with workpieces with a wide range of thicknesses.

Another object of the disclosure is to provide a straight edge guide system that can be used with workpieces with a wide range of lengths.

Yet another object of the disclosure is to provide a straight edge guide system that can be used with workpieces with a wide range of widths.

Another object of the disclosure is to provide a straight edge guide system that is unique.

Yet another object of the disclosure is to provide a straight edge guide system that is easy to learn how to use.

Another object of the disclosure is to provide a straight edge guide system that is relatively small in size and shape.

Yet another object of the disclosure is to provide a straight edge guide system that provides the benefits of a circular saw and a table saw in a single device.

Another object of the disclosure is to provide a straight edge guide system that holds workpieces in a firm and rigid manner.

Yet another object of the disclosure is to provide a straight edge guide system that is easy to set up.

Another object of the disclosure is to provide a straight edge guide system that is easy to take down.

Yet another object of the disclosure is to provide a straight edge guide system that is easy to precisely adjust.

Another object of the disclosure is to provide a straight edge guide system that can be precisely matched to the blade of a cutting tool.

Yet another object of the disclosure is to provide a straight edge guide system that is formed of a minimum number of parts.

Another object of the disclosure is to provide a straight edge guide system that is simple to use.

Yet another object of the disclosure is to provide a straight edge guide system that is easier to use than prior art systems.

Another object of the disclosure is to provide a straight edge guide system that is more-accurate to use than prior art systems.

Yet another object of the disclosure is to provide a straight edge guide system that provides new capabilities to existing tools.

Another object of the disclosure is to provide a straight edge guide system that has a robust design.

Yet another object of the disclosure is to provide a straight edge guide system that is high quality.

Another object of the disclosure is to provide a straight edge guide system that is durable.

Yet another object of the disclosure is to provide a straight edge guide system that has a long useful life.

Another object of the disclosure is to provide a straight edge guide system that provides accurate and clean cuts.

Yet another object of the disclosure is to provide a straight edge guide system that saves time.

Another object of the disclosure is to provide a straight edge guide system that is fun to use.

Yet another object of the disclosure is to provide a straight edge guide system that can be used with workpieces of practically any material.

Another object of the disclosure is to provide a straight edge guide system that is easily portable and can be used on a job site.

Yet another object of the disclosure is to provide a straight edge guide system that makes it easier to measure cuts.

Another object of the disclosure is to provide a straight edge guide system that makes measuring more repeatable than prior art systems.

Yet another object of the disclosure is to provide a straight edge guide system that can be used with practically any cutting tool.

These and other objects, features, or advantages of the disclosure will become apparent from the specification, figures and claims.

SUMMARY OF THE DISCLOSURE

A straight edge guide system is presented that makes clamping of a workpiece faster and easier. The straight edge guide system includes a guide member that extends a length from a first end to a second end. A clamp member is connected to the first end of the guide member and includes a compressible bias member therein. An adjustable stop member is connected to the guide member that moves between a locked position and a free position. When the adjustable stop member is in the free position, the adjustable stop member slides along the length of the guide member. When the straight edge guide system is placed on top of a workpiece, the workpiece is clamped under spring bias force between the clamp member and the stop member.

DETAILED DESCRIPTION

Figure 1:
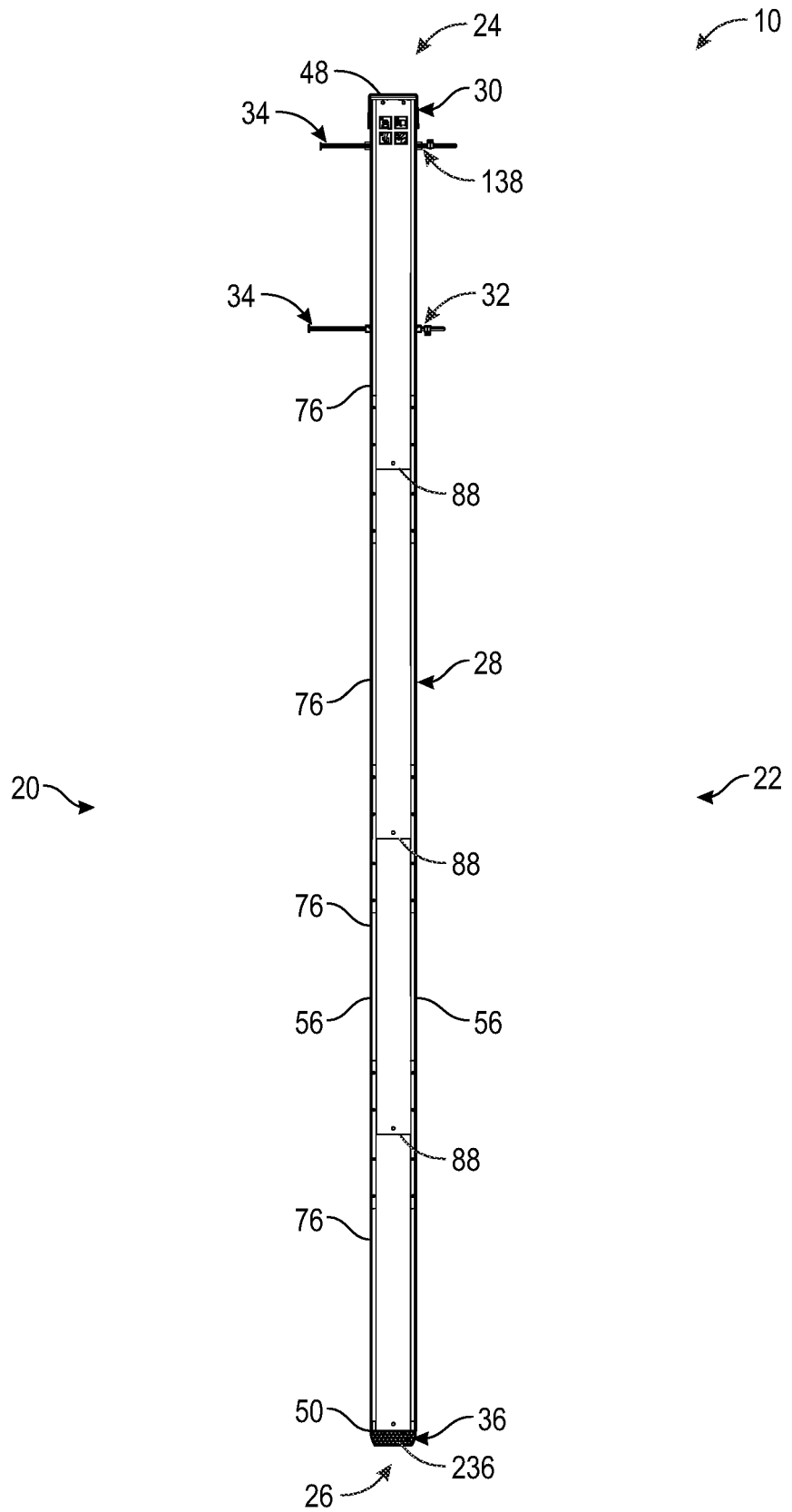
FIG. 1 shows a top view of a straight edge guide system, in accordance with one or more embodiments.
Figure 2:
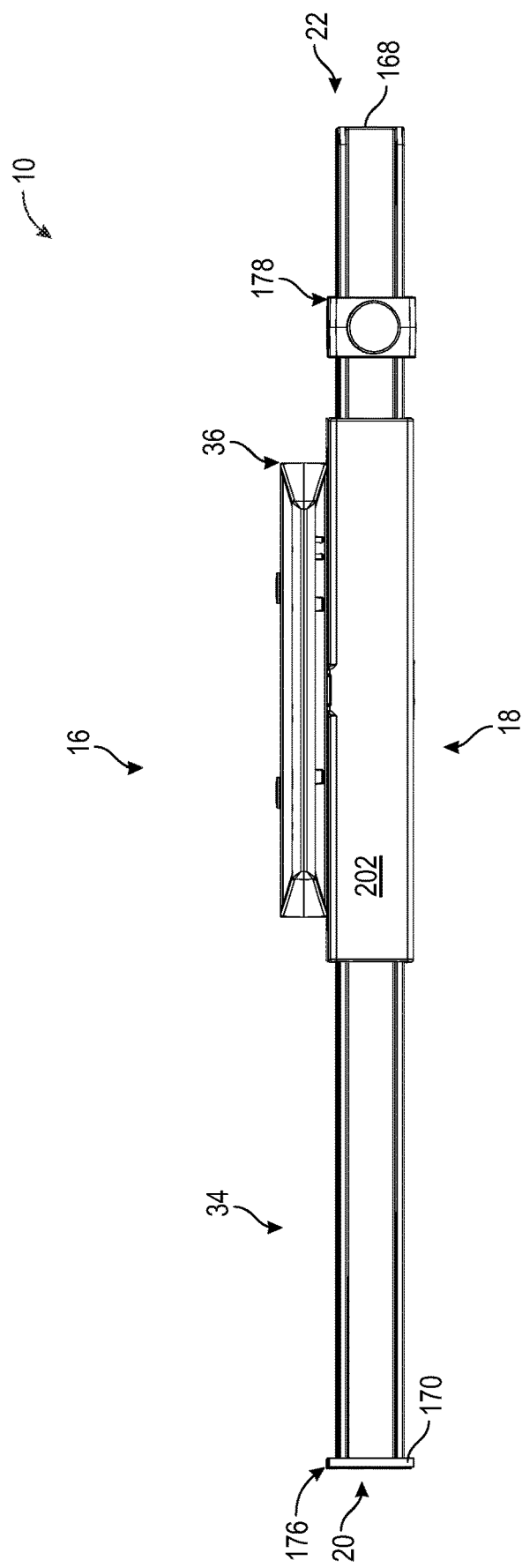
FIG. 2 shows a rear view of a straight edge guide system, in accordance with one or more embodiments.
Figure 3:
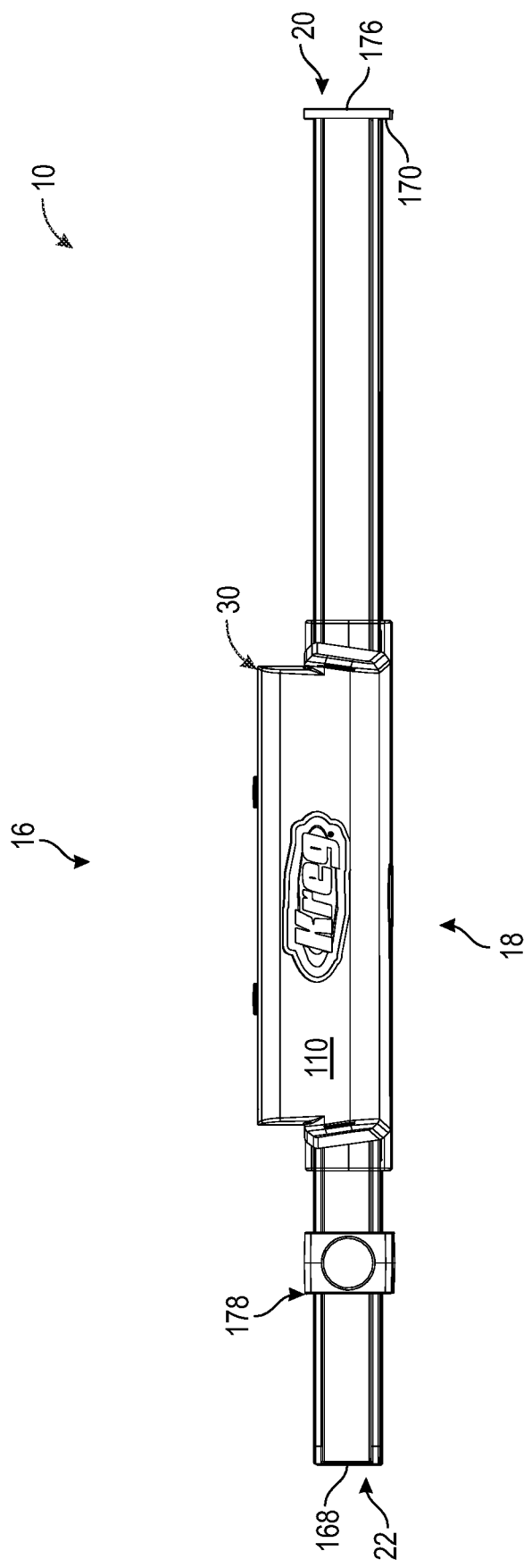
FIG. 3 shows a front view of a straight edge guide system, in accordance with one or more embodiments.
Figure 4:
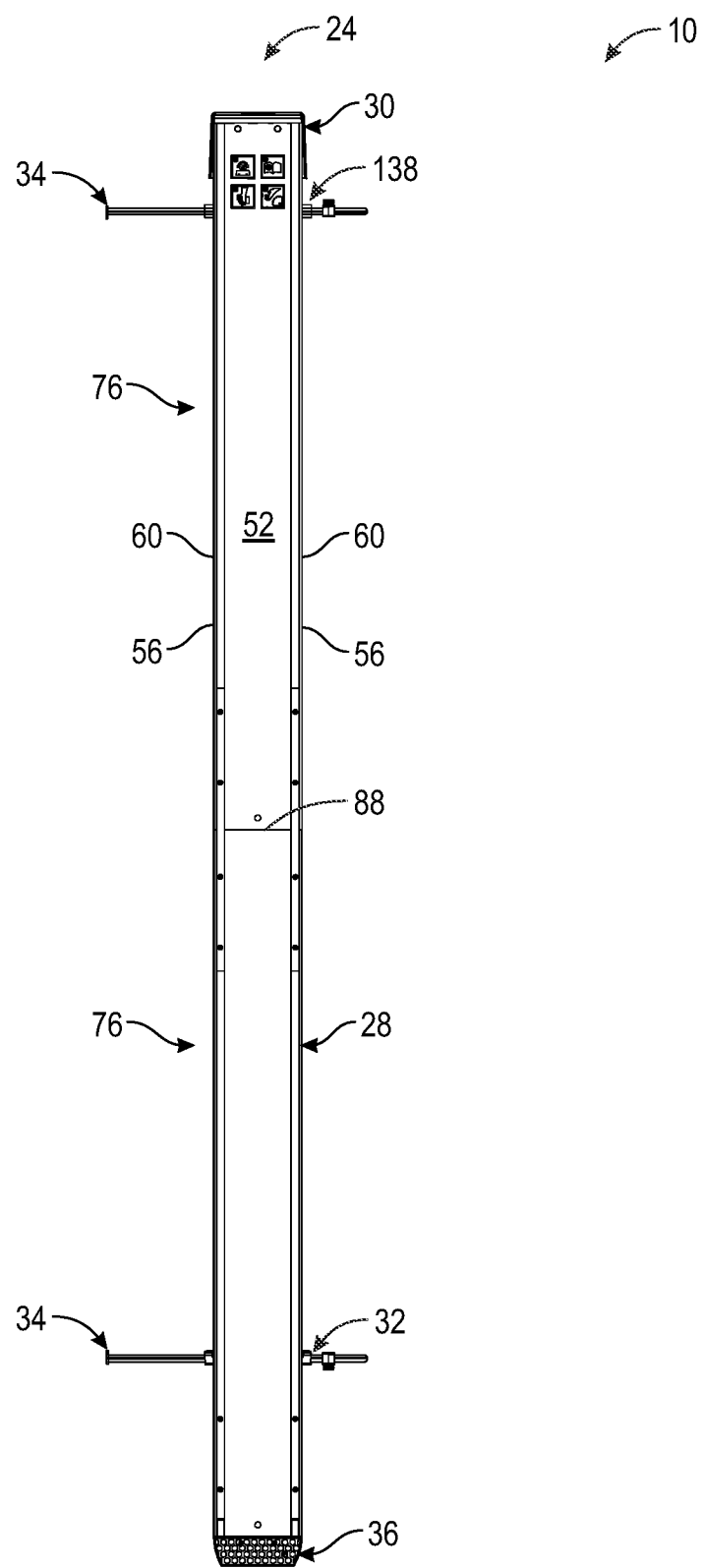
FIG. 4 shows a top view of a straight edge guide system, in accordance with one or more embodiments.
Figure 5:
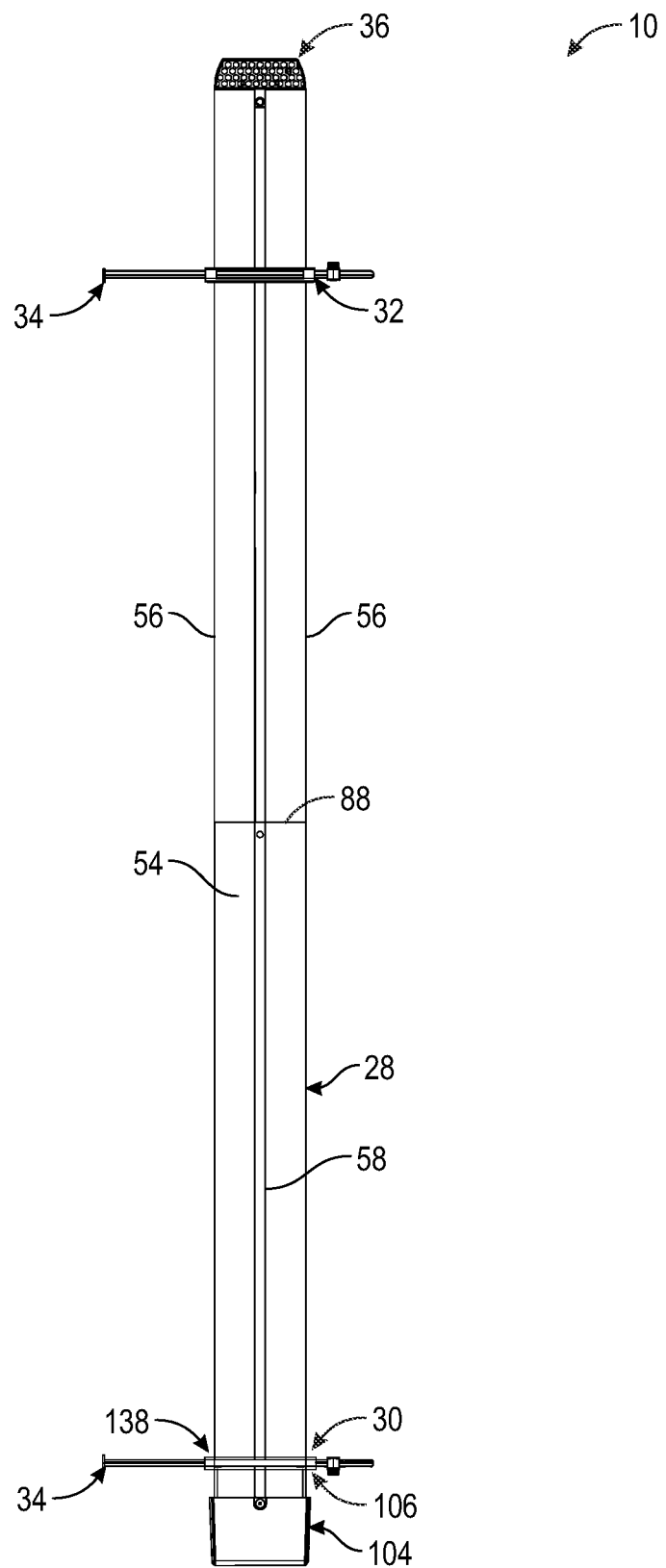
FIG. 5 shows a bottom view of a straight edge guide system, in accordance with one or more embodiments.
Figure 6:
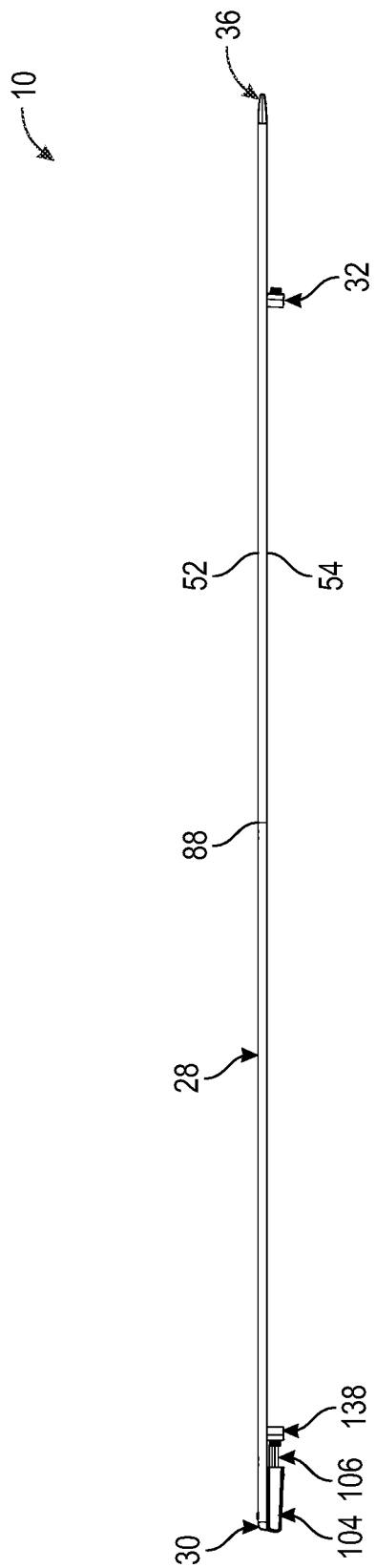
FIG. 6 shows a right side view of a straight edge guide system, in accordance with one or more embodiments.
Figure 7:
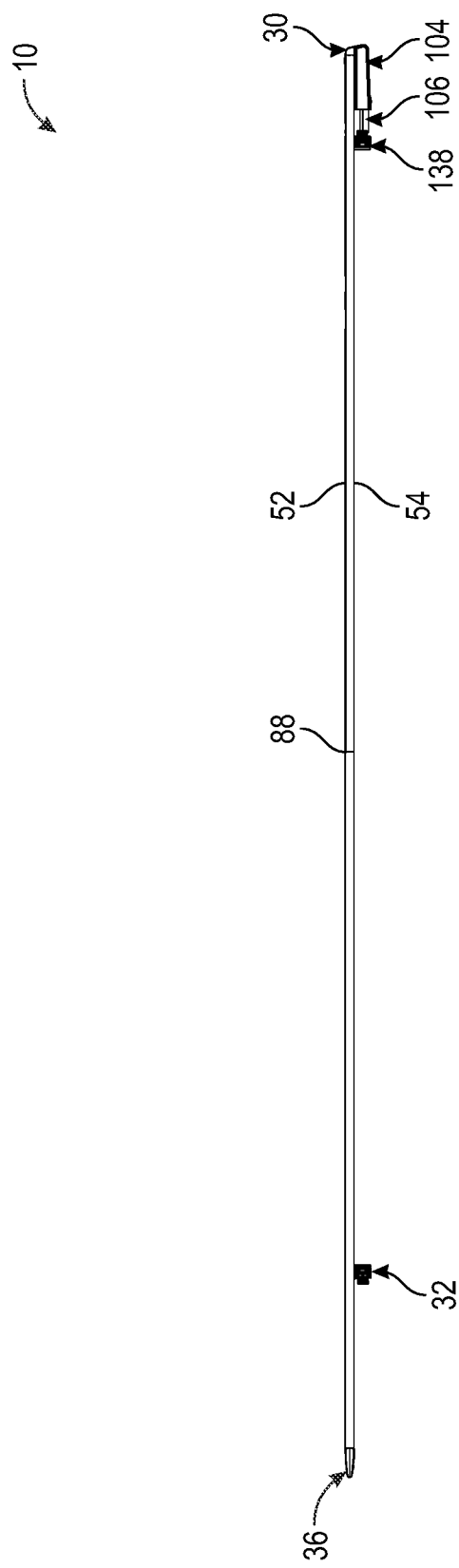
FIG. 7 shows a left side view of a straight edge guide system, in accordance with one or more embodiments.
Figure 8:
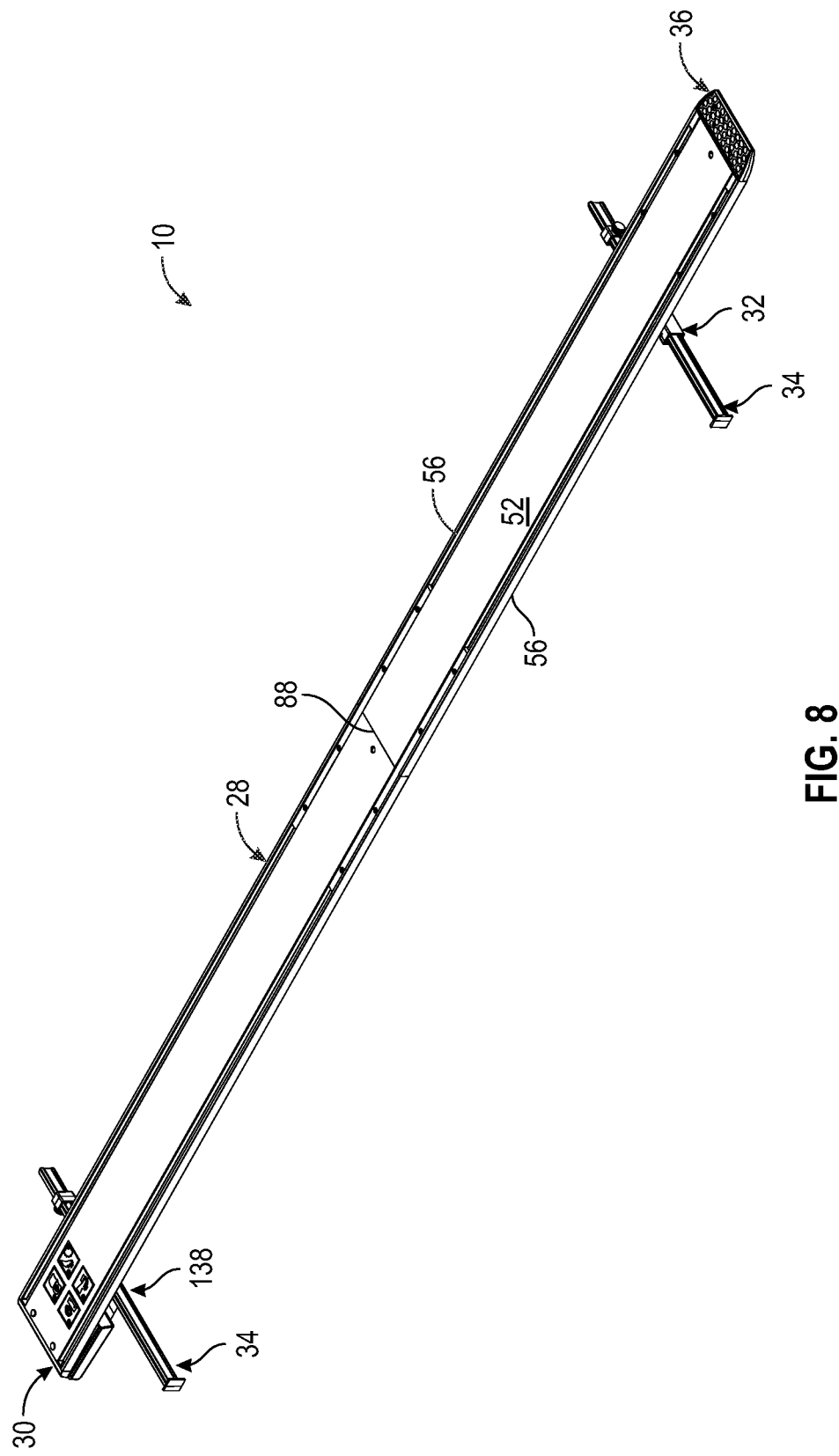
FIG. 8 shows an upper front right perspective view of a straight edge guide system, in accordance with one or more embodiments.
Figure 9:
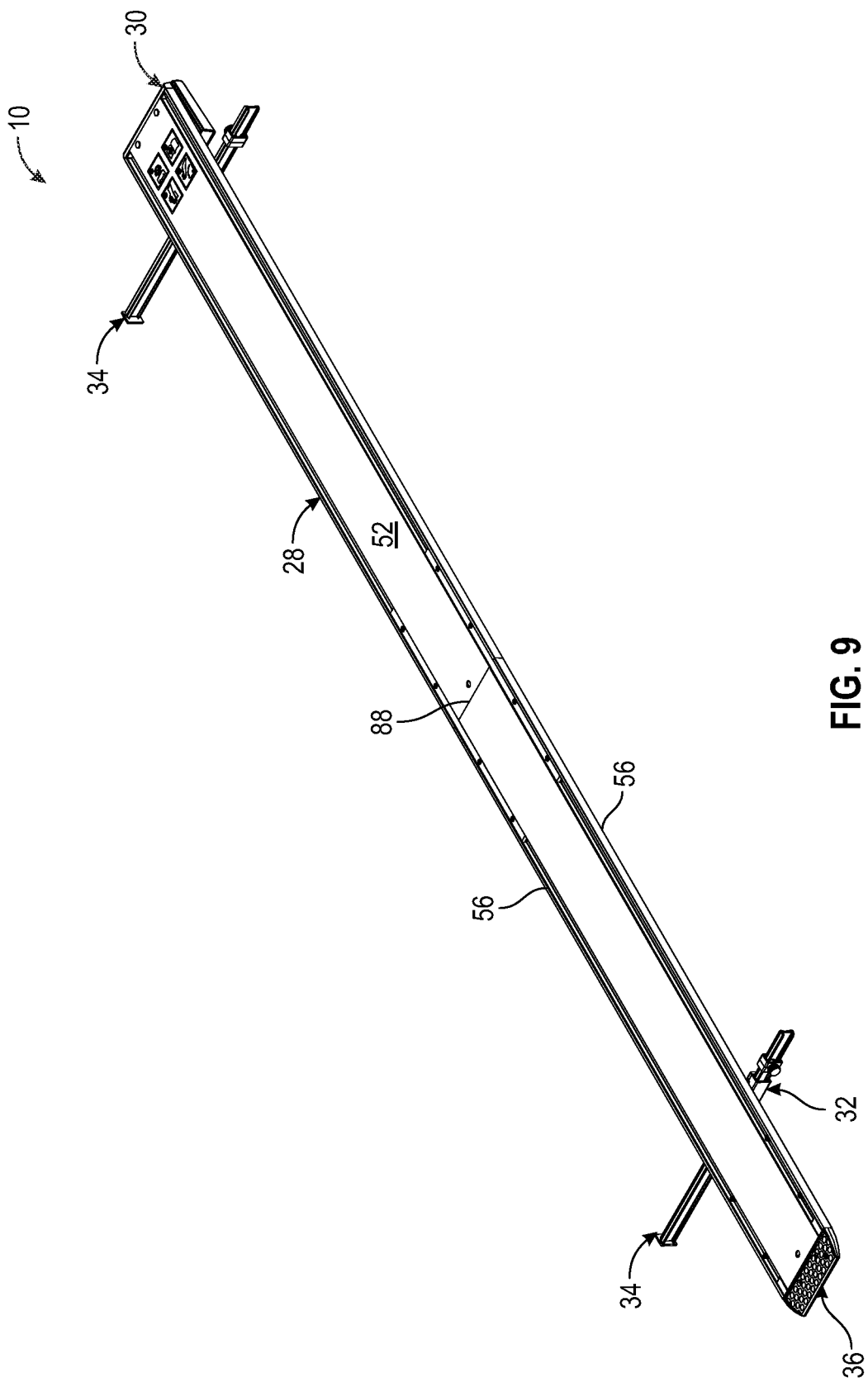
FIG. 9 shows an upper front left perspective view of a straight edge guide system, in accordance with one or more embodiments.
Figure 10:
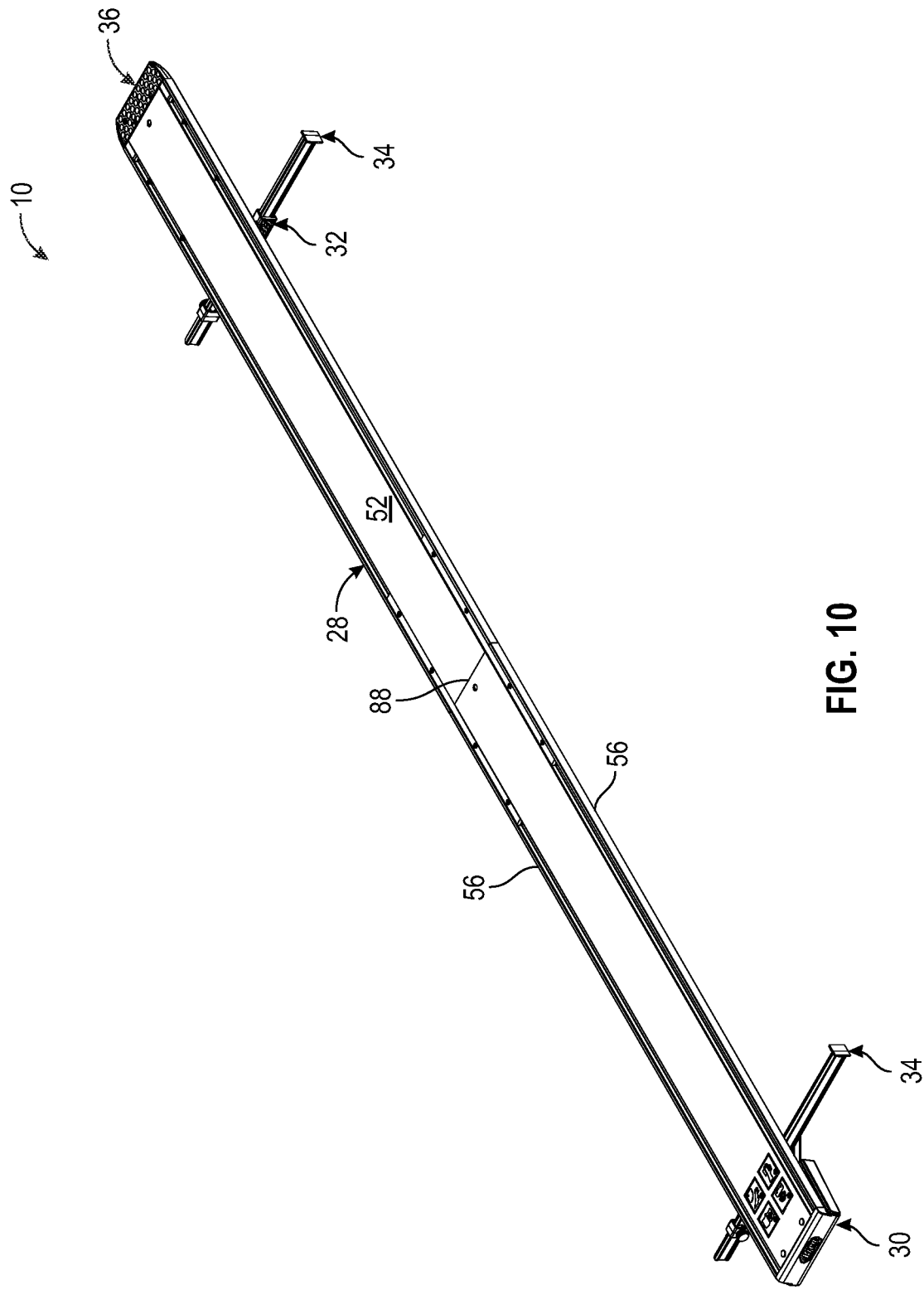
FIG. 10 shows an upper rear right perspective view of a straight edge guide system, in accordance with one or more embodiments.
Figure 11:
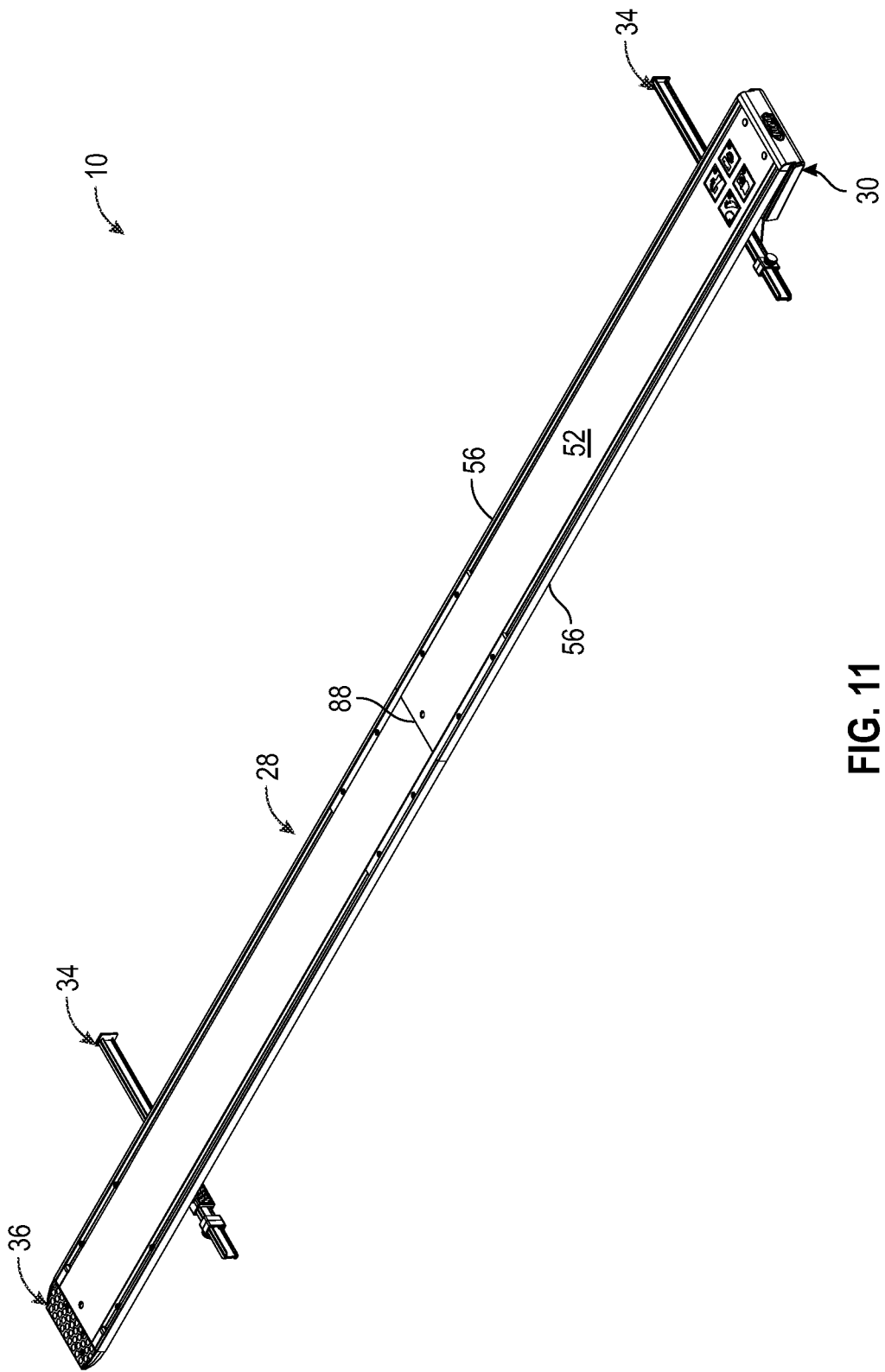
FIG. 11 shows an upper rear left perspective view of a straight edge guide system, in accordance with one or more embodiments.
Figure 12:
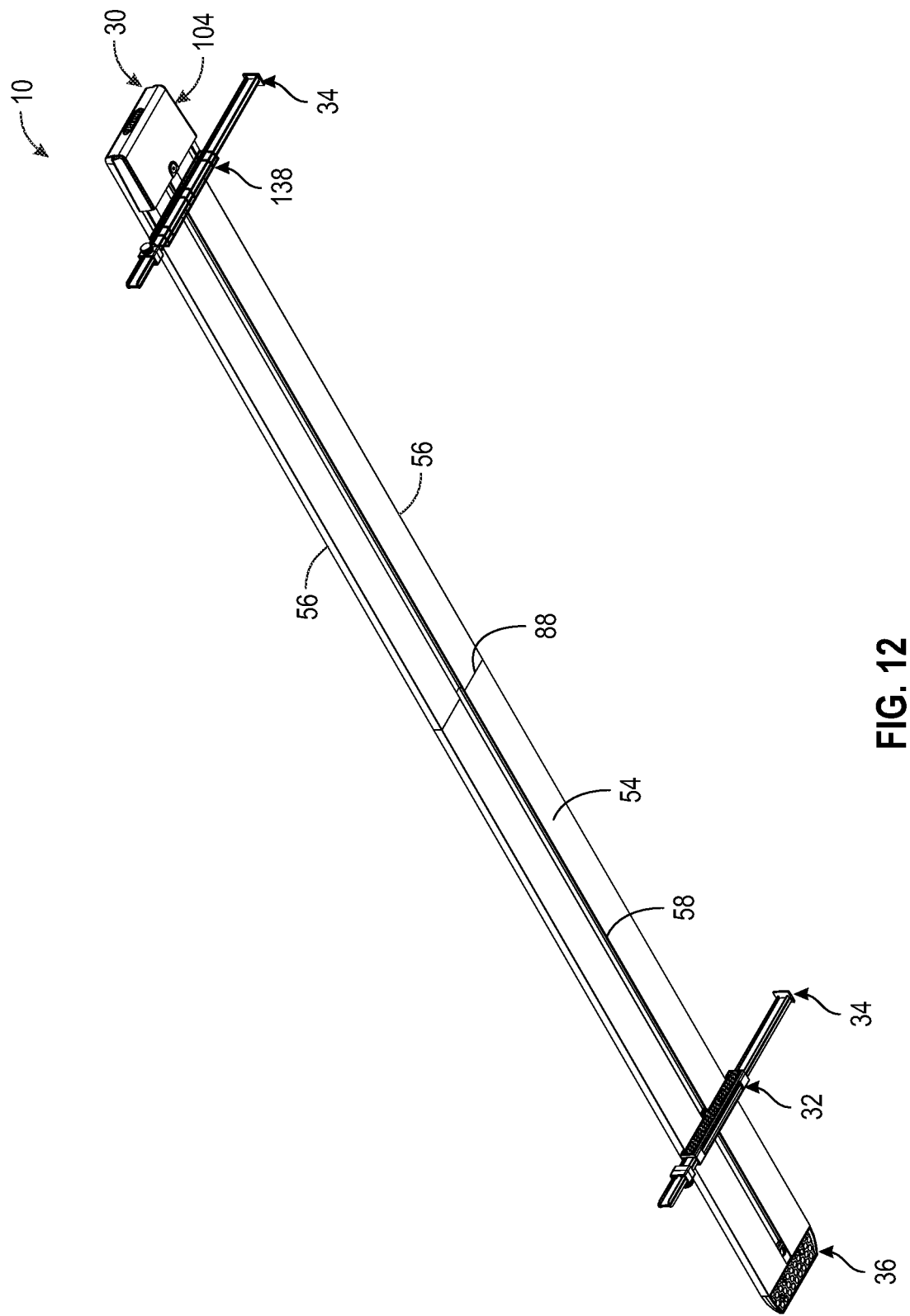
FIG. 12 shows a lower rear left perspective view of a straight edge guide system, in accordance with one or more embodiments.
Figure 13:
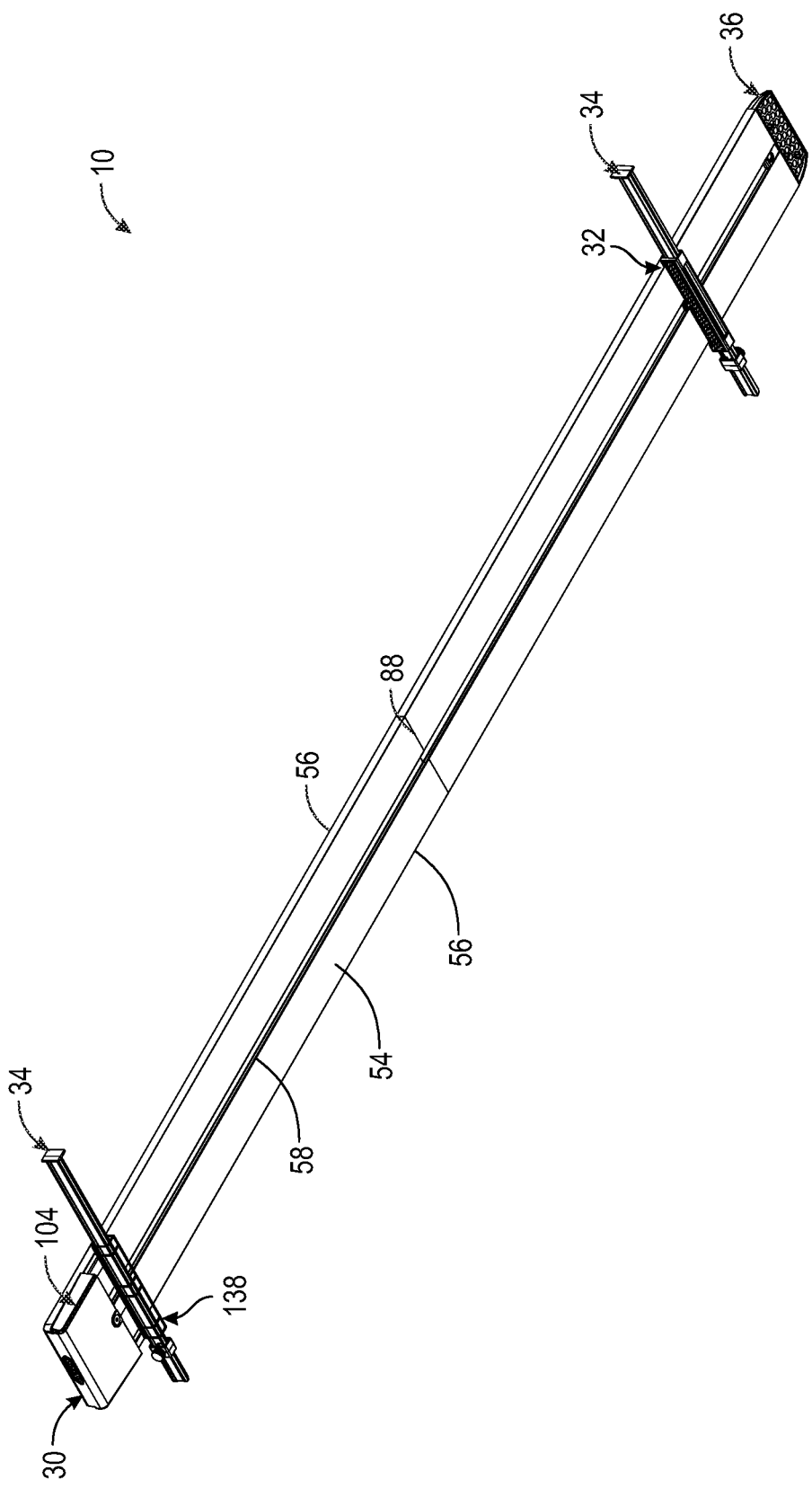
FIG. 13 shows a lower rear right perspective view of a straight edge guide system, in accordance with one or more embodiments.
Figure 14:
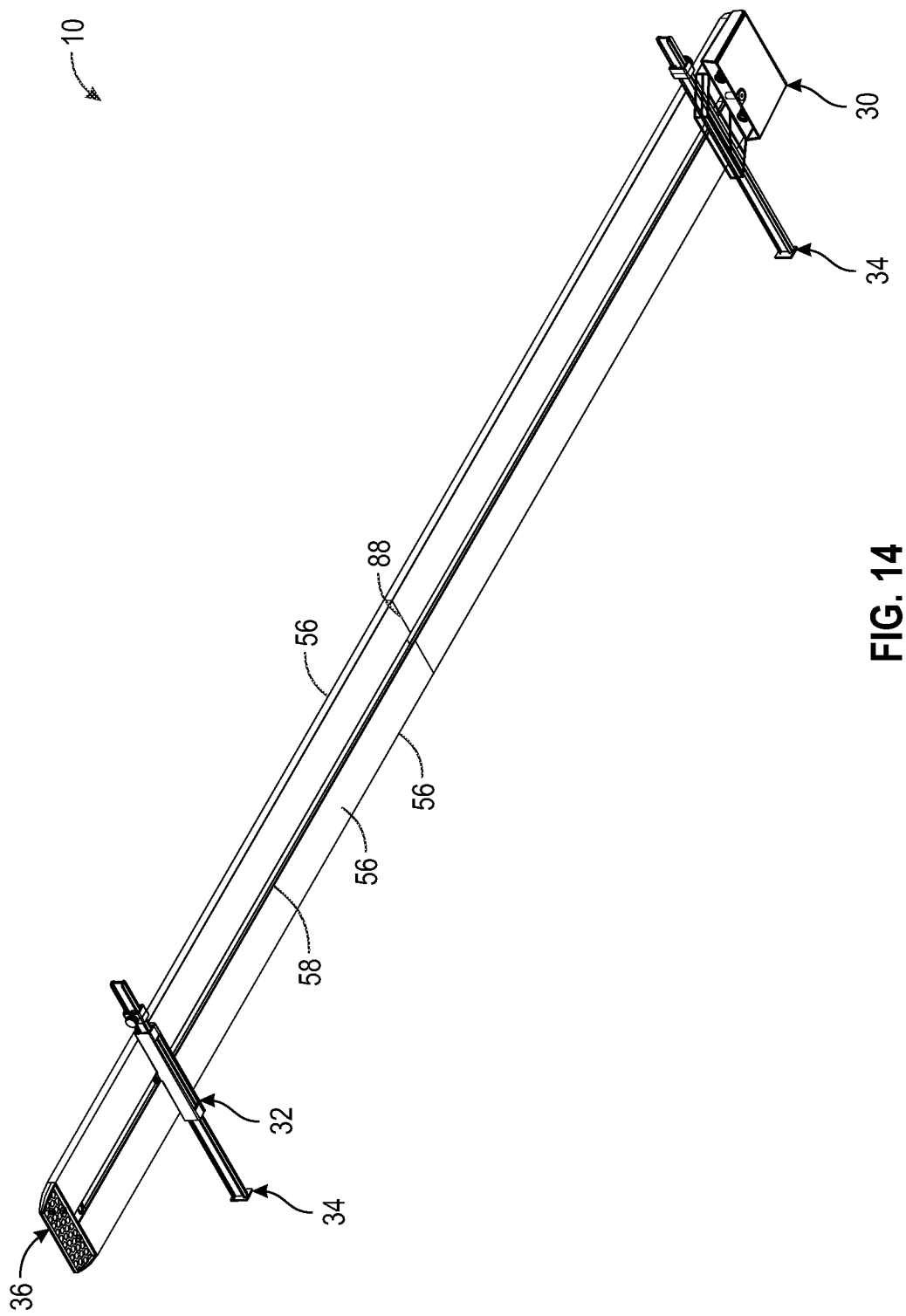
FIG. 14 shows a lower front left perspective view of a straight edge guide system, in accordance with one or more embodiments.
Figure 15:
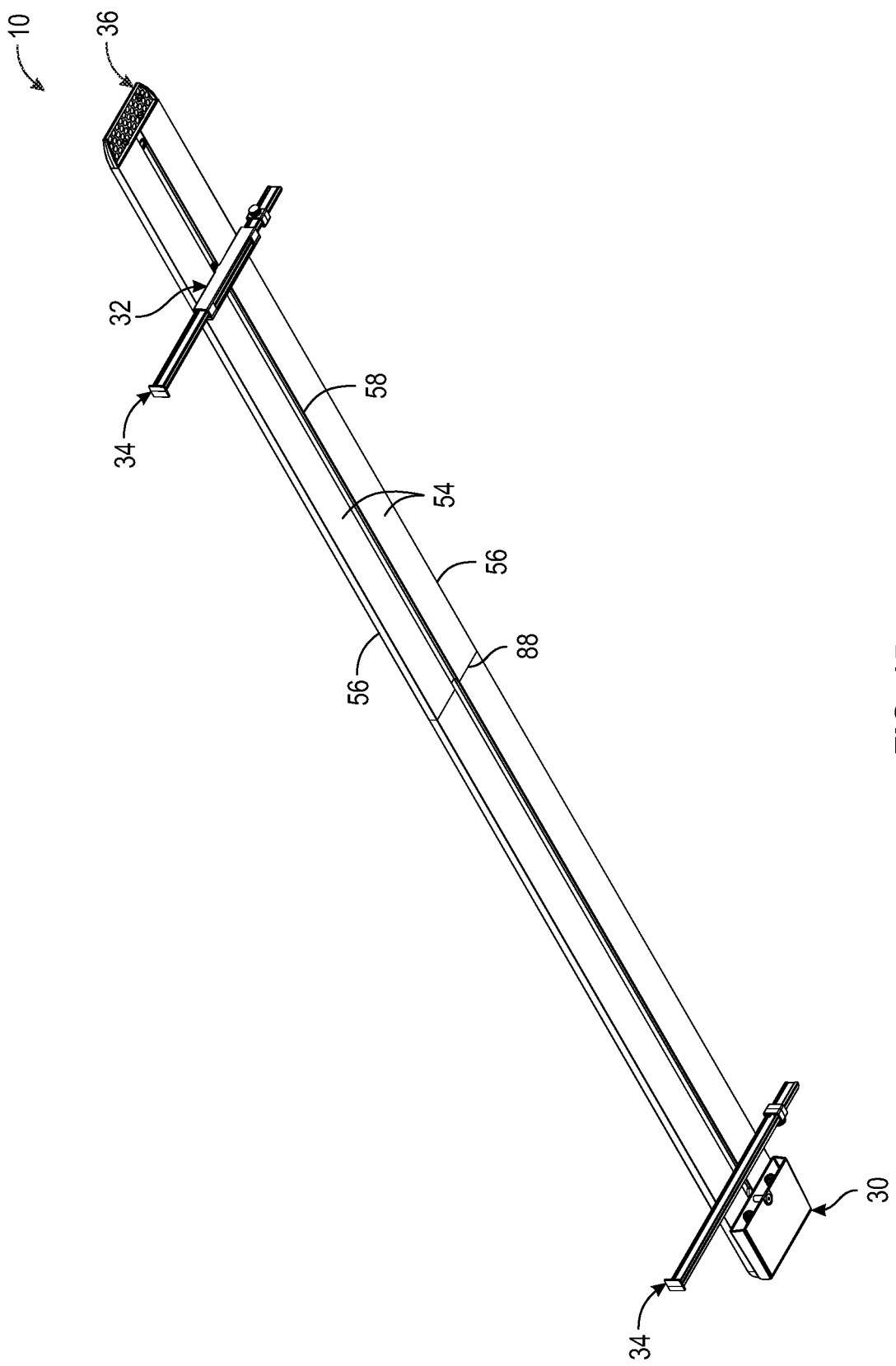
FIG. 15 shows a lower front right perspective view of a straight edge guide system, in accordance with one or more embodiments.
Figure 16:
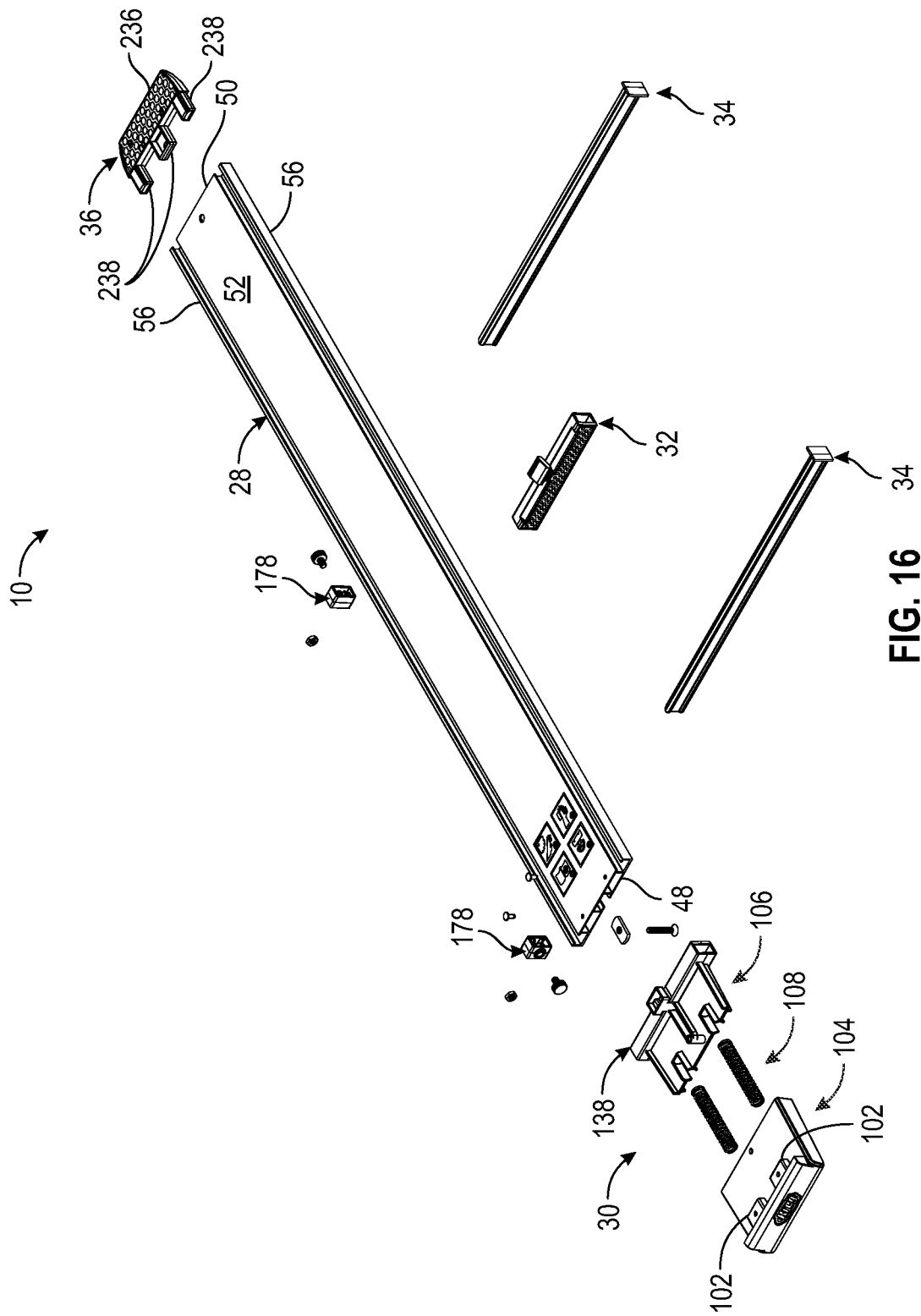
FIG. 16 shows an exploded upper rear right perspective view of a straight edge guide system, in accordance with one or more embodiments.
Figure 17:
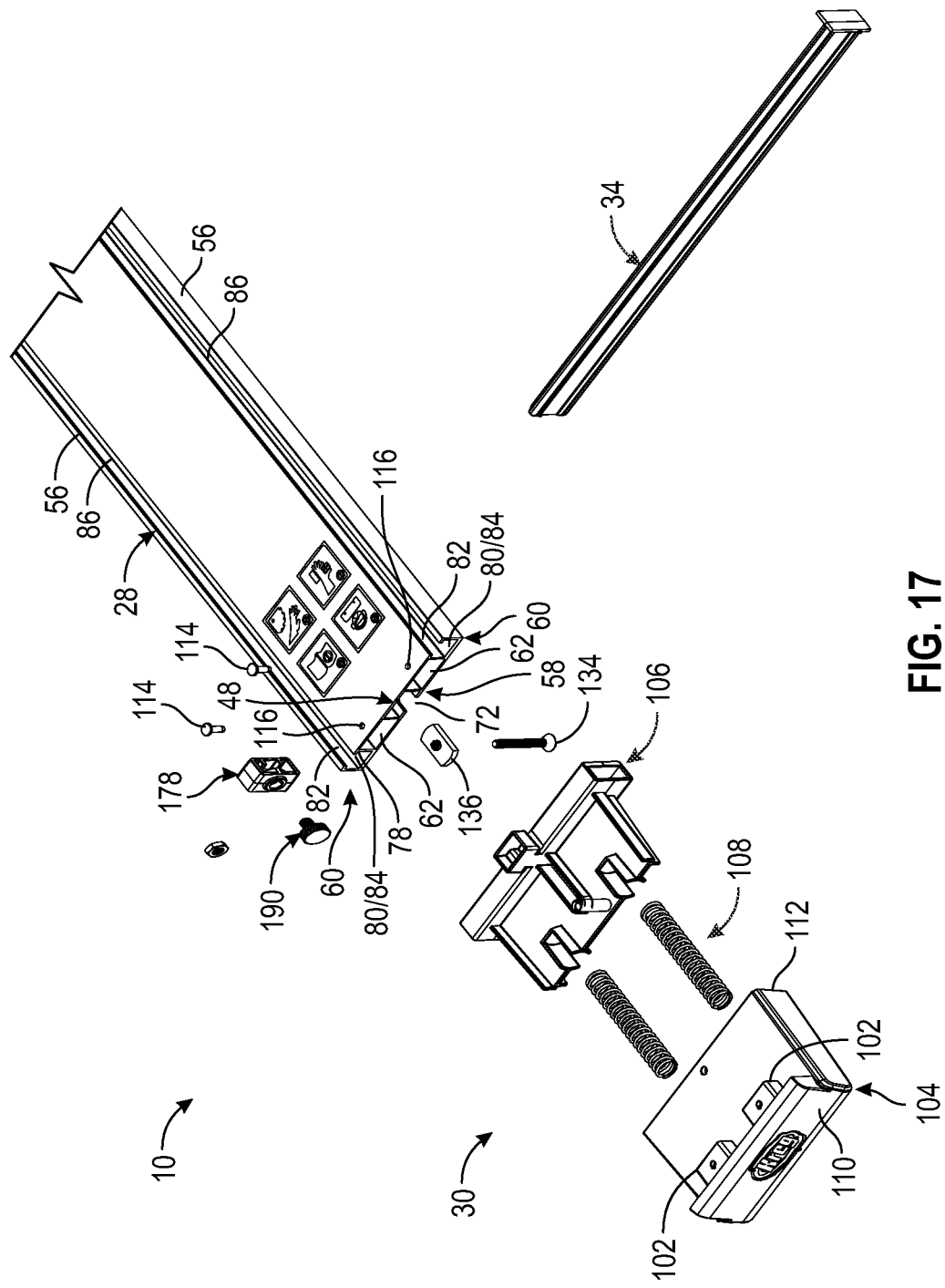
FIG. 17 shows a close up of the exploded upper rear right perspective view of the straight edge guide system shown in FIG. 16, in accordance with one or more embodiments; the view showing a close up of the rear of the of the straight edge guide system.
Figure 18:
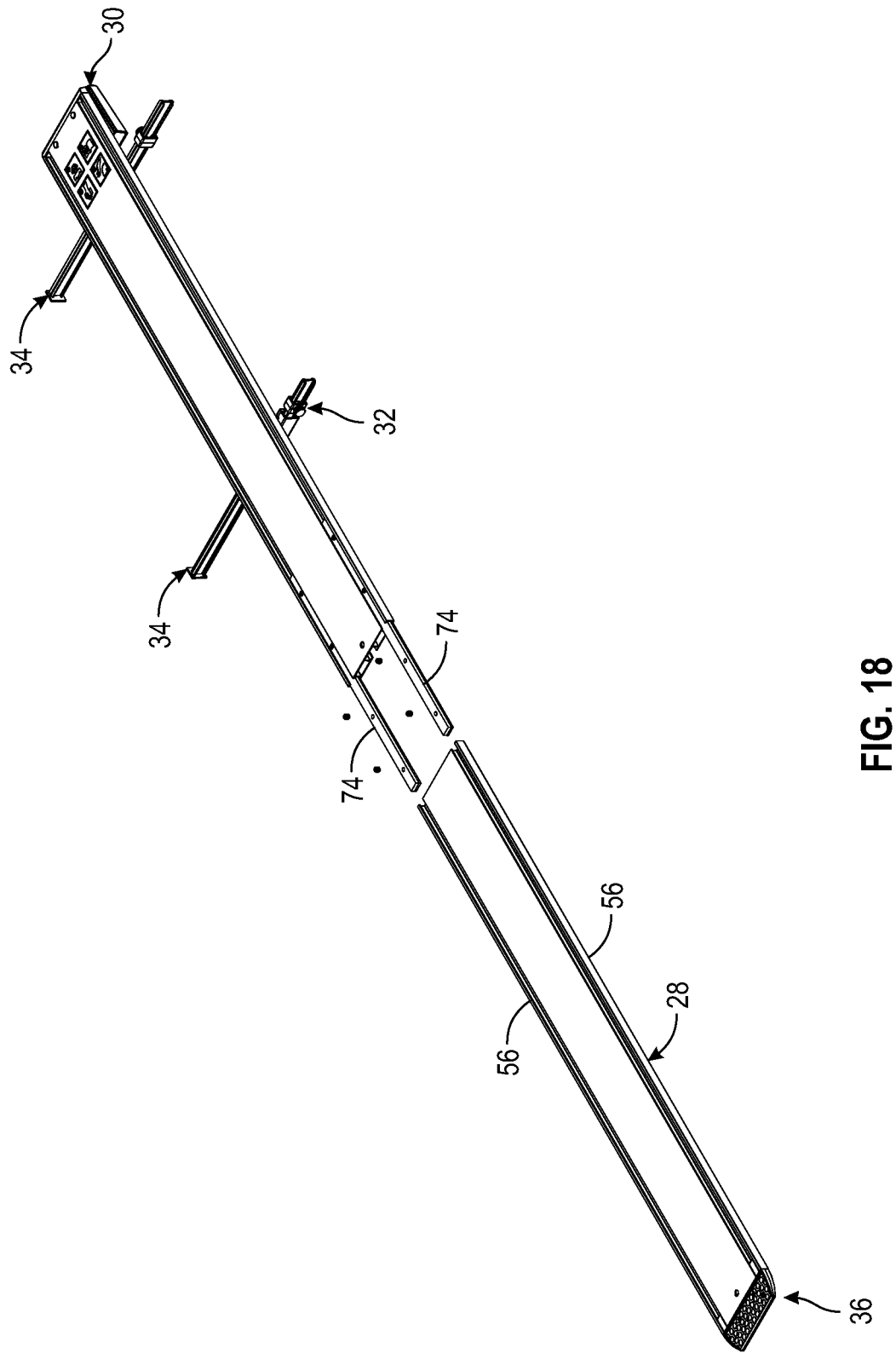
FIG. 18 shows a partially exploded upper rear right perspective view of a straight edge guide system, in accordance with one or more embodiments; the view showing sections of guide member and connection members disconnected.
Figure 19:
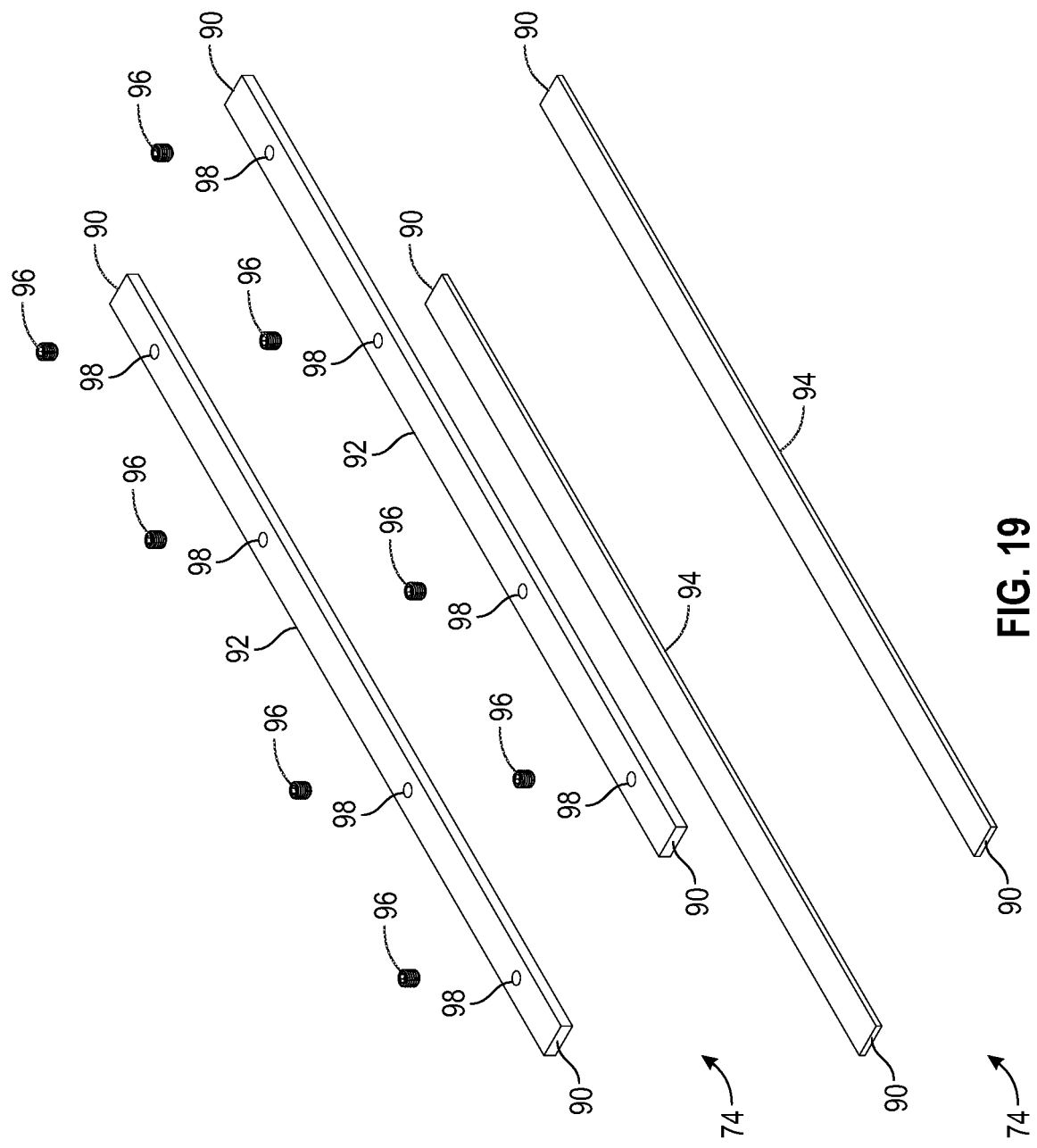
FIG. 19 shows exploded upper rear right perspective view of track connectors a straight edge guide system, in accordance with one or more embodiments; the view showing sections of guide member and connection members disconnected.
Figure 20:
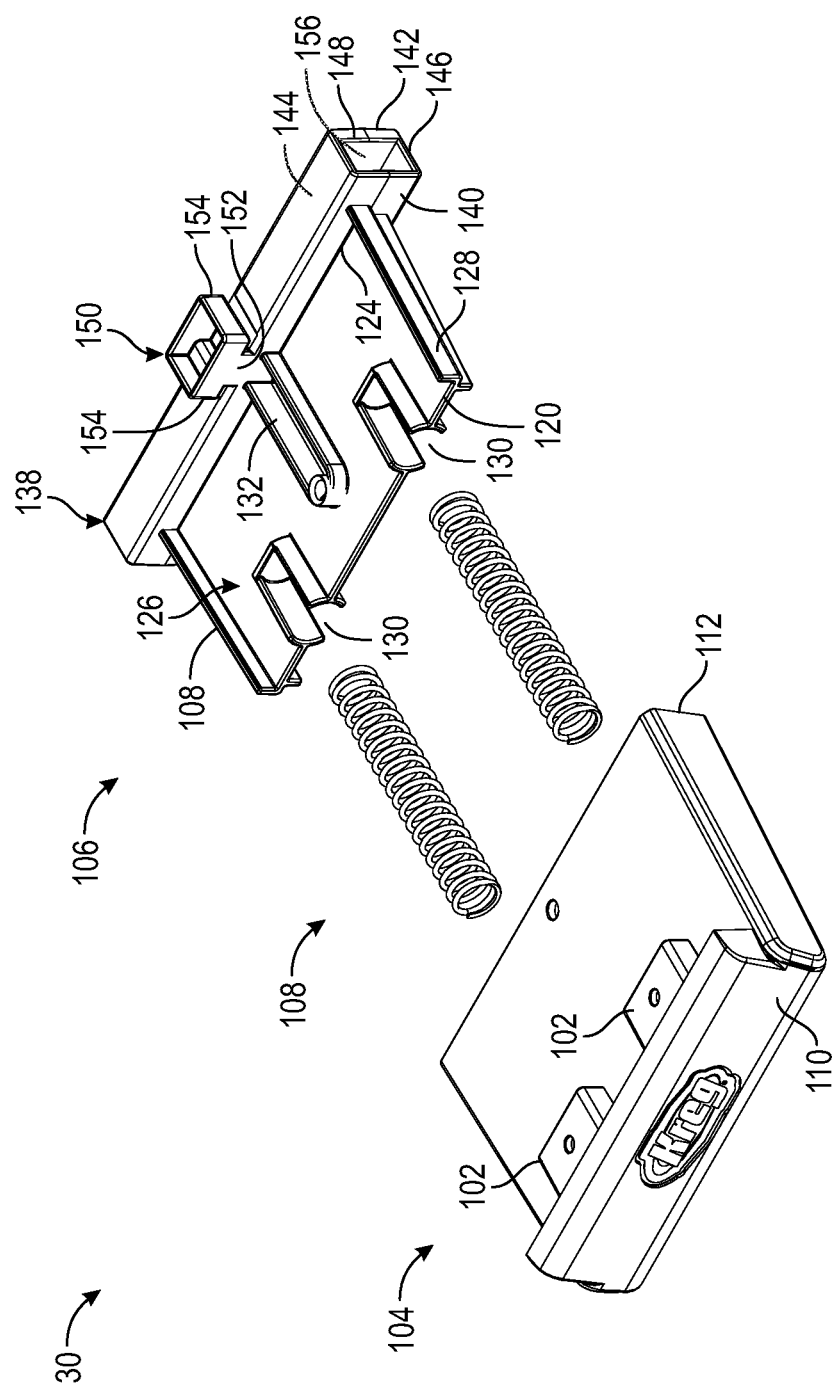
FIG. 20 shows an exploded upper rear right perspective view of a clamp member of a straight edge guide system, in accordance with one or more embodiments.
Figure 21:
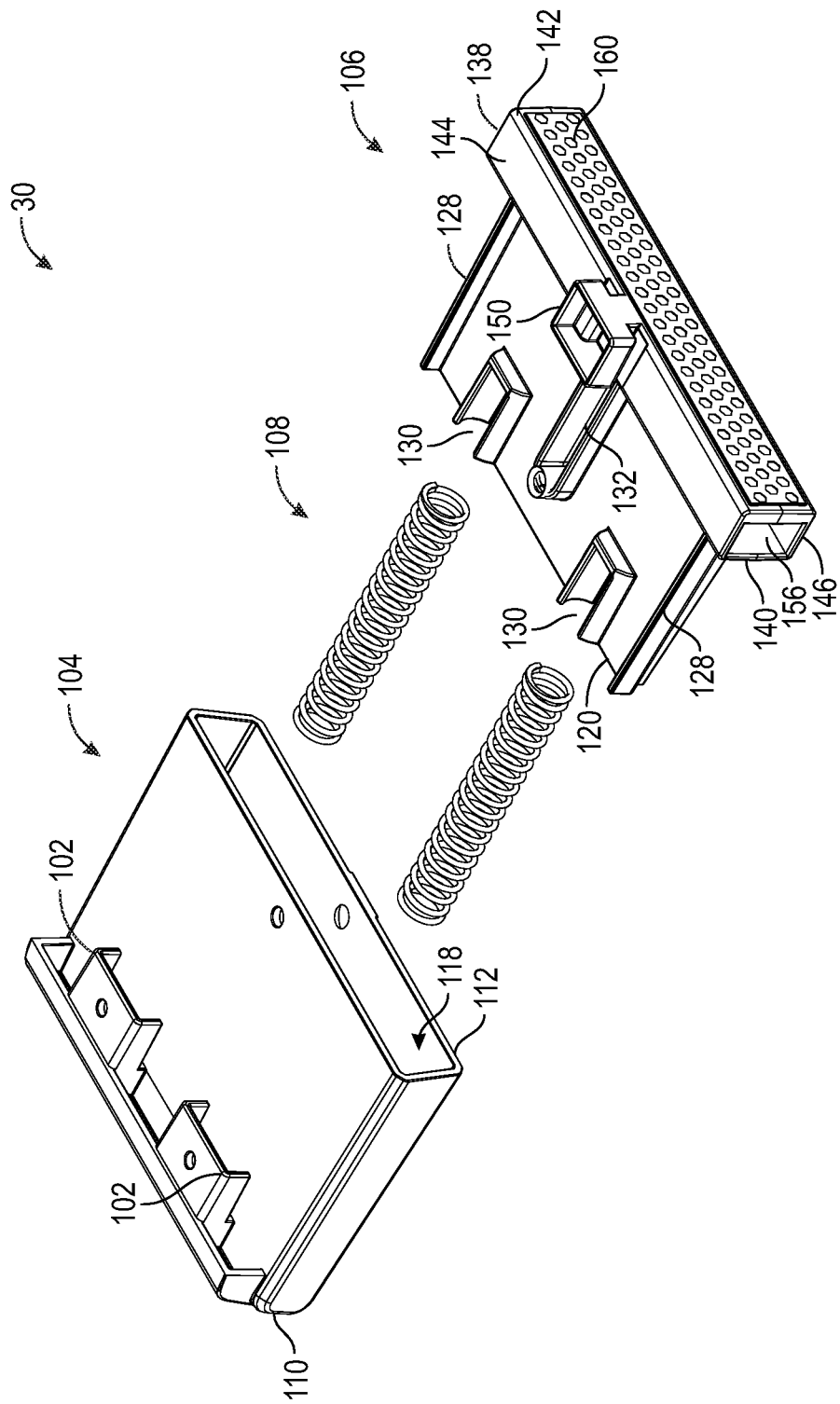
FIG. 21 shows an exploded upper front right perspective view of a clamp member of a straight edge guide system, in accordance with one or more embodiments.
Figure 22:
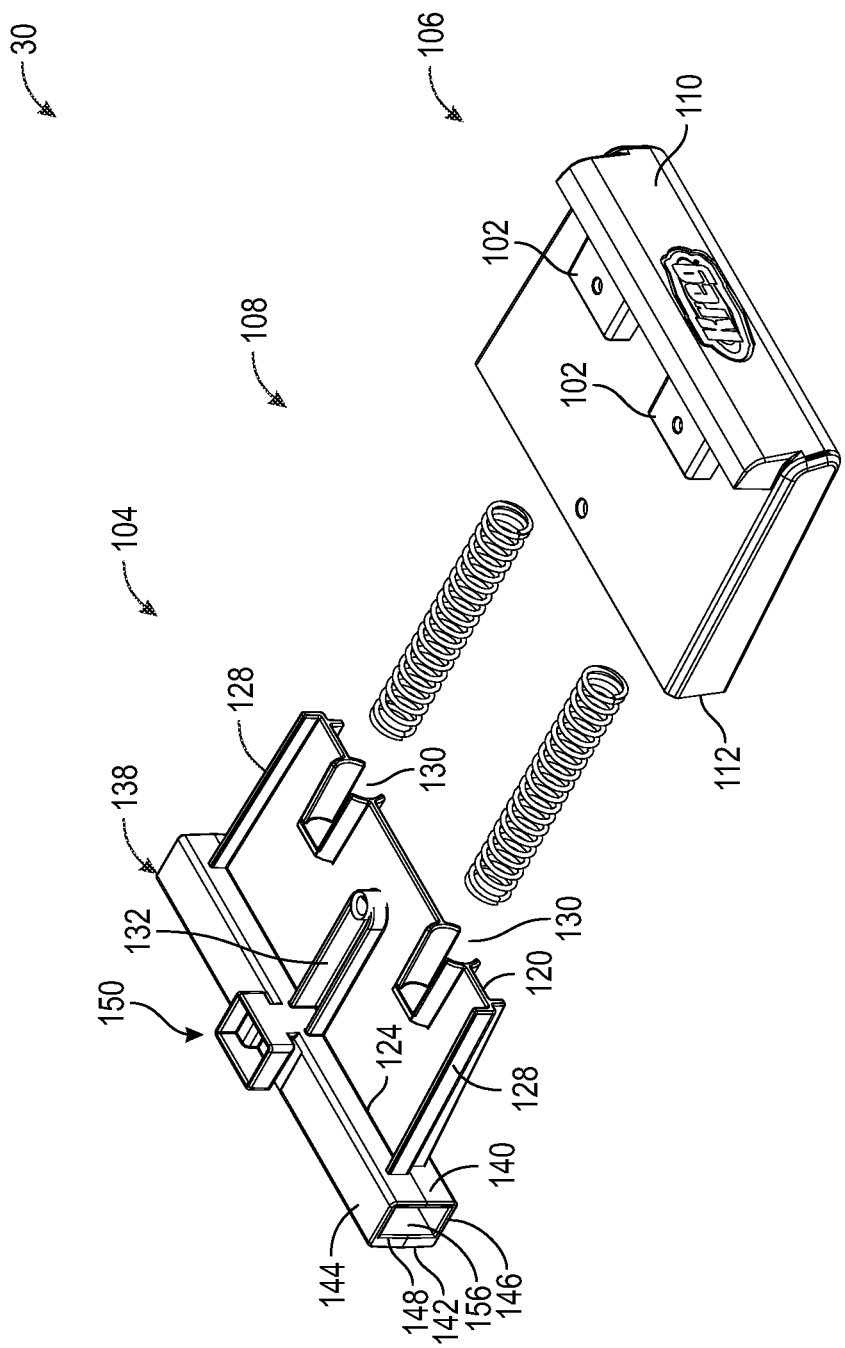
FIG. 22 shows an exploded upper rear left perspective view of a clamp member of a straight edge guide system, in accordance with one or more embodiments.
Figure 23:
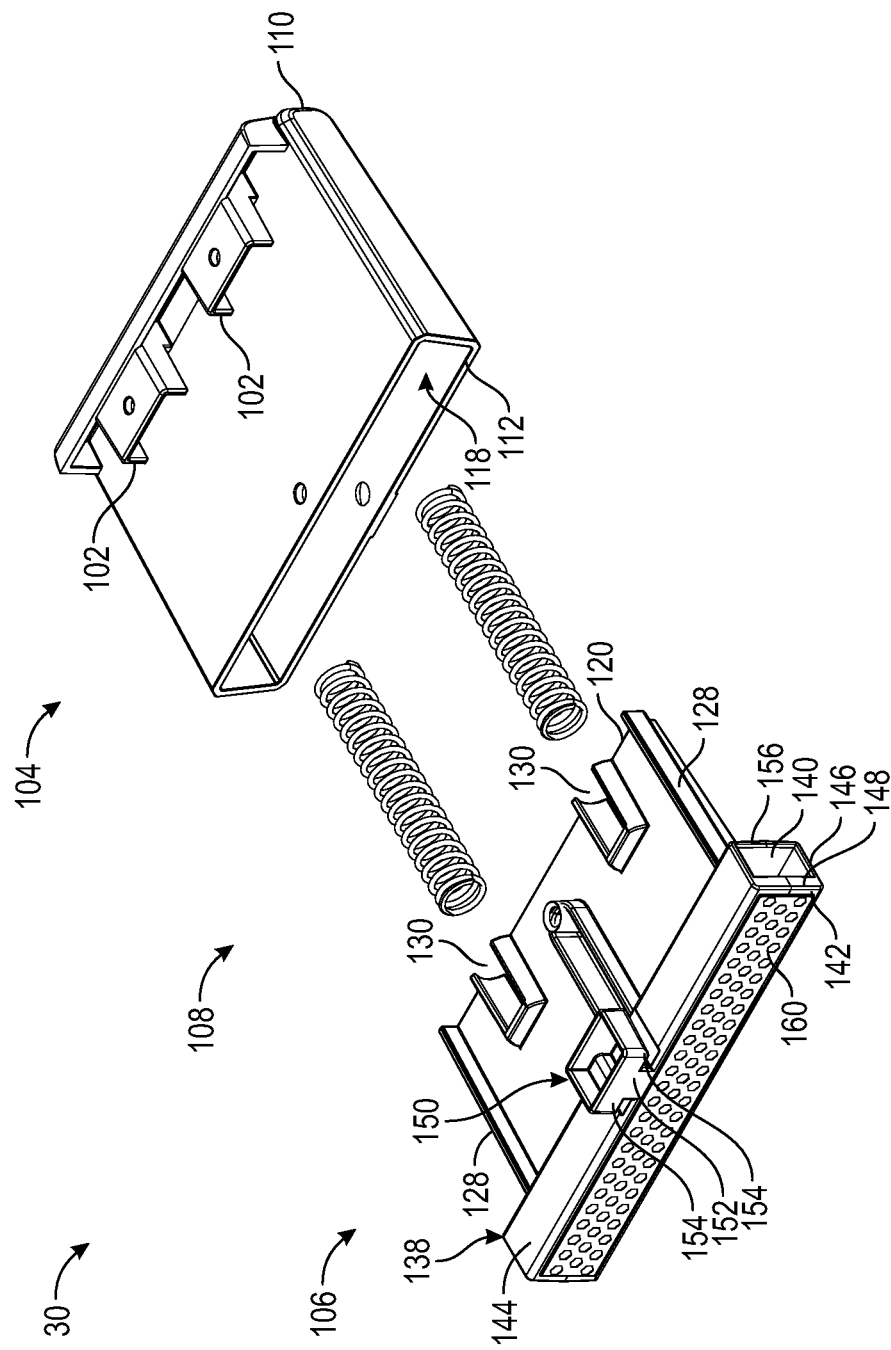
FIG. 23 shows an exploded upper front left perspective view of a clamp member of a straight edge guide system, in accordance with one or more embodiments.
Figure 24:
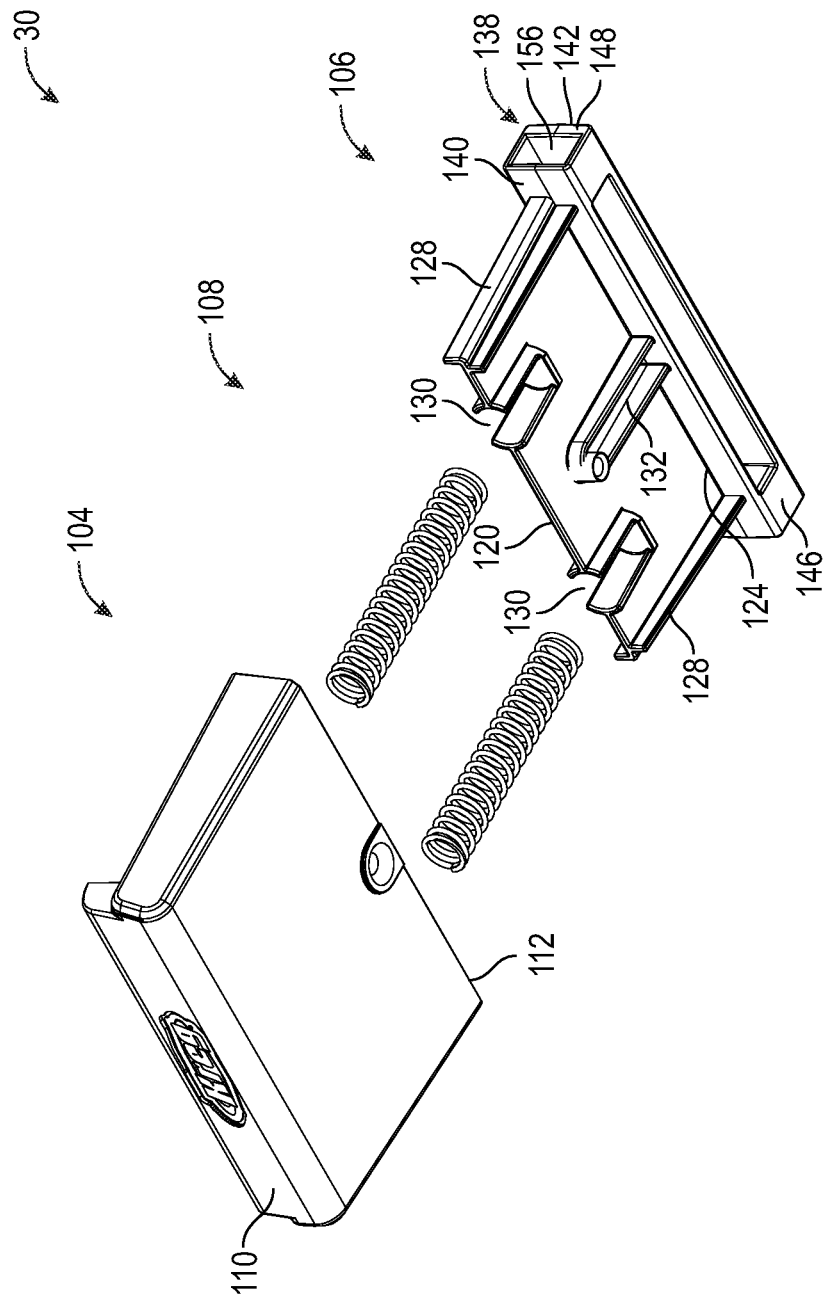
FIG. 24 shows an exploded lower rear right perspective view of a clamp member of a straight edge guide system, in accordance with one or more embodiments.
Figure 25:
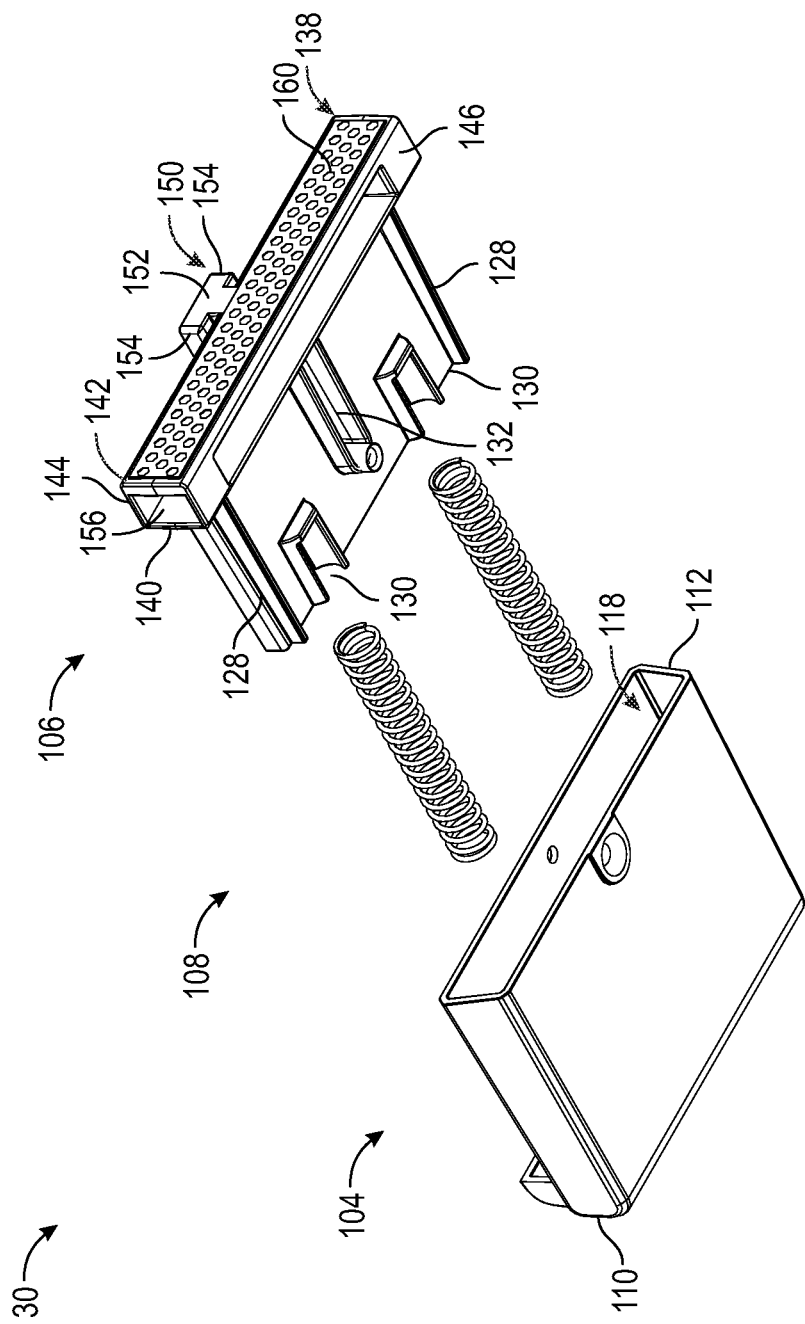
FIG. 25 shows an exploded lower front right perspective view of a clamp member of a straight edge guide system, in accordance with one or more embodiments.
Figure 26:
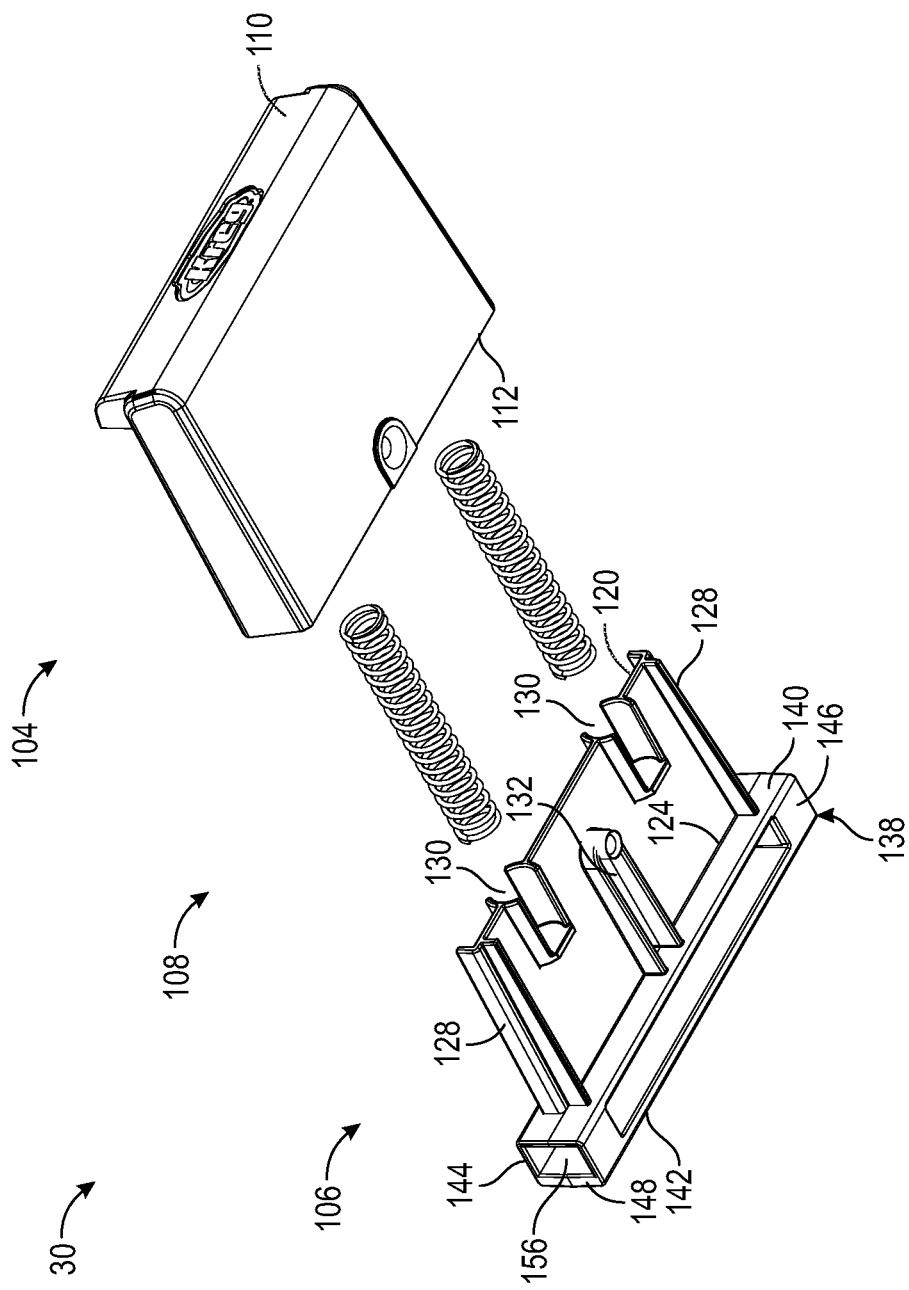
FIG. 26 shows an exploded lower rear left perspective view of a clamp member of a straight edge guide system, in accordance with one or more embodiments.
Figure 27:
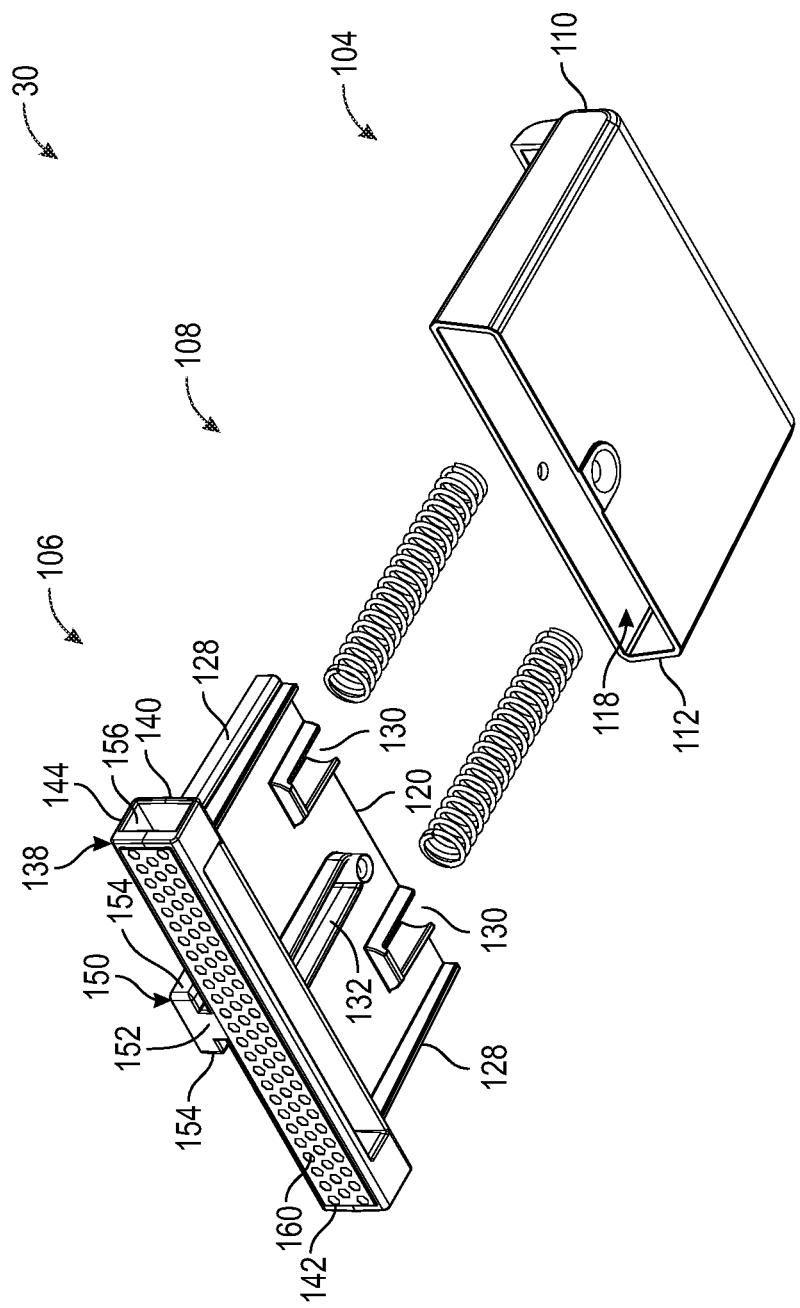
FIG. 27 shows an exploded lower front left perspective view of a clamp member of a straight edge guide system, in accordance with one or more embodiments.
Figure 28:
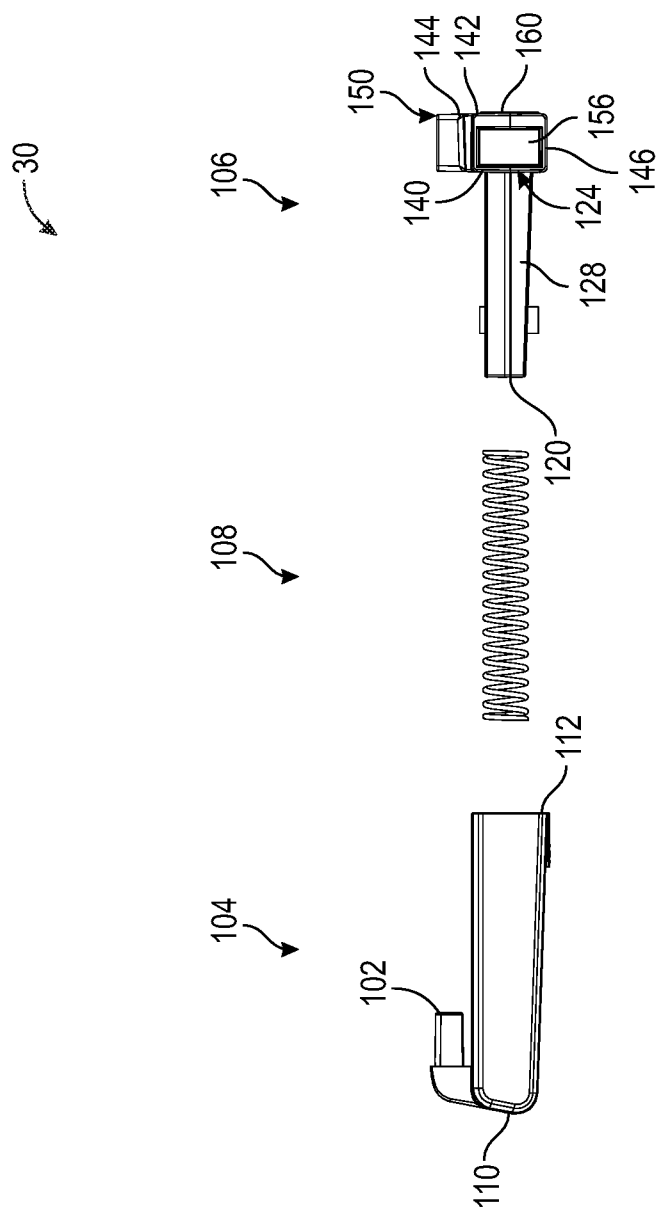
FIG. 28 shows an exploded right side view of a clamp member of a straight edge guide system, in accordance with one or more embodiments.
Figure 29:
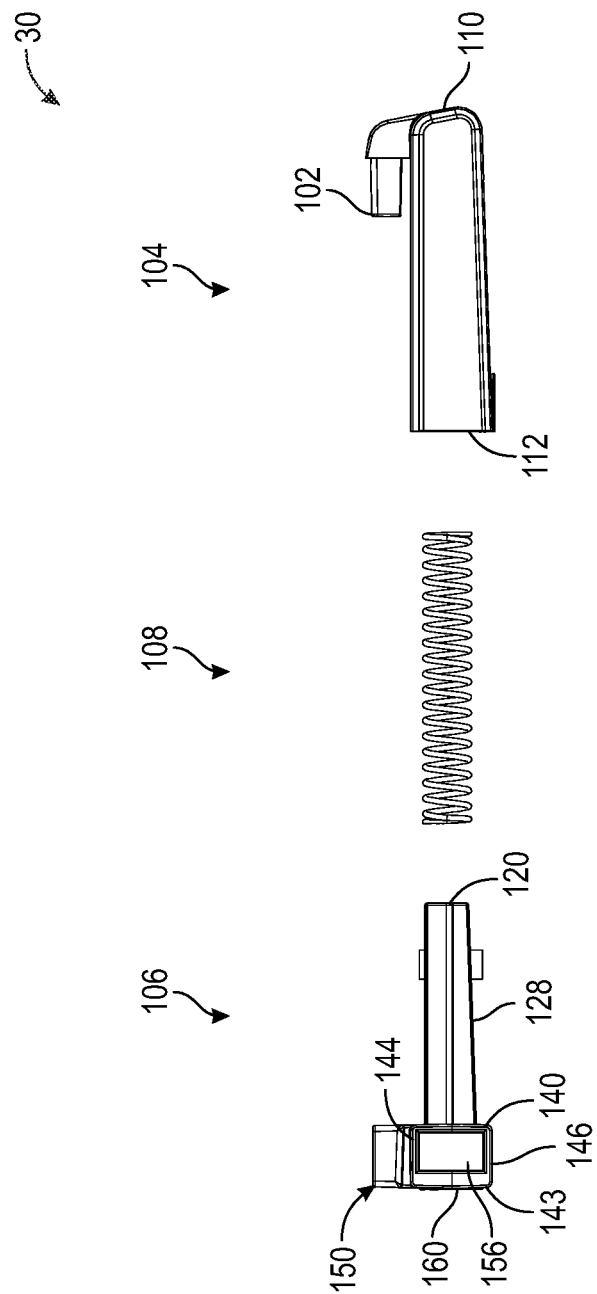
FIG. 29 shows an exploded left side view of a clamp member of a straight edge guide system, in accordance with one or more embodiments.
Figure 30:
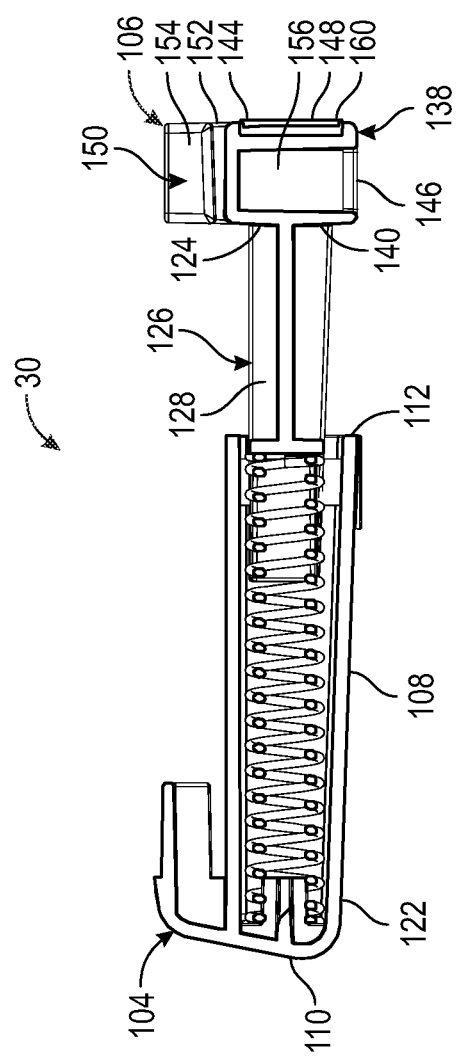
FIG. 30 shows a cross section of a right side view of a clamp member of a straight edge guide system, in accordance with one or more embodiments.
Figure 31:
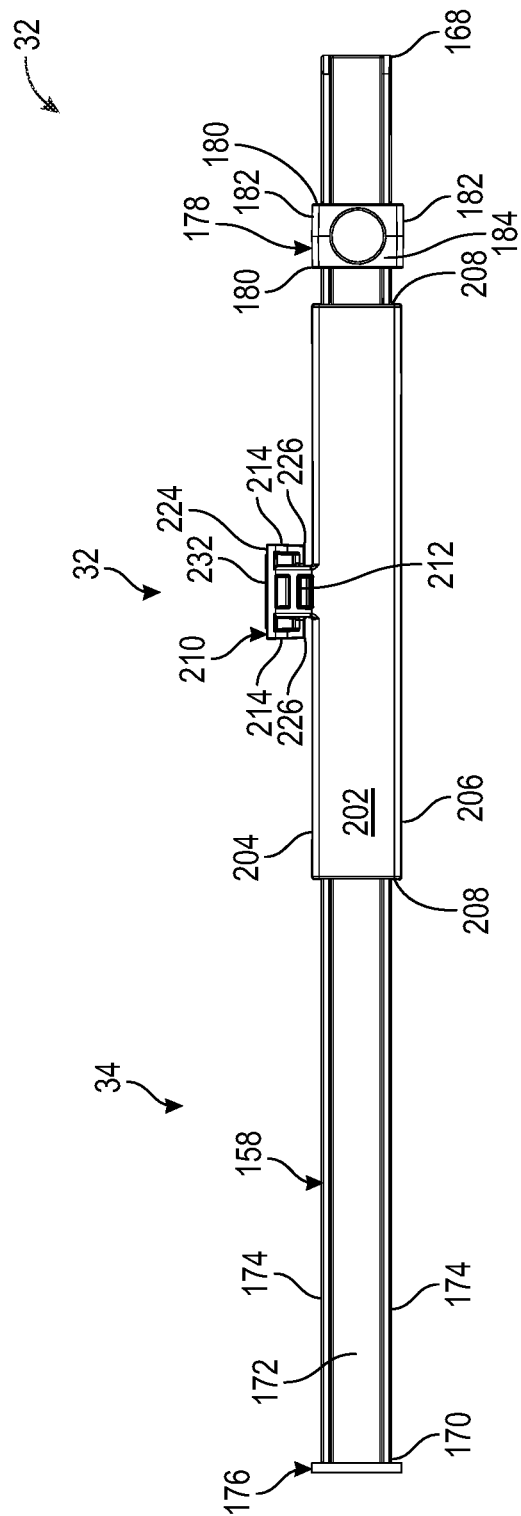
FIG. 31 shows a front view of a blade offset member and a stop member of a clamp member of a straight edge guide system, in accordance with one or more embodiments.
Figure 32:
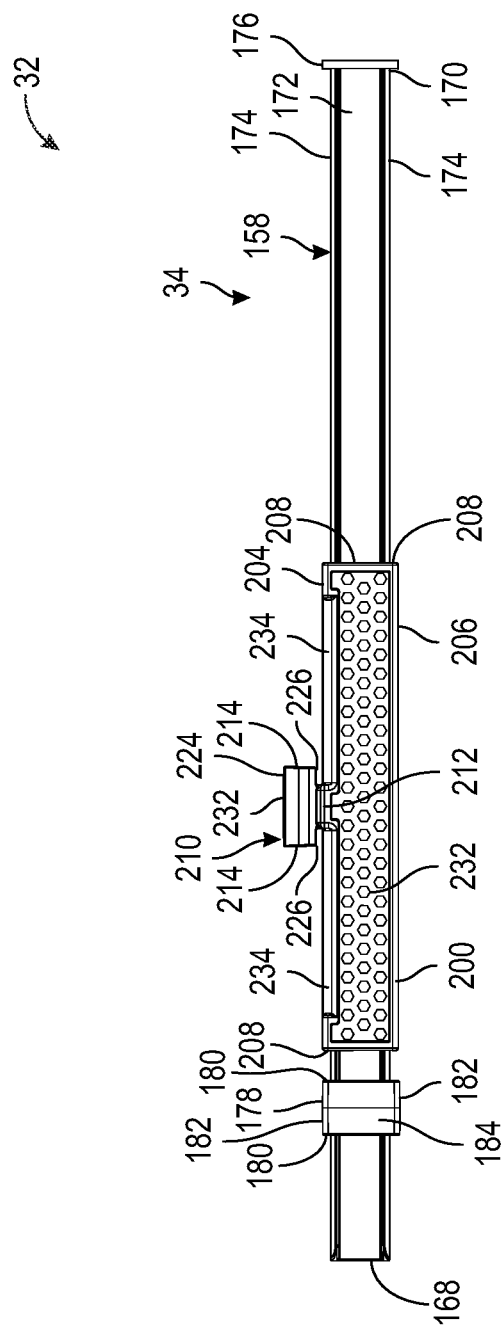
FIG. 32 shows a rear view of a blade offset member and a stop member of a clamp member of a straight edge guide system, in accordance with one or more embodiments.
Figure 33:
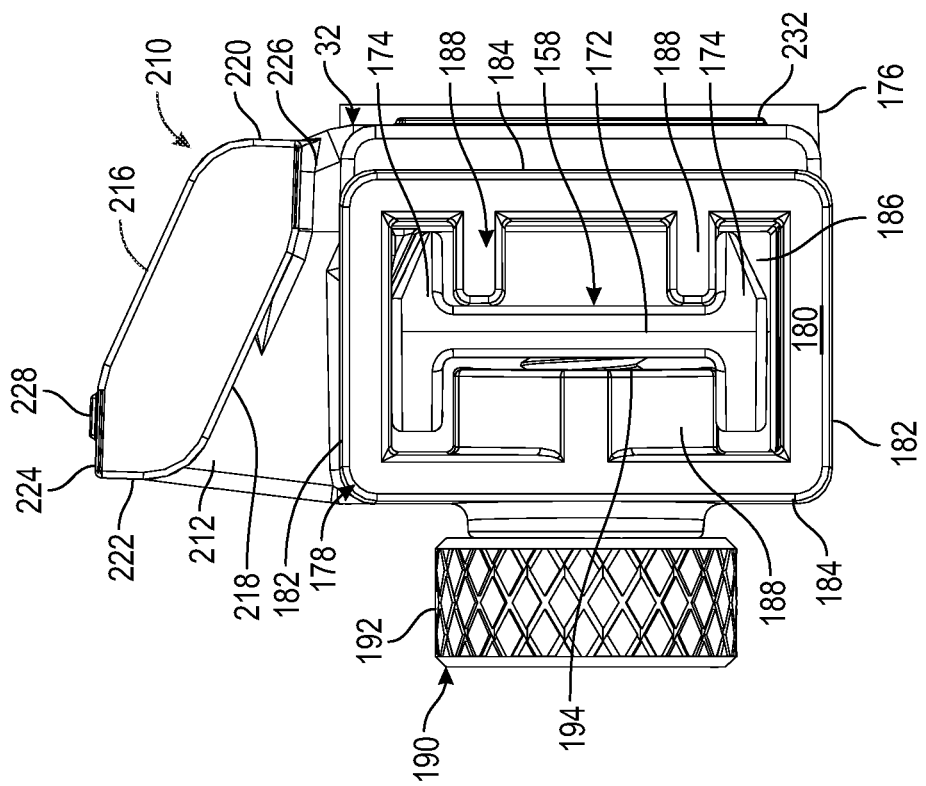
FIG. 33 shows a right side view of a blade offset member and a stop member of a clamp member of a straight edge guide system, in accordance with one or more embodiments.
Figure 34:
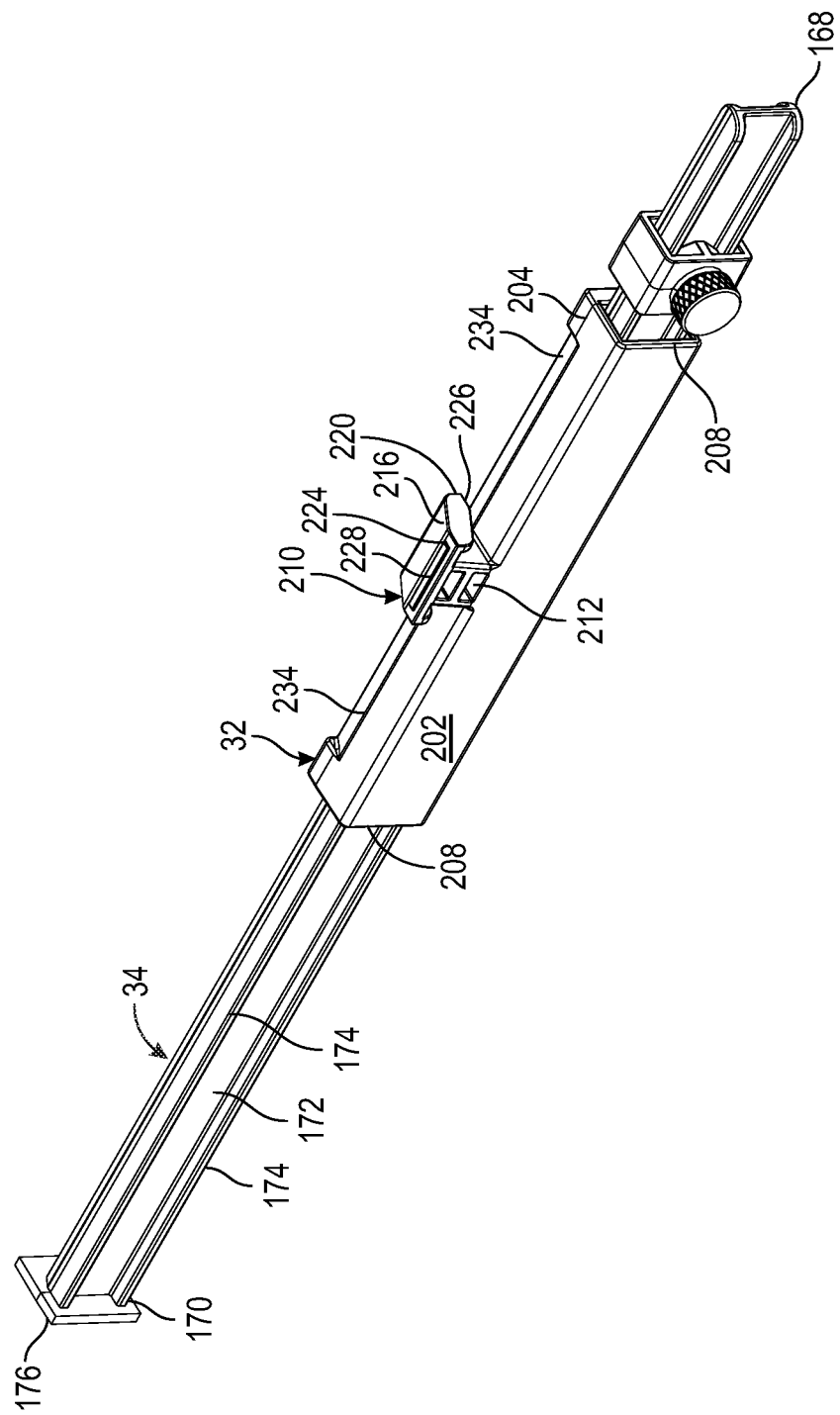
FIG. 34 shows an upper front left perspective view of a blade offset member and a stop member of a clamp member of a straight edge guide system, in accordance with one or more embodiments.
Figure 35:
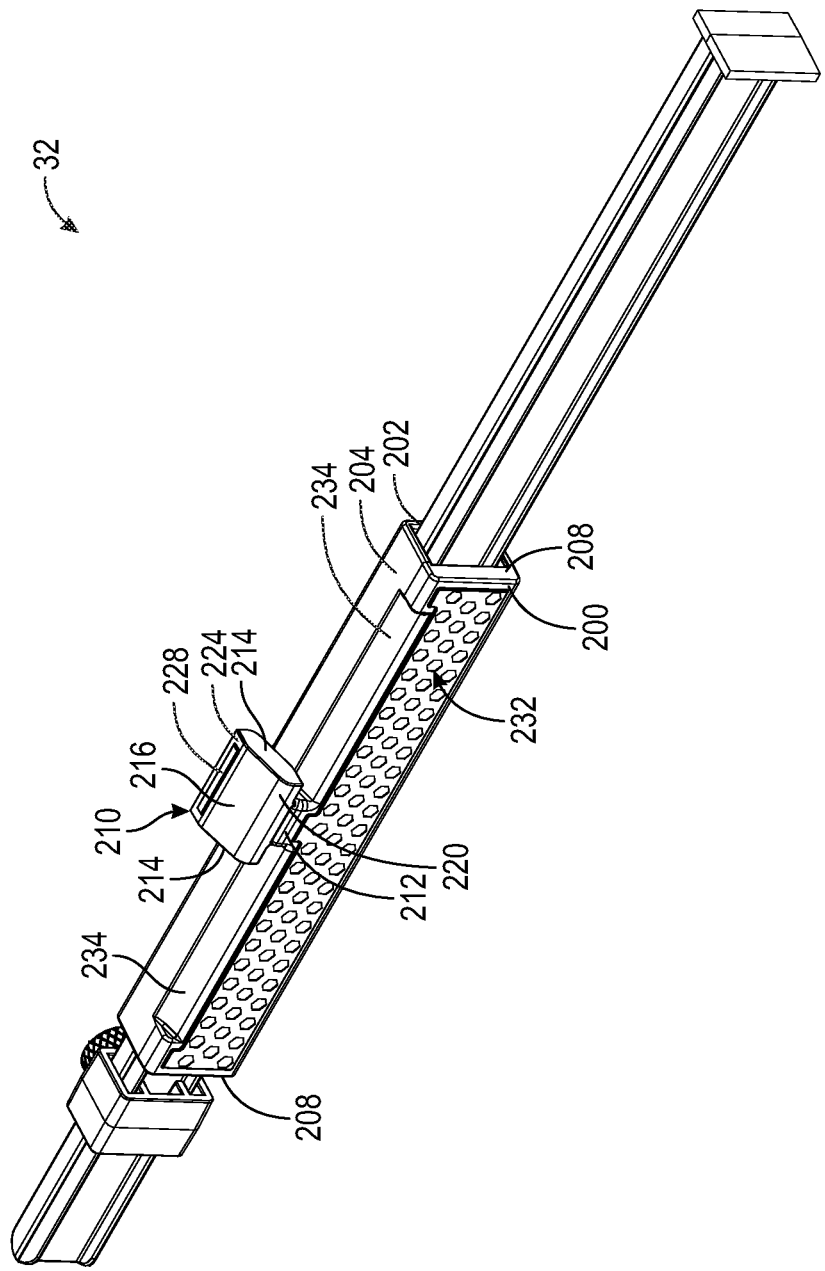
FIG. 35 shows an upper front right perspective view of a blade offset member and a stop member of a clamp member of a straight edge guide system, in accordance with one or more embodiments.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of use in association with cutting of wood. However, the embodiments are not so limited. Rather, it is contemplated that various disclosed embodiments may be used for cutting of any material including composite, stone, concrete, metal, plastic, or the like or any other material. It is appreciated that the embodiments may be adapted for use in various other reclamation applications, which may be improved by the disclosed structures, arrangements and/or methods. The system is merely shown and described as being used in the context of cutting wood for ease of description and as one of countless examples.

System 10:

In the arrangement shown, as one example, a straight edge guide system 10 (or simply "system 10") is presented. Straight edge guide system 10 is formed of any suitable size, shape and design and is configured quickly and easily clamp to a workpiece 12 and guide a cutting tool 14 to perform a cutting operation. In the arrangement shown, as one example, straight edge guide system 10 has a top side 16, a bottom side 18, a left side 20, a right side 22, a front side 24, a back side 26. In the arrangement shown, as one example, straight edge guide system 10 includes a guide member 28, a clamp member 30 a stop member 32, a blade offset member 34, a cover member 36, among other parts, components, systems, features and pieces as is described herein.

Workpiece 12:

In the arrangement shown, as one example, straight edge guide system 10 is configured to be used in association with a workpiece 12. Workpiece 12 is formed of any suitable size, shape and design.

In the arrangement shown, as one example, workpiece 12 is formed of a generally square or rectangular piece of sheet material having an upper surface 38, a lower surface 40, a front edge 42 (or first edge), a rear edge 44 (or second edge), and opposing side edges 46, among other features. As examples, workpiece 12 is formed of a board, a piece of dimensioned lumber, a sheet of plywood, a sheet of medium-density fiberboard (MDF), a sheet of press board, a sheet of concrete, a sheet of stone, a piece of metal, a sheet of composite material, a sheet of plastic material, a tile, a plate, or the like or any combination thereof, or any other piece of material.

Guide Member 28:

In the arrangement shown, as one example, straight edge guide system 10 includes a guide member 28. Guide member 28 is formed of any suitable size, shape and design and is configured to house and hold clamp member 30 and stop member 32 and is configured to be placed on the upper surface 38 of workpiece 12 to facilitate clamping to workpiece 12. Once clamped to workpiece 12, guide member is configured to provide a guide for a cutting operation performed by cutting tool 14.

In the arrangement shown, as one example, guide member 28 extends a length between a first end 48 (or front end) and a second end 50 (or rear end), and includes an upper surface 52, a lower surface 54, and opposing side surfaces 56.

In the arrangement shown, as one example, guide member 28 is formed of a generally elongated square or rectangular member that extends in a generally continuous manner from first end 48 to second end 50. However, any other size, shape and design is hereby contemplated for use.

In the arrangement shown, as one example, opposing upper surface 52 and lower surface 54 are generally flat and straight surfaces that extend in approximate parallel planar spaced relation to one another from first end 48 to second end 50. In the arrangement shown, as one example, opposing side surfaces 56 are generally flat and straight surfaces that extend in approximate parallel planar spaced relation to one another from first end 48 to second end 50. In the arrangement shown, as one example, opposing first end 48 and second end 50 define generally flat and straight end or surfaces that extend in approximate parallel planar spaced relation to one another. In the arrangement shown, as one example, the planes formed by opposing upper surface 52 and lower surface 54 extend in approximate perpendicular planar relation to the planes formed by opposing side surfaces 56. In the arrangement shown, as one example, the planes formed by opposing upper surface 52 and lower surface 54 extend in approximate perpendicular planar relation to the planes formed by opposing first end 48 and second end 50. In the arrangement shown, as one example, the planes formed by opposing side surfaces 56 extend in approximate perpendicular planar relation to the planes formed by opposing first end 48 and second end 50. In this way, in the arrangement shown, as one example, guide member 28 forms a generally elongated member that has a generally square or rectangular cross section that extends in a generally continuous manner from first end 48 to second end 50.

In the arrangement shown, as one example, guide member 28 includes a plurality of features therein that facilitate the attachment of components to guide member 28, facilitate guidance and alignment of components attached to guide member 28, and provide added structural rigidity and strength to guide member 28. In the arrangement shown, as one example, these features of guide member 28 include center guide 58, edge guides 60 and channels 62, among other features.

Center Guide 58: In the arrangement shown, as one example, guide member 28 includes a center guide 58. Center guide 58 is formed of any suitable size, shape and design and is configured to receive and guide stop member 32 as well as a movable portion of clamp member 30. In the arrangement shown, as one example, center guide 58 is formed of a T-shaped slot that is positioned in the lower surface 54 of guide member 28. In the arrangement shown, as one example, center guide 58 is positioned in the approximate center of guide member 28 and is generally equally spaced between opposing side surfaces 56 and edge guides 60 of guide member 28. In the arrangement show, as one example, center guide 58 includes an opposing upper surface 64 and lower surface 66, opposing side surfaces 68 that form a hollow interior 70 with a slot 72 positioned in the approximate bottom-center of the center guide 58. However, any other size, shape and design and placement and configuration is hereby contemplated for use for center guide 58.

In the arrangement shown, as one example, center guide 58 is configured to receive and guide and align and selectively lock stop member 32 therein as is further described herein.

Edge Guides 60: In the arrangement shown, as one example, guide member 28 includes a pair of edge guides 60. Edge guides 60 are formed of any suitable size, shape and design and is configured to receive and guide and align connection members 74 so as to facilitate the connection of adjacent sections 76 of guide member 28. In the arrangement shown, as one example, edge guides 60 are formed of a T-shaped slot that is positioned in the upper surface 52 of guide member 28. In the arrangement shown, as one example, an edge guide 60 is positioned adjacent each outward side surface 56 of guide member 28. In the arrangement show, as one example, edge guides 60 include an opposing upper surface 78 and lower surface 80, opposing side surfaces 82 that form a hollow interior 84 with a slot 86 positioned in the approximate top-center of the edge guides 60. However, any other size, shape and design and placement and configuration is hereby contemplated for use for edge guides 60.

Sections 76: In the arrangement shown, as one example, guide member 28 is formed of a plurality of sections 76 that connect together using connection members 74 at seams 88 to form the end 48 to end 50 overall length of guide member 28. The use of a plurality of sections 76 shorten the overall length of an unassembled guide member 28 and system 10 thereby reducing shipping cost and making transportation easier. In the arrangement shown, as one example, adjacent sections 76 are connected by insertion of connection members 74 in edge guides 60 of adjacent sections 76.

Connection Members 74: Connection members 74 are formed of any suitable size, shape and design and are configured to connect and align adjacent sections 76 of guide member 28. In the arrangement shown, as one example, connection members 74 are generally elongated square or rectangular members that extend a length between opposing ends 90. In the arrangement show, connection members 74 are long enough to provide substantial overlap with both adjacent sections 76 when connection members 74 are inserted in the edge guides 60 of adjacent sections 76 thereby providing both a secure attachment as well as arcuate alignment.

In the arrangement shown, as one example, connection members 74 are formed of an upper plate 92 and a lower plate 94 which are connected by and/or separated by a plurality of fastener 96. In the arrangement shown, as one example, upper plate 92 and lower plate 94 have generally the same, size, shape and configuration which in the arrangement shown is an elongated rectangular shape. When joined with one another in overlapping condition, upper plate 92 and lower plate 94 are sized and shaped to fit within edge guides 60 with close tolerance while allowing for insertion and alignment within edge guides 60. Once upper plate 92 and lower plate 94 are placed in edge guides 60 of two adjacent sections 76 the outward edges of upper plate 92 and lower plate 94 are adjacent the side surfaces 82 of edge guides 60, the lower surface of lower plate 94 is adjacent the lower surface 80 of edge guides 60, and the upper surface of upper plate 92 is adjacent the upper surface 78 of edge guides 60.

Once in this overlapping inserted position, fasteners 96, which are held in holes 98 in upper plate 92, are accessible through slot 86 of edge guides 60. As the fasteners 96 are tightened into upper plate 92, fasteners 96 space upper plate 92 and lower plate 94 apart from one another. This tightening of fasteners 96 causes the lower surface of lower plate 94 to press against the lower surface 80 of edge guide 60 while the upper surface of upper plate 92 presses against the upper surface 78 of edge guide 60. In this way the insertion of connection members 74 into edge guides 60 fastens adjacent sections 76 into a single continuous length of guide member 28.

Any other configuration of connection members 74 are hereby contemplated for use. Any number of sections 76 may be connected in end-to-end alignment in this manner to form guide member 28.

Channels 62: In the arrangement shown, as one example, guide member 28 includes a pair of channels 62. Channels 62 are formed of any suitable size, shape and design and is configured to receive portions of clamp member 30 and/or cover member 36 so as to facilitate the connection of clamp member 30 and/or cover member 36 to guide member 28. In the arrangement shown, as one example, channels 62 are formed of generally square or rectangular openings in guide member 28. In the arrangement shown, as one example, two channels 62 are present in guide member 28 with one channel 62 positioned between the center guide 58 and its adjacent edge guide 60. However, any other size, shape and design and placement and configuration is hereby contemplated for use for channels 62.

In the arrangement shown, as one example, channels 62 receive feet 102 of clamp member 30 at the first end 48 of guide member 28 so as to facilitate connection of clamp member 30 to guide member 28.

Clamp Member 30:

In the arrangement shown, as one example, straight edge guide system 10 includes a clamp member 30. Clamp member 30 is formed of any suitable size, shape and design and is configured to engage the front edge 42 of a workpiece 12 and apply a bias force or spring bias upon the workpiece 12 to facilitate clamping of the workpiece 12.

First Section: In the arrangement shown, as one example, clamp member 30 includes a first section 104 and a second section 106 that are connected together and include a bias member 108 that applies a bias force against second section 106 when second section 106 is compressed towards and/or against first section 104. This occurs when the guide member 28 is placed on a workpiece 12 and the second end 50 of guide member 28 is pulled thereby pulling clamp member 30 into the front edge 42 of workpiece 12.

In the arrangement shown, as one example, clamp member 30 includes a first section 104. First section 104 is formed of any suitable size, shape and design and is configured to connect to the first end 48 of guide member 28, is configured to receive second section 106 and is configured to provide a bias force against a front edge 42 of workpiece 12.

In the arrangement shown, as one example, first section 104 extends a length from a forward end 110 to a rearward end 112. In the arrangement shown, as one example, feet 102 are positioned just rearward of forward end 110 on the upper side of first section 104.

In this arrangement, forward end 110 is configured to cover the first end 48 of guide member 28 with a portion of first section 104 extending below the first end 48 of guide member 28. Feet 102 are configured to slide into channels 62 in the first end 48 of guide member 28 and are configured to be fastened in place with fasteners 114 that extend through holes 116 thereby locking first section 104 to guide member 28. The connection of feet 102 into channels 62 also provides alignment of the first section 104 to the guide member 28.

When first section 104 is installed into guide member 28, the rearward end 112 of first section 104 extends under and rearward from first end 48 a distance before terminating in rearward end 112. In the arrangement shown, as one example, rearward end 112 forms a socket having a hollow interior 118 that receives a forward end 120 of second section 106 as well as one or more bias members 108 therein. In the arrangement shown, the forward end of hollow interior 118 includes receivers 122 that receive the forward end of bias members 108. In the arrangement shown, wherein bias members 108 are coiled helical compression springs, receivers 122 are posts that fit within the hollow forward end of bias members 108 thereby holding and guiding bias members 108 within first section 104.

Second Section: In the arrangement shown, as one example, clamp member 30 includes a second section 106. Second section 106 is formed of any suitable size, shape and design and is configured to connect to first section 104, bias member 108 as well as guide member 28 and is configured to provide a bias force against a front edge 42 of workpiece 12.

In the arrangement shown, as one example, second section 106 extends a length from a forward end 120 to a rearward end 124. The area between forward end 120 and rearward end 124 may be referred to as a tail section 126. In the arrangement shown, as one example, tail section 126 fits within the hollow interior 118 of rearward end 112 of first section 104. Tail section 126 is configured to slide in and out of the hollow interior 118 of rearward end 112 of first section 104 and is configured to provide alignment of second section 106 to first section 104. In the arrangement shown, as one example, the sides 128 of tail section 126 include guide members that extend upward and downward that engage the top, side and/or bottom of the interior surface of hollow interior 118 and help to provide alignment of second section 106 to first section 104 as the second section 106 slides in and out of the first section 104.

In the arrangement shown, as one example, the forward end of bias members 108 are received and held by receivers 122 adjacent the forward end of first section 104, whereas the rearward end of bias members 108 are received and held by receivers 130 in the forward end 120 of second section 106. In the arrangement shown, as one example, receivers are cylindrical shaped openings, sockets or collars that extend forward a distance from rearward end 124 before terminating in an end wall. In this arrangement, the openings of receivers 130 are sized and shaped to receive the rearward end of bias members 108 therein with close and tight tolerances and, in some arrangements, frictional engagement. Receivers 130 hold and guide the rearward end of bias members 108 as second section 106 moves in and out of first section 104.

In the arrangement shown, as one example, tail section 126 includes a slot 132 therein. Slot 132 is formed of any suitable size, shape and design and is configured to receive a stop 134, which in the arrangement shown, is a conventional fastener such as a screw, bolt or the like, that extends through portions of first section 104, through slot 132 of second section 106 and into center guide 58 of guide member 28. In the arrangement shown, as one example, slot 132 is generally centrally positioned within tail section 126 and extends in approximate parallel relation with the length of guide member 28 and the forward to back length of tail section 126, however any other configuration or placement is hereby contemplated for use, as is the use of multiple slots 132. Slot 132, with stop 134 extending through slot 132, helps to provide alignment between the first section 104 and second section 106 as second section 106 moves in and out of first section 104. Slot 132, with stop 134 extending through slot 132, also establishes the outward-most position that second section 106 may travel at the point where stop 134 engages the forward-most point of slot 132. In this way, slot 132 with its stop 134 therein, holds bias member 108 under partial compression and prevents second section 106 from separating from first section 104. In the arrangement shown, as one example, the upper end of stop 134 engages or threads into collar 136 that fits within center guide 58 of guide member 28 thereby securing the upper end of stop 134.

Housing 138: In the arrangement shown, as one example, the rearward end 124 of tail section 126 connects to housing 138. Housing 138 is formed of any suitable size, shape and design and is configured to engage a front edge 42 of a workpiece 12 as well as house and hold and facilitate operation of blade offset member 34.

In the arrangement shown, as one example, housing 138 extends between a first end 140 (or front end) and a second end 142 (or rear end), and includes an upper surface 144, a lower surface 146, and opposing side surfaces 148. In the arrangement shown, as one example, first end 140 of housing 138 connects to the rearward end 124 of tail section 126. However, any other size, shape and design is hereby contemplated for use.

In the arrangement shown, as one example, opposing upper surface 144 and lower surface 146 are generally flat and straight surfaces that extend in approximate parallel planar spaced relation to one another from side surface 148 to side surface 148. In the arrangement shown, as one example, opposing side surfaces 148 are generally flat and straight surfaces that extend in approximate parallel planar spaced relation to one another. In the arrangement shown, as one example, opposing first end 140 and second end 142 extend in approximate parallel planar spaced relation to one another. In the arrangement shown, as one example, the planes formed by opposing upper surface 144 and lower surface 146 extend in approximate perpendicular planar relation to the planes formed by opposing side surfaces 148. In the arrangement shown, as one example, the planes formed by opposing upper surface 144 and lower surface 146 extend in approximate perpendicular planar relation to the planes formed by opposing first end 140 and second end 142. In the arrangement shown, as one example, the planes formed by opposing side surfaces 148 extend in approximate perpendicular planar relation to the planes formed by opposing first end 140 and second end 142. In this way, in the arrangement shown, as one example, housing 138 forms a generally elongated member that has a generally square or rectangular cross section.

In the arrangement shown, as one example, housing 138 is positioned just below the lower surface 54 of guide member 28 and is configured slide forward to back a distance as tail section 126 moves in and out of the hollow interior 118 of first section 104 as bias members 108 are compressed and expand.

Slide Member 150: In the arrangement shown, as one example, a slide member 150 is connected to the upper surface 144 of housing 138. Slide member 150 is formed of any suitable size, shape and design and is configured to engage center guide 58 of guide member 28 and provide alignment while also allowing the second section 106 to slide forward to back a distance as bias members 108 compress and extend. In the arrangement shown, as one example, when center guide 58 is a T-shaped slot in guide member 28, slide member 150 has a corresponding size, shape and configuration. That is, as one example, slide member 150 includes an arm 152 that extends upward from upper surface 144 a distance that connects to outwardly extending wings 154. In this arrangement, arm 152 is sized and shaped to fit within slot 72 of center guide 58 with close and tight tolerances while also allowing for sliding movement. In this arrangement, wings 154 are sized and shaped to fit within the hollow interior 70 of center guide 58 and slide over the lower surface 66 of center guide 58 and slide just inward of the opposing side surfaces 68 of center guide 58. In the arrangement shown, the distance between the upper surface 144 of housing 138 and the lower surface of wings 154 is approximately the thickness of the material that forms the lower surface 66 of center guide 58. In this way, slide member 150 provides alignment, strength and guidance to the rearward end of second section 106 as bias member 108 compresses and expands during operation.

In the arrangement shown, as one example, housing 138 is centered on and is slightly wider from side surface 148 to side surface 148 than the width of guide member 28 from side surface 56 to side surface 56. As such, the side surfaces 148 of housing 138 are positioned outward a distance from the side surfaces 56 of guide member 28.

Hollow Interior 156: In the arrangement shown, as one example, housing 138 includes a hollow interior 156. Hollow interior 156 is formed of any suitable size, shape and design and is configured to receive and allow body 158 of blade offset member 34 to extend and slide there through. In the arrangement shown, as one example, hollow interior 156 is a generally square or rectangular shaped opening that extends through housing 138 from side surface 148 to side surface 148. However, any other size, shape and design is hereby contemplated for use. In one arrangement, the size, shape and design and configuration of hollow interior 156 is dictated by or conforms to the size, shape and design and configuration of blade offset member 34.

In the arrangement shown, as one example, when straight edge guide system 10 is placed on a workpiece 12 and workpiece 12 is clamped, the second end 142 of housing 138 engages the front edge 42 of workpiece 12. In one arrangement, to ensure housing 138 and the other components of clamp member 30 have the needed structural strength and rigidity needed for operation and long life, the components of clamp member 30 are formed of a strong and rigid material such as a metallic material or a plastic material or a composite material or an ultra-high molecular weight material (UHMW), or a fiberglass material, or a nylon material, or any other form or a material or combination thereof or the like. While use of a strong and rigid and hard material provides the needed strength and rigidity for clamp member 30, hard and rigid materials tend to have low coefficients of friction. This means that when the second end 142 of housing 138 engages the front edge 42 of workpiece 12 (which itself has a relatively low coefficient of friction due to its hardness) the workpiece 12 has a tendency to slip, which can lead to inaccurate cuts not to mention being dangerous.

To overcome this potential to slip, in one arrangement the user may over-clamp the workpiece 12. That is, the user can attempt to overcome the potential for slippage by applying maximum clamping pressure on workpiece 12. This is undesirable as applying maximum clamping pressure requires strength and effort, applying maximum clamping pressure has a tendency to damage the workpiece 12, applying maximum clamping pressure causes wear and tear on the straight edge guide system 10, among multiple other disadvantages.

In one arrangement, to overcome this potential to slip, the second end 142 of housing 138 that engages workpiece 12 may be abraded, roughened, patterned, or otherwise amended to physically impart additional friction on the front edge 42 of workpiece 12. Alternatively, to overcome this potential to slip, the second end 142 of housing 138 that engages workpiece 12 may include pins, nails, points or another penetration device to physically impart additional friction on the front edge 42 of workpiece 12.

While this arrangement may be effective at increasing friction on workpiece 12 and reducing the potential for slippage, this arrangement has its drawbacks. Namely, increasing friction by providing abrasions or points in the second end 142 of housing 138 causes marks, indentations, and/or damage to workpiece 12 which may be highly undesirable in many applications.

Grip Member 160: In one arrangement to provide both desired grip as well as desired structural rigidity, while also preventing damage to workpiece 12, second end 142 of housing 138 includes a grip member 160. That is, the clamp member 30, or more specifically first section 140 and second section 106 (including housing 138) is formed of a generally rigid plastic material or composite material or the like that provides the needed structural rigidity to clamp member 30 to facilitate clamping. Due to the material properties of this rigid and strong plastic or composite material it tends to be relatively slick and haves a low coefficient of friction. As such, if this material itself were in direct engagement with workpiece 12, the second end 142 of housing 138 would have a tendency to slip along the workpiece 12, or said another way there would be a low coefficient of friction between the second end 142 of housing 138 and the workpiece 12.

To provide increased grip upon workpiece 12, the second end 142 of housing 138 includes grip member 160 or a layer (grip layer 160) formed of a more flexible and/or more compressible material than the plastic or composite material that forms the other portions of clamp member 30 and the metallic material that forms the guide member 28. Grip member 160 is formed of any material that that has a higher coefficient of friction than the plastic or composite material that forms the other portions of clamp member 30 and the metallic material that forms the guide member 28, and therefore the grip member 160 provides enhanced grip on workpiece 12. The enhanced grip of the grip member 160 of second end 142 of housing 138 allows the clamp member 30 to better stay in place during a cutting operation thereby allowing for a cleaner, more accurate and safer cutting operation.

That is, the high coefficient of friction of the material of grip member 160 also helps to hold the workpiece 12 in place and prevent workpiece 12 and second end 142 of housing 138 from moving during a cutting operation thereby allowing for a cleaner, more accurate and safer use.

In one arrangement, the grip member 160 and housing 138 and/or second section 106 are formed of a single piece construction, such as molding the two components together such that they are essentially inseparable, unitary, monolithic and formed of a single-piece construction. This monolithic formation may be made through various manufacturing processes such as dual durometer molding or dual material molding, or any other operation where two different materials are molded together to form a single monolithic and unitary member. Alternatively, the grip member 160 and housing 138 and/or second section 106 may be formed independently of one another and are then connected together by any manner, method or means such as by using two sided tape, adhesive, gluing, cementing, screwing, bolting, welding, using fitting features, using snap fitting features, heat-activating, bonding, or the like, or by connecting by any other manner, method or means. In another arrangement, a first component is formed (either the grip member 160 and housing 138 and/or second section 106) through any process such as extrusion, molding, casting, machining, forming or the like and the second component (the other of the grip member 160 and housing 138 and/or second section 106) is added to the formed first component in a secondary manufacturing process such as molding, extrusion, spray deposition or the like processes identified herein or any other manufacturing process.

In one arrangement, grip member 160 covers all of the surface of the second end 142 of housing 138. In another arrangement, grip member 160 covers only a portion of the second end 142 of housing 138. In one arrangement, grip member 160 is a single continuous member. In another arrangement, multiple grip members 160 are attached to or formed as part of the second end 142 of housing 138. In one arrangement, grip member 160 is flush with the second end 142 of housing 138. In another arrangement, grip member 160 protrudes or is proud of the second end 142 of housing 138.

In one arrangement, as is shown, grip member 160 is a layer of flexible and compressible rubber, foam or similar material that covers the vast majority of the second end 142 of housing 138. In this arrangement, this layer of material that forms grip member 160 is adhesively attached to the second end 142 of housing 138. In this arrangement, grip member 160 is formed of a generally square or rectangular shaped member that has an exterior peripheral edge that is slightly smaller than the exterior peripheral edge of the second end 142 of housing 138. In the arrangement shown, as one example, grip member 160 is formed of a generally thin planar layer that has a series or pattern of recesses therein, which in the arrangement shown are circular recesses, however any other configuration or shape or design is hereby contemplated for use.

Another benefit of using a compressible material for grip member 160 is that upon clamping the compressible nature of grip member 160 accommodates aberrations in front edge 42 of workpiece 12 which increases strength of hold and increases the ease of use and robustness of straight edge guide system 10.

Any other arrangement or configuration is hereby contemplated for use as grip member 160.

Blade Offset Member 34:

In the arrangement shown, as one example, straight edge guide system 10 includes one or more blade offset members 34. In the arrangement shown, as one example, a blade offset member 34 is associated with housing 138 of clamp member 30 and a blade offset member 34 is associated with stop member 32. Blade offset member 34 is formed of any suitable size, shape and design and is configured to indicate the position where the blade 162 of cutting tool 14 will make its cut, or cut line. This allows the user to precisely align the straight edge guide system 10 with a measured mark 164 in an offset-manner due to the width of a baseplate 166 of the cutting tool 14 so that the cutting operation is precisely and accurately and safely and easily performed on the measured mark 164.

In the arrangement shown, as one example, blade offset member 34 includes a body 158. Body 158 is formed of any suitable size, shape and design and is configured to extend and retract, to indicate the position of the cut line, and then to move out of the way to allow for the cutting operation to be performed without any interference from blade offset member 34. In the arrangement shown, as one example, body 158 is formed of a generally elongated member that extends a length from a first end 168 to a second end 170. In the arrangement shown, as one example, body 158 has an I-shaped cross sectional shape, having a generally vertically extending center member 172 that connects at its upper and lower ends to end members 174 that extend outward a distance equally on each side of center member 172 thereby forming the I-shape of body 158. In the arrangement shown, as one example, the plane formed by center member 172 extends in approximate perpendicular planar alignment to the planes formed by the opposing end members 174. This configuration of body 158 provides strength, rigidity, durability as well as helps facilitate alignment of body 158. This configuration also provides balance as the body 158 is symmetric and therefor can be inserted in any orientation such as right-side-up or upside-down without affecting operation. Or, said another way, body 158 does not have a defined upper side or lower side. However, any other shape is hereby contemplated for use as body 158 such as a square, rectangular, circular, oval, T-shaped, or any other shape.

In the arrangement shown, as one example, a head 176 is connected to second end 170 of body 158. In the arrangement shown, as one example, head 176 is formed of a generally planar square or rectangular shaped member that has an exterior peripheral edge that extends past the exterior peripheral edge of body 158. In this way, head 176 is larger than body 158 and therefor head 176 stops or defines the inward most positon of body 158 when head 176 is in a retracted position and engages housing 138 of clamp member 30 or stop member 32. In the arrangement shown, as one example, the plane formed by head 176 extends in approximate perpendicular planar alignment to the end 168 to end 170 length of body 158. In this way, the outward side or edge of head 176 of blade offset member 34 serves to define the cut line of blade 162 of cutting tool 14 when body 158 is calibrated to cutting tool when body 158 is in a fully extended position. However, any other shape is hereby contemplated for use as head 176 such as a square, rectangular, circular, oval, T-shaped, or any other shape.

Stop Feature 178: In the arrangement shown, as one example blade offset member 34 includes a stop feature 178. Stop feature 178 is formed of any suitable size, shape and design and is configured to adjustably define the fully extended position of body 158.

In the arrangement shown, as one example, stop feature 178 extends laterally between opposing ends 180, and includes opposing upper and lower surfaces 182, and includes opposing side surfaces 184.

In the arrangement shown, as one example, opposing ends 180 define generally flat and straight surfaces that extend in approximate parallel planar spaced relation to one another so as to define a generally flat, straight and clean stop surface when an end 180 engages a side surface 148 of a housing 138 or a side surface of a stop member 32 when body 158 of blade offset member 34 is in a fully extended positon.

In the arrangement shown, as one example, opposing upper and lower surfaces 182 define generally flat and straight surfaces that extend in approximate parallel planar spaced relation to one another. In the arrangement shown, as one example, opposing side surfaces 184 define generally flat and straight surfaces that extend in approximate parallel planar spaced relation to one another.

In the arrangement shown, as one example, the planes formed by opposing upper and lower surfaces 182 extend in approximate perpendicular planar relation to the planes formed by opposing side surfaces 184. In the arrangement shown, as one example, the planes formed by opposing upper and lower surfaces 182 extend in approximate perpendicular planar relation to the planes formed by opposing ends 180. In the arrangement shown, as one example, the planes formed by opposing ends extend in approximate perpendicular planar relation to the planes formed by opposing side surfaces 184. In this way, in the arrangement shown, as one example, stop feature 178 forms a generally square or rectangular cross section.

In the arrangement shown, as one example, stop feature 178 has a hollow interior 186. Hollow interior 186 is formed of any suitable size, shape and design and is configured to receive body 158 of blade offset member 34 therein with close and tight tolerances so as to provide precise alignment while also allowing for sliding of body 158 through stop feature 178 when stop feature 178 is in an unlocked position. In the arrangement shown, as one example, where body 158 of blade offset member 34 is formed of a generally I-shaped member, hollow interior 186 has a corresponding similarly I-shape such that body 158 of blade offset member 34 extends through hollow interior 186 of stop feature 178 in a generally mating arrangement.

In the arrangement shown, as one example, when body 158 extends through hollow interior 186 the outward facing upper and lower surfaces of body 158 are positioned just inward from the inward facing upper and lower surfaces of hollow interior 186. Similarly, when body 158 extends through hollow interior 186 the outward facing forward and rearward surfaces of body 158 are positioned just inward from the inward facing forward and rearward surfaces of hollow interior 186. In the arrangement shown, as one example, to facilitate this precise alignment and mating arrangement stop feature 178 includes at least one protrusion 188 that extends inward from one or both opposing side surface 184 in the recessed space between center member 172 and end members 174 of body 158.

In the arrangement shown, as one example, one side surface 184 includes a pair of spaced arms that serve as protrusion 188 that extend inward a distance just inward of opposing end members 174 whereas the other side surface 184 includes a single protrusion 188 that extends inward a distance just inward of opposing end members 174. In this arrangement, as one example, this single protrusion 188 includes a lock member 190 that is configured to lock body 158 at its calibrated fully extended position.

In the arrangement shown, as one example, stop feature 178 includes a lock member 190. Lock member 190 is formed of any suitable size, shape and design and is configured to lock body 158 at its calibrated fully extended position. In the arrangement shown, as one example, lock member 190 includes an oversized head 192 that is positioned exterior to a side surface 184 that connects to a shaft 194 that extends through side surface 184, as well as through protrusion 188, and engages a side of center member 172 of body 158 of blade offset member 34 thereby locking blade offset member 43 in place on stop feature 178. In the arrangement shown, as one example, head 192 has a roughened, abraded or patterned exterior peripheral circular edge that provides a grip for a user to engage and provide force to rotate lock member 190. In the arrangement shown, as one example, shaft 194 includes threads that extends through side surface 184, as well as through protrusion 188, in threaded engagement. However, any other size, shape and design and configuration is hereby contemplated for use as lock member 190.

Stop Member 32:

In the arrangement shown, as one example, straight edge guide system 10 includes a stop member 32 which is positioned on a side of workpiece 12 opposite clamp member 30. In this way, clamp member 30 engages one side of workpiece 12 whereas stop member 32 engages an opposite side of workpiece 12 thereby clamping workpiece 12 between clamp member 30 and stop member 32. Stop member 32 is formed of any suitable size, shape and design and is configured to engage a rear edge 44 of a workpiece 12 as well as house and hold and facilitate operation of blade offset member 34.

In the arrangement shown, as one example, stop member 32 is similar in size, shape and configuration to housing 138 of clamp member 30. As such, for this reason, unless explicitly stated otherwise, the disclosure and teaching related to housing 138 applies equally to stop member 32.

In the arrangement shown, as one example, stop member 32 extends between a first end 200 (or front end) and a second end 202 (or rear end), and includes an upper surface 204 (or upper end), a lower surface 206 (or lower end), and opposing side surfaces 208. However, any other size, shape and design is hereby contemplated for use.

In the arrangement shown, as one example, opposing upper surface 204 and lower surface 206 are generally flat and straight surfaces that extend in approximate parallel planar spaced relation to one another from side surface 208 to side surface 208. In the arrangement shown, as one example, opposing side surfaces 208 are generally flat and straight surfaces that extend in approximate parallel planar spaced relation to one another. In the arrangement shown, as one example, opposing first end 200 and second end 202 extend in approximate parallel planar spaced relation to one another. In the arrangement shown, as one example, the planes formed by opposing upper surface 204 and lower surface 206 extend in approximate perpendicular planar relation to the planes formed by opposing side surfaces 208. In the arrangement shown, as one example, the planes formed by opposing upper surface 204 and lower surface 206 extend in approximate perpendicular planar relation to the planes formed by opposing first end 200 and second end 202. In the arrangement shown, as one example, the planes formed by opposing side surfaces 208 extend in approximate perpendicular planar relation to the planes formed by opposing first end 200 and second end 202. In this way, in the arrangement shown, as one example, stop member 32 forms a generally elongated member that has a generally square or rectangular cross section.

In the arrangement shown, as one example, stop member 32 is positioned just below the lower surface 54 of guide member 28 and is configured slide forward to back a distance depending upon the thickness or width of workpiece 12.

Slide Member 210: In the arrangement shown, as one example, a slide member 210 is connected to the upper surface 204 of stop member 32. Slide member 210 is formed of any suitable size, shape and design and is configured to engage center guide 58 of guide member 28 and provide alignment while serving the purpose of allowing the stop member 32 to slide freely forward to back a distance of guide member 28 while also facilitating selective locking of stop member 32 in place on guide member 28 to facilitate clamping of workpiece 12.

In the arrangement shown, as one example, stop member 32 is configured to move between a free position and a locked position. In the arrangement shown, as one example, the free position is shown, as one example, in FIG. 36 whereas the locked position is shown, as one example, in FIG. 37.

Figure 36:
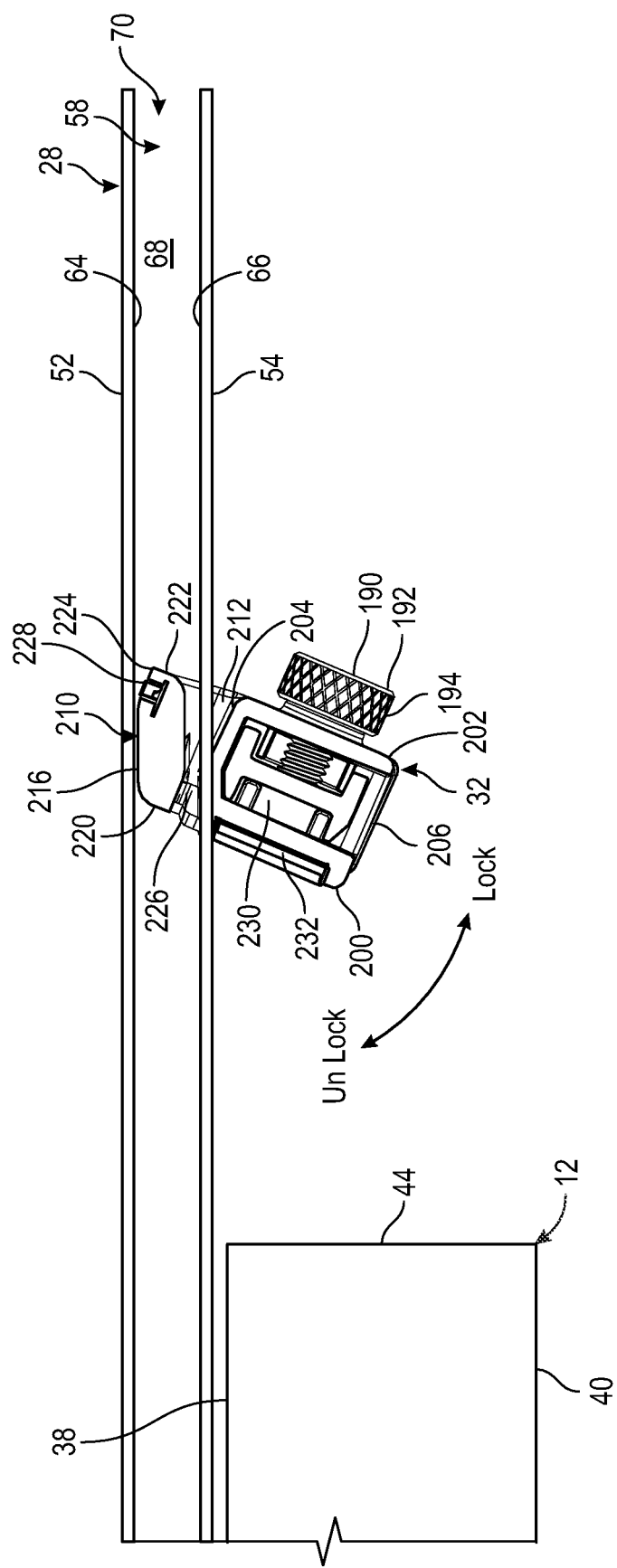
FIG. 36 shows a side view of a workpiece and a straight edge guide system, in accordance with one or more embodiments; the view showing a close of a slide member inserted in a center guide of straight edge guide system; the view showing the slide member in an unlocked position.

Free Position: As can be seen in FIG. 36, to facilitate free sliding of stop member 32 along a length of guide member 28, the first end 200 of stop member 32 is tilted toward workpiece 12 and clamp member 30. In this forward-tilted position, the vertical height of the portion of slide member 210 positioned within center guide 58 is substantially less than the distance between the lower surface 66 of center guide 58 and the upper surface 64 of center guide 58. In this position, the free position, there is clearance between the upper side of slide member 210 and the upper surface 64 of center guide 58. As such, stop member 32 is free to slide forward and back along center guide 58 of guide member 28.

Figure 37:
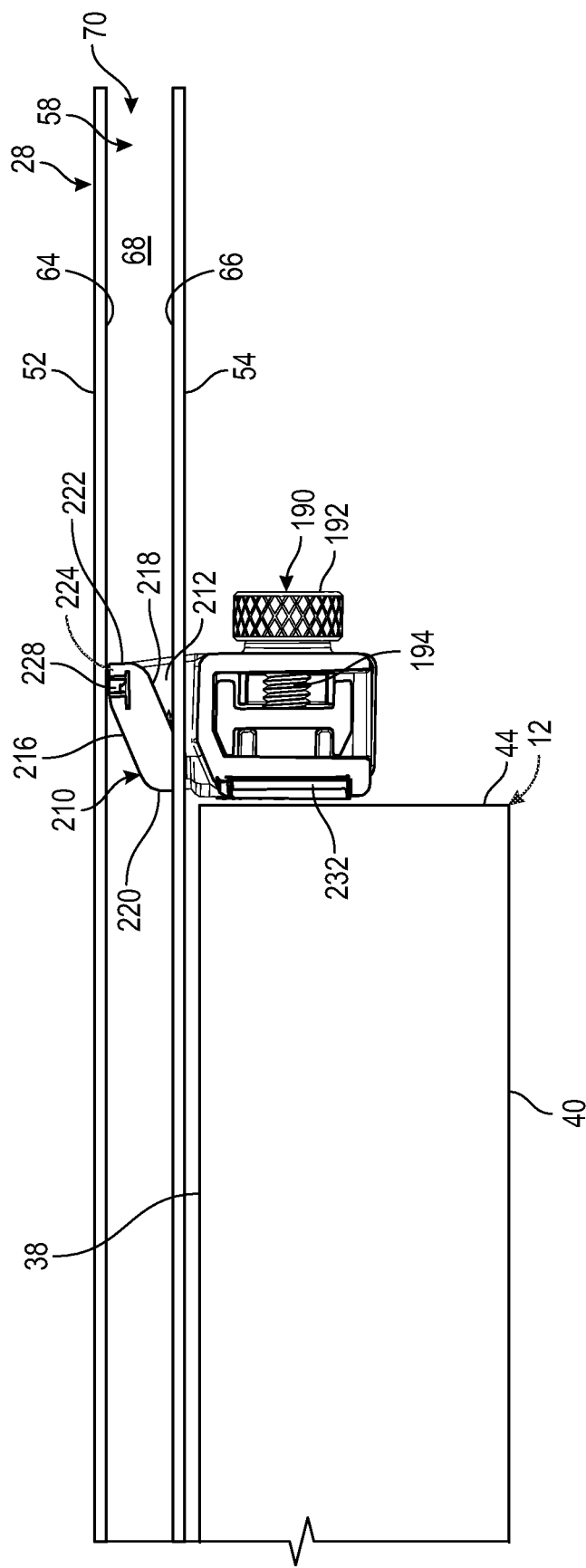
FIG. 37 shows a side view of a workpiece and a straight edge guide system, in accordance with one or more embodiments; the view showing a close of a slide member inserted in a center guide of straight edge guide system; the view showing the slide member in a locked position.
Figure 38:
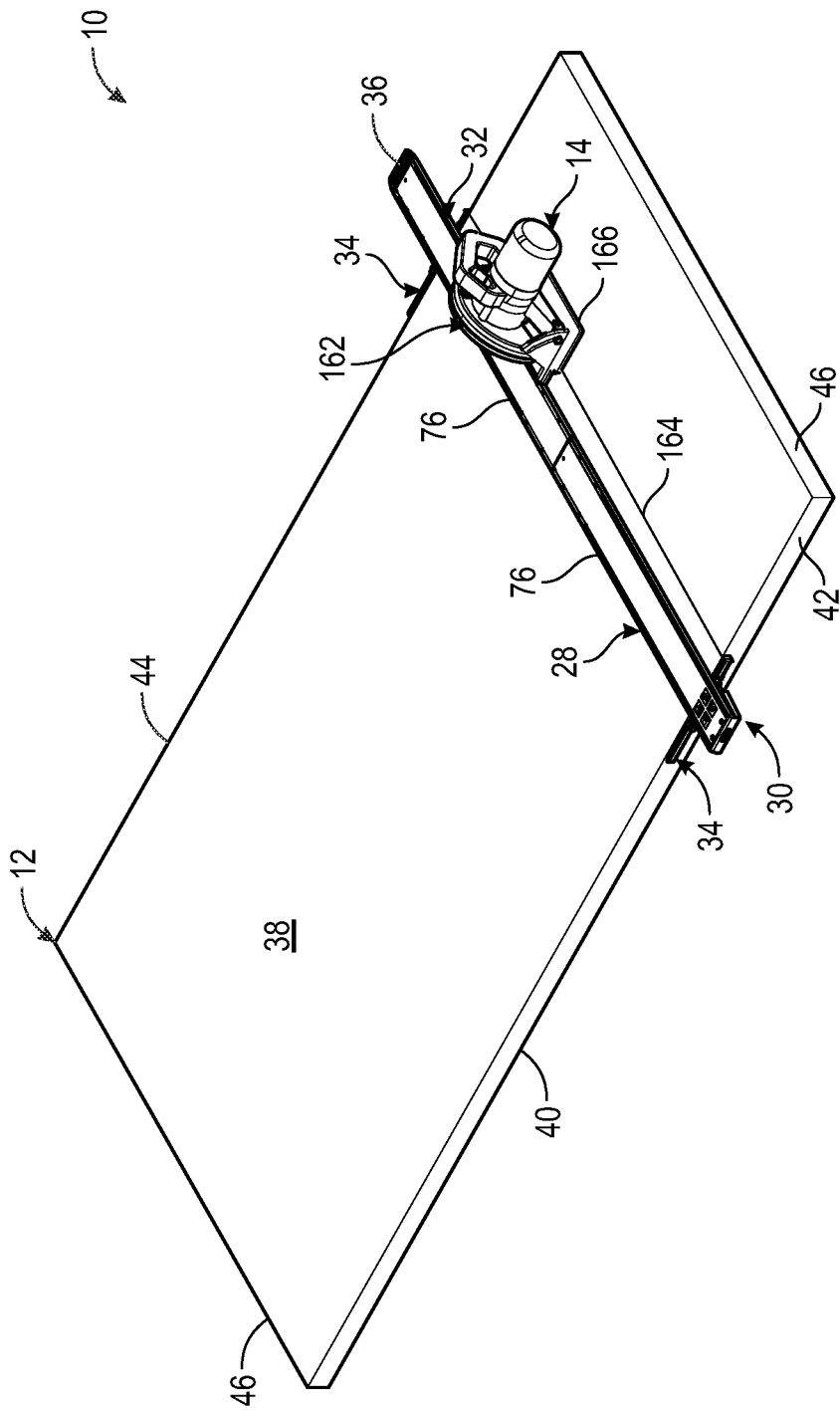
FIG. 38 shows an upper rear right perspective view of a workpiece, a straight edge guide system clamped on the workpiece, and a cutting tool in accordance with one or more embodiments; the view showing the strait edge guide system having length of two sections.
Figure 39:
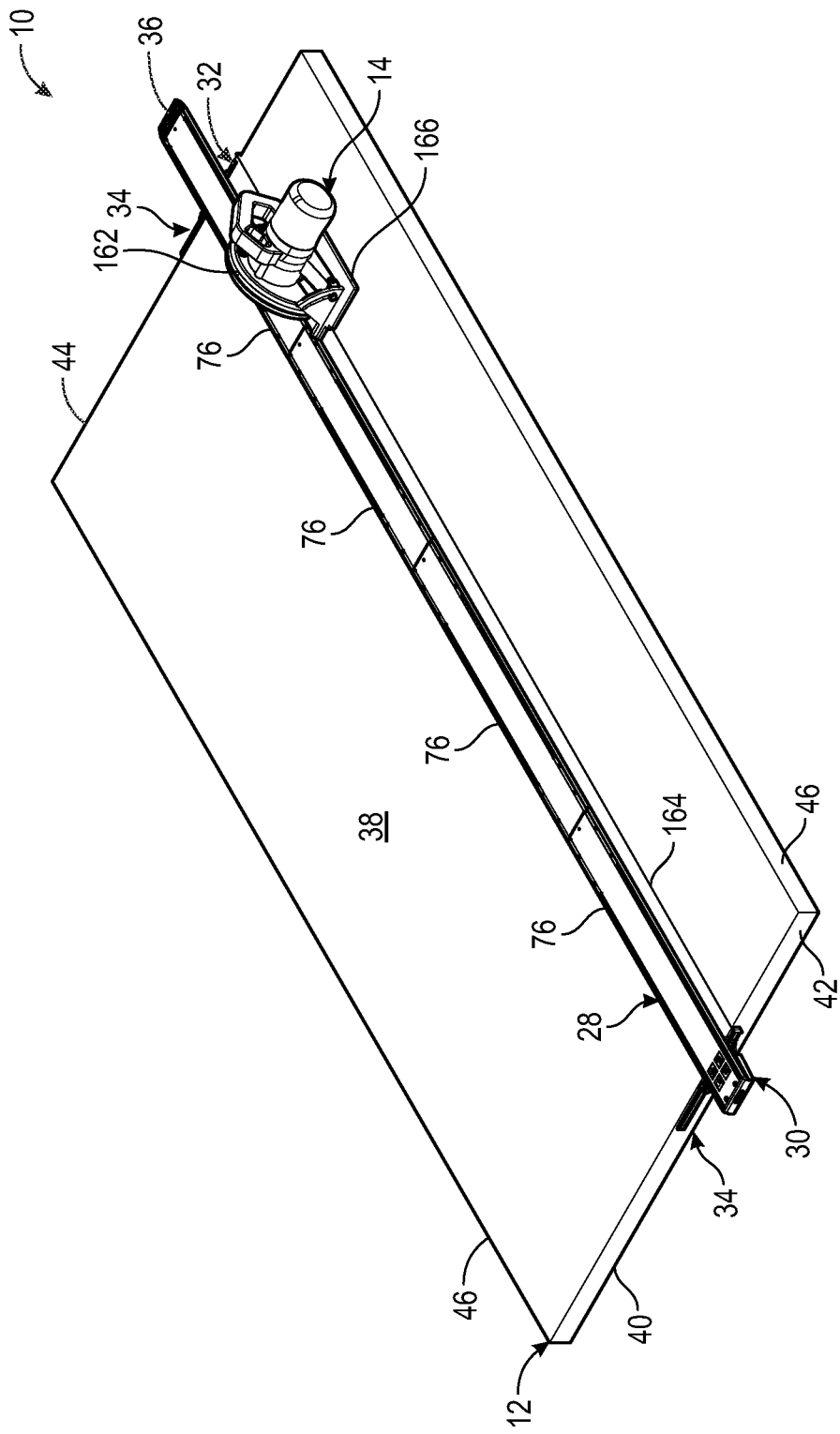
FIG. 39 shows an upper rear right perspective view of a workpiece, a straight edge guide system clamped on the workpiece, and a cutting tool, in accordance with one or more embodiments; the view showing the strait edge guide system having length of four sections.
Figure 40:
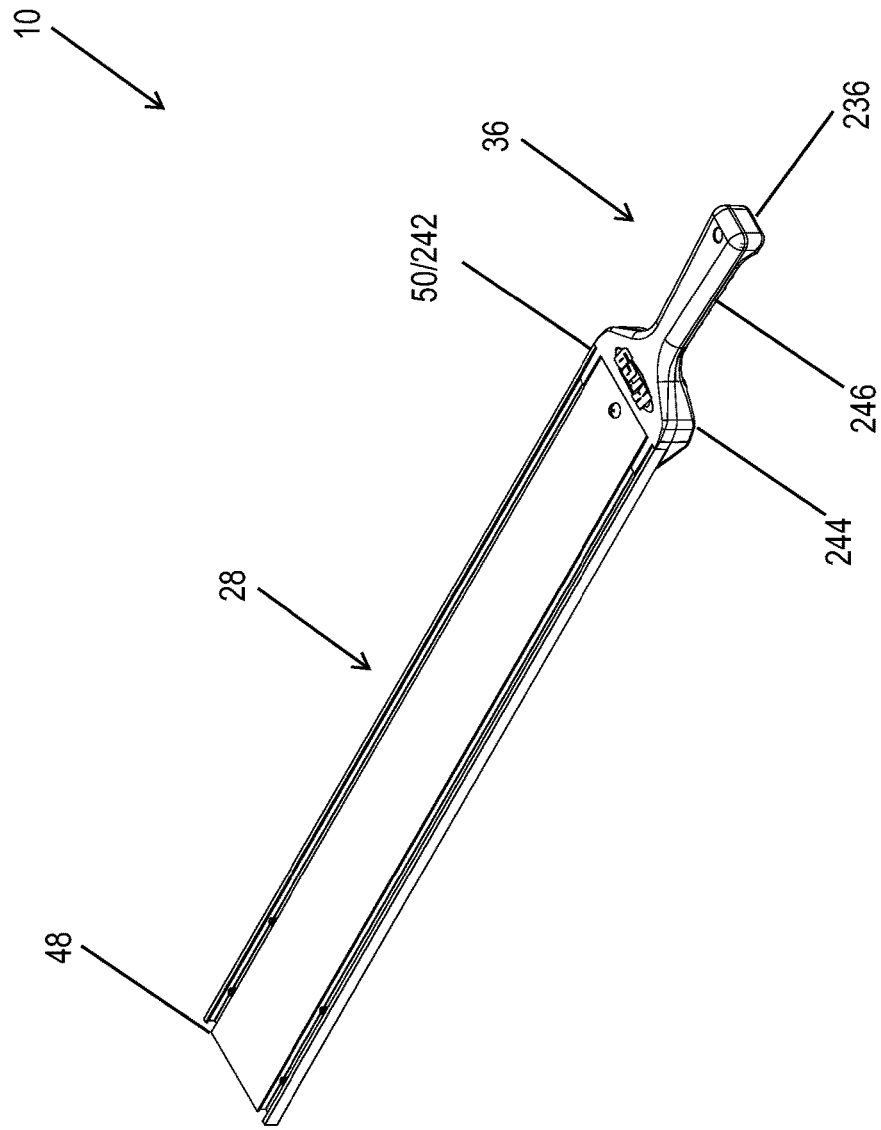
FIG. 40 shows an upper rear left perspective view of a straight edge guide system, in accordance with one or more embodiments; the view showing a cover member having a handle shaped rear portion attached to a second end of a guide member.
Figure 41:
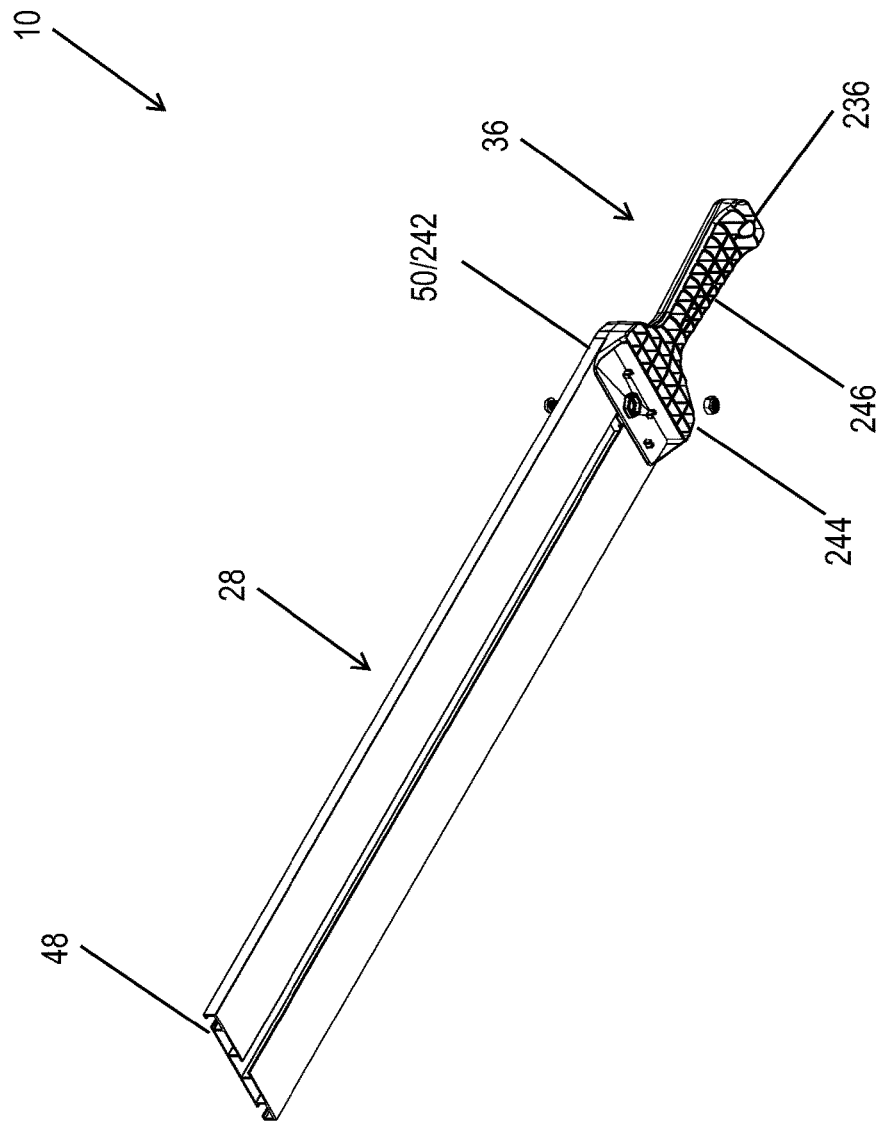
FIG. 41 shows a lower front left perspective view of a straight edge guide system, in accordance with one or more embodiments; the view showing a cover member having a handle shaped rear portion attached to a second end of a guide member.
Figure 42:
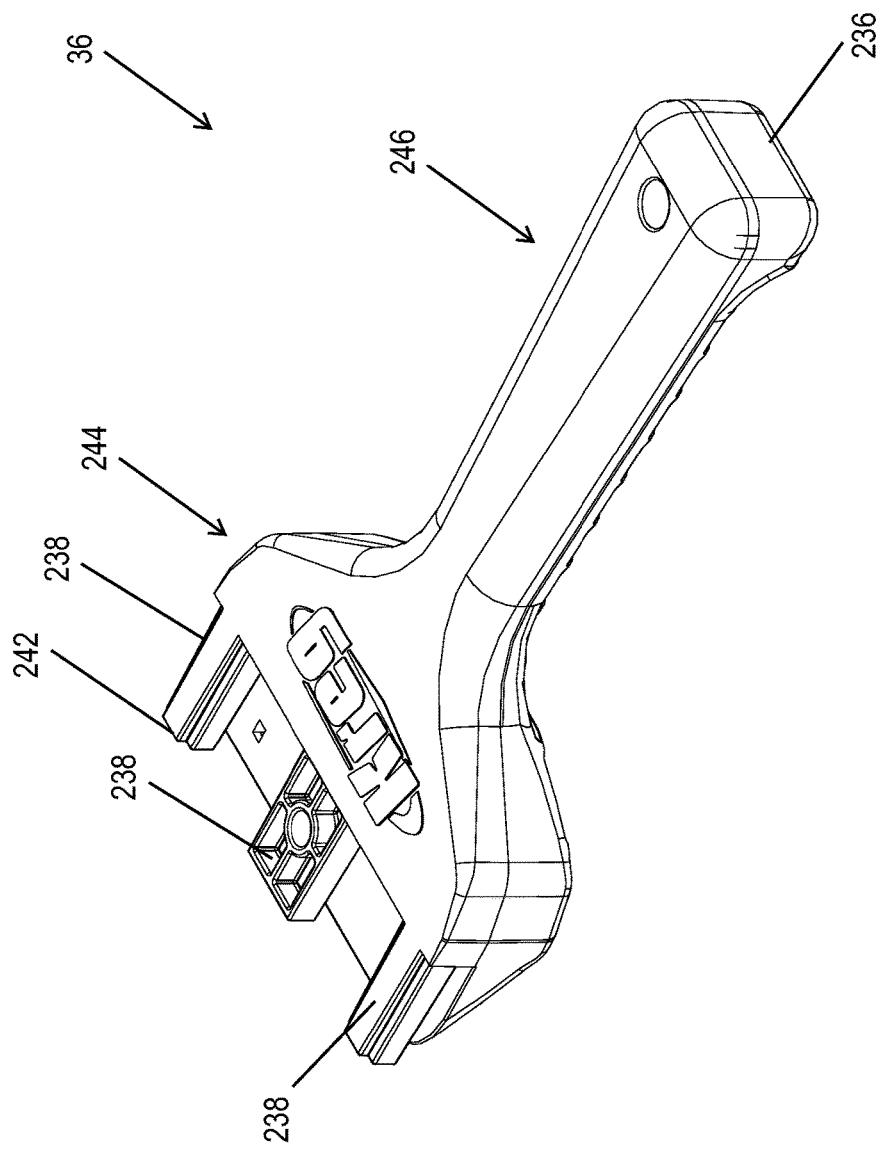
FIG. 42 shows an upper rear left perspective view of the cover member shown in FIGS. 40 and 41, in accordance with one or more embodiments.
Figure 43:
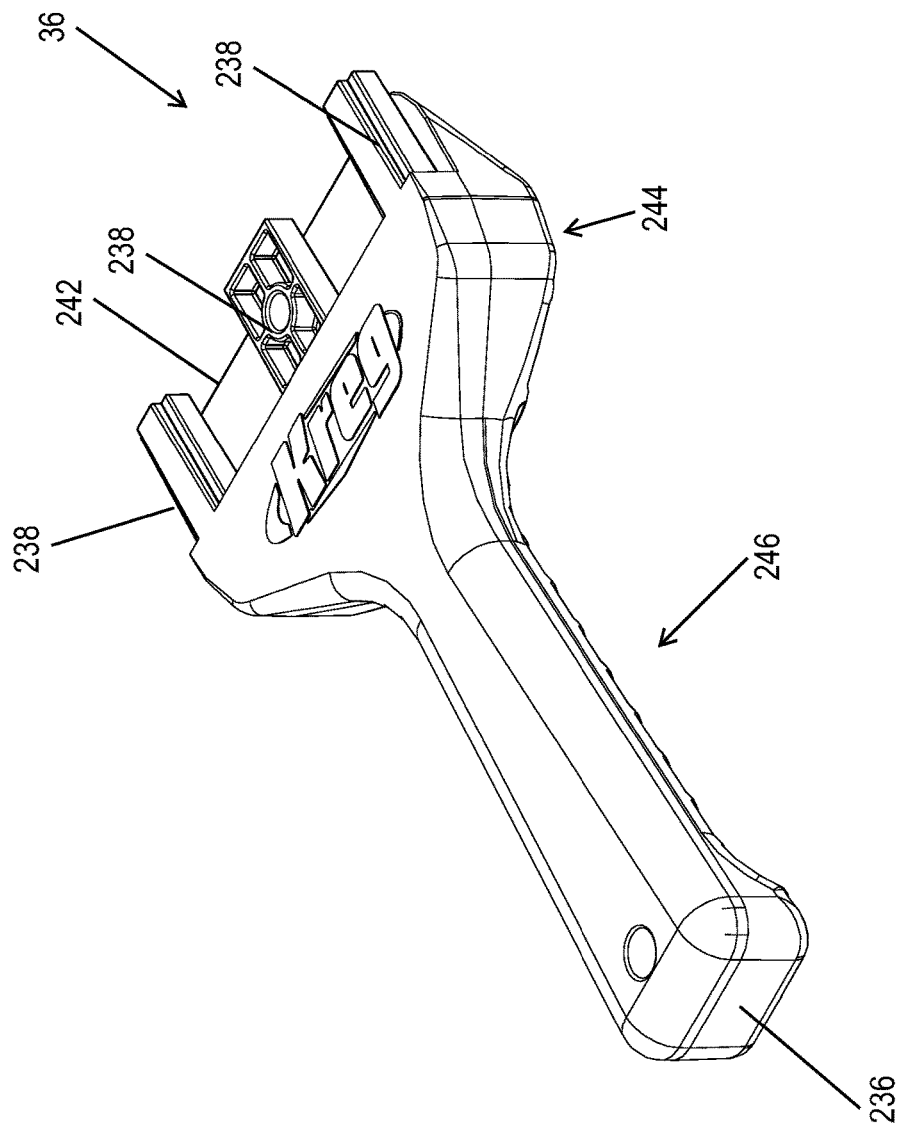
FIG. 43 shows an upper rear right perspective view of the cover member shown in FIGS. 40 and 41, in accordance with one or more embodiments.
Figure 44:
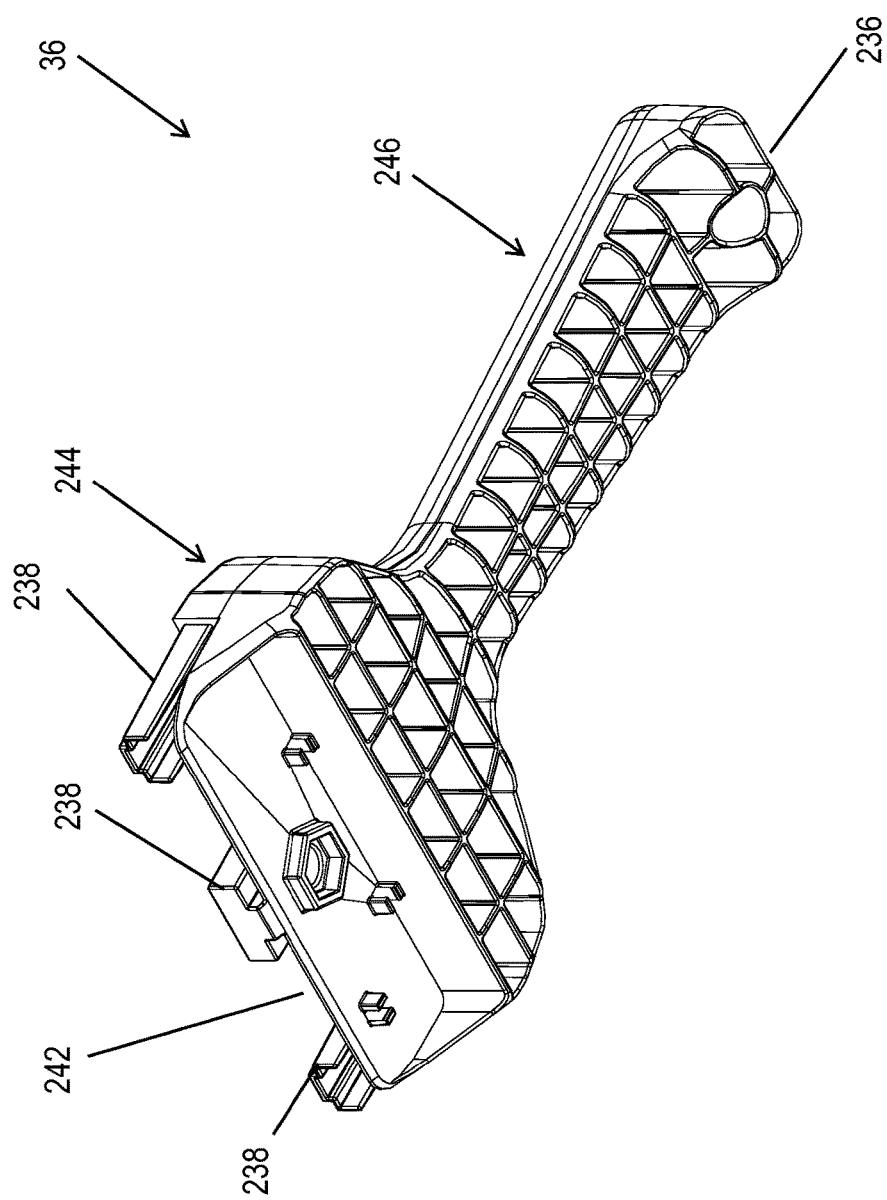
FIG. 44 shows a lower front left perspective view of the cover member shown in FIGS. 40 and 41, in accordance with one or more embodiments.
Figure 45:
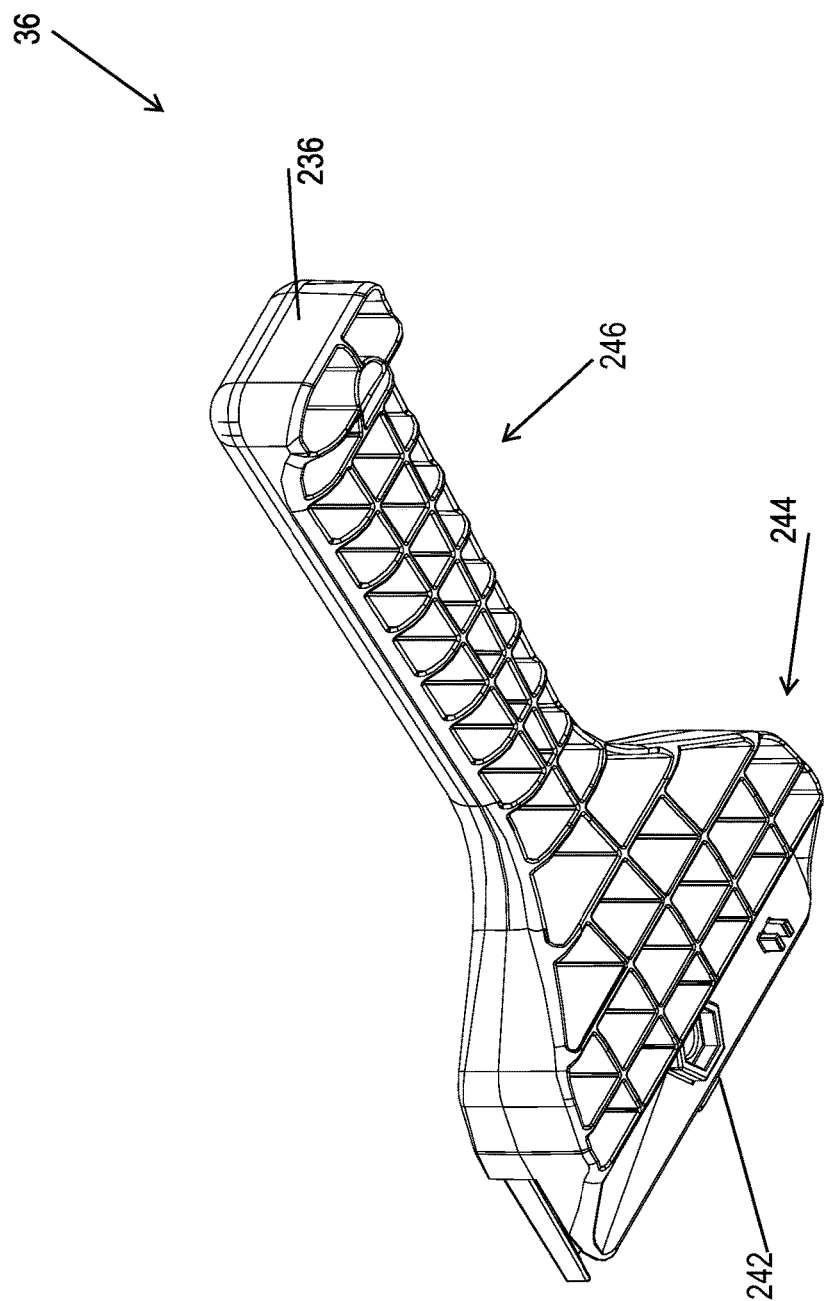
FIG. 45 shows a lower rear left perspective view of the cover member shown in FIGS. 40 and 41, in accordance with one or more embodiments.
Figure 46:
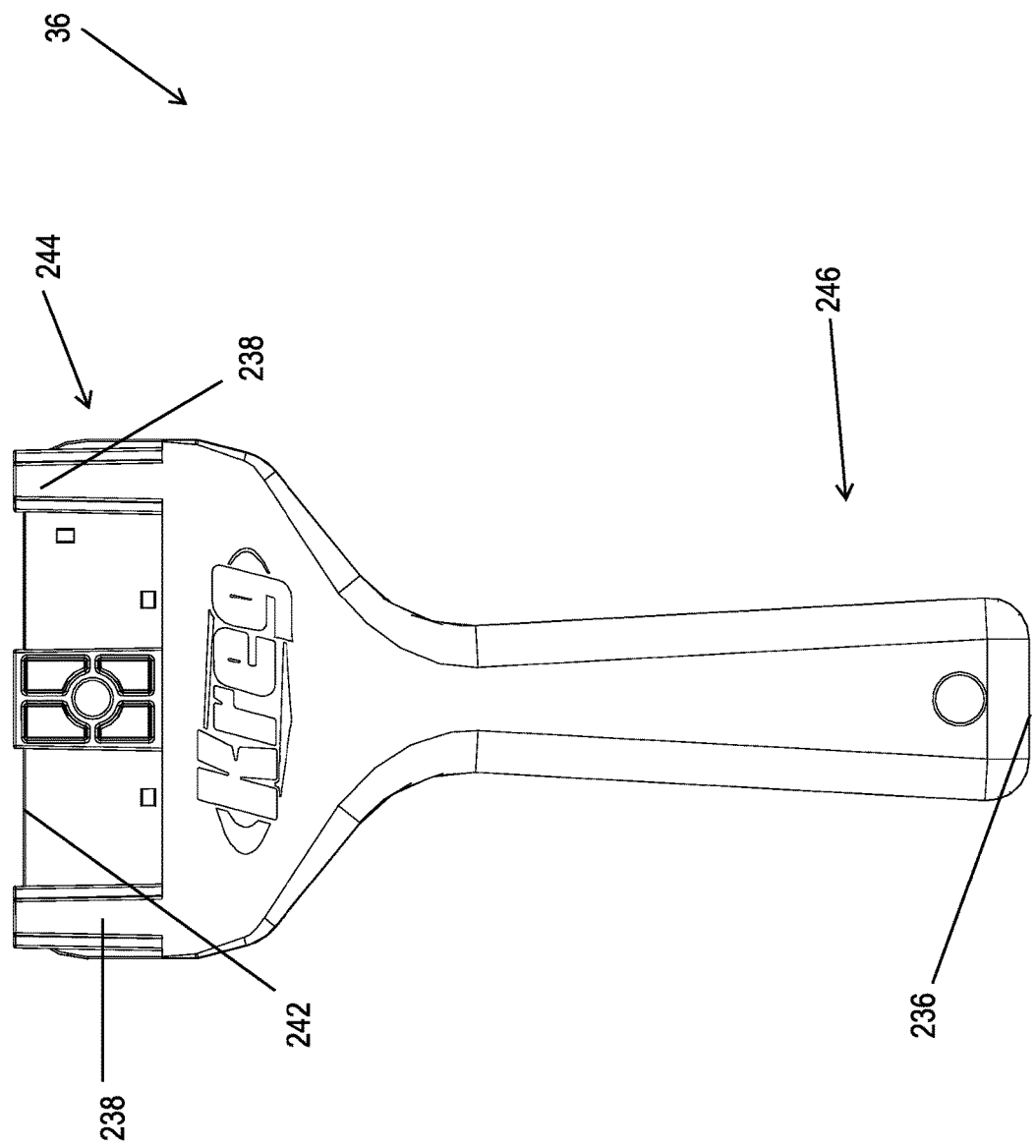
FIG. 46 shows a top view of the cover member shown in FIGS. 40 and 41, in accordance with one or more embodiments.
Figure 47:
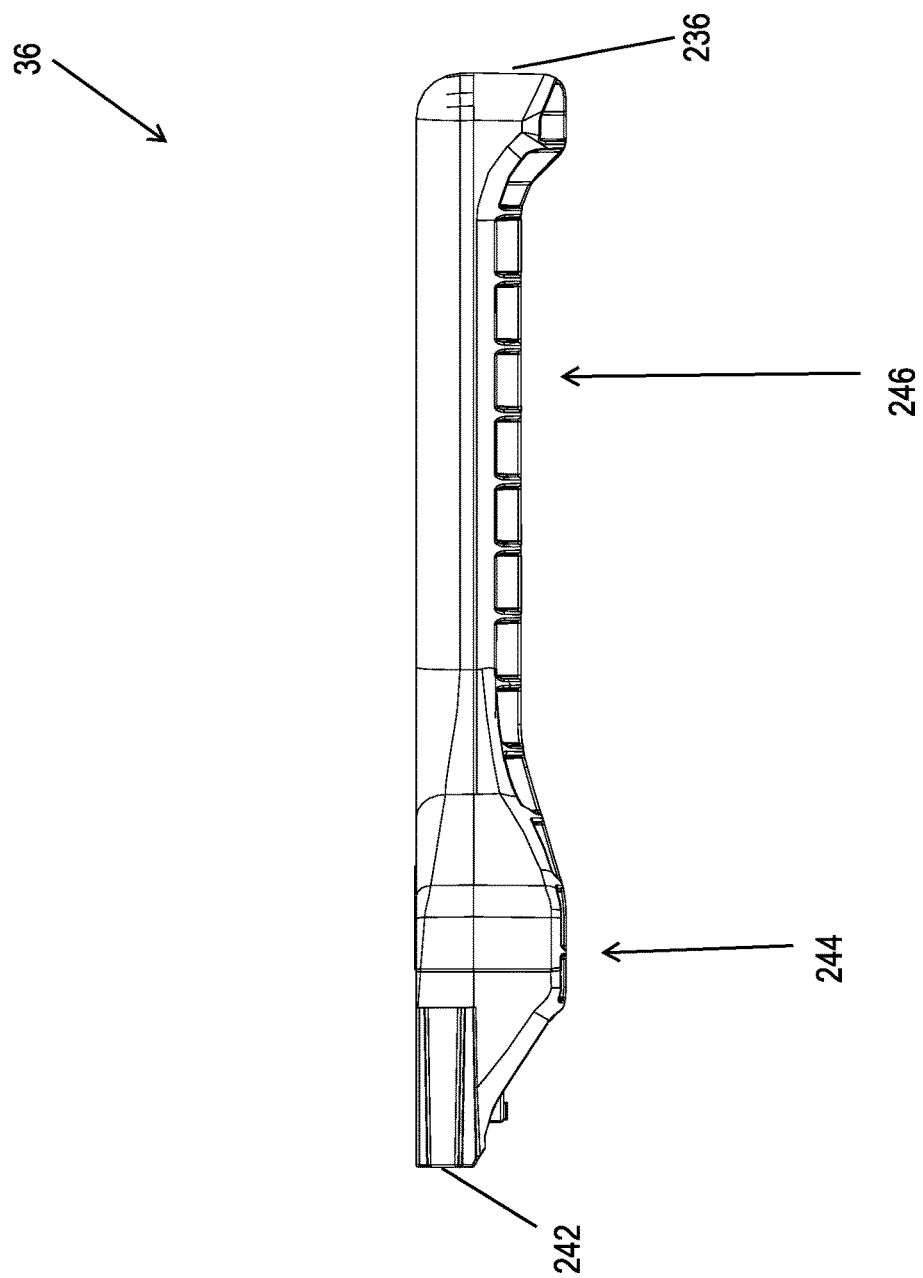
FIG. 47 shows a left side view of the cover member shown in FIGS. 40 and 41, in accordance with one or more embodiments.
Figure 48:
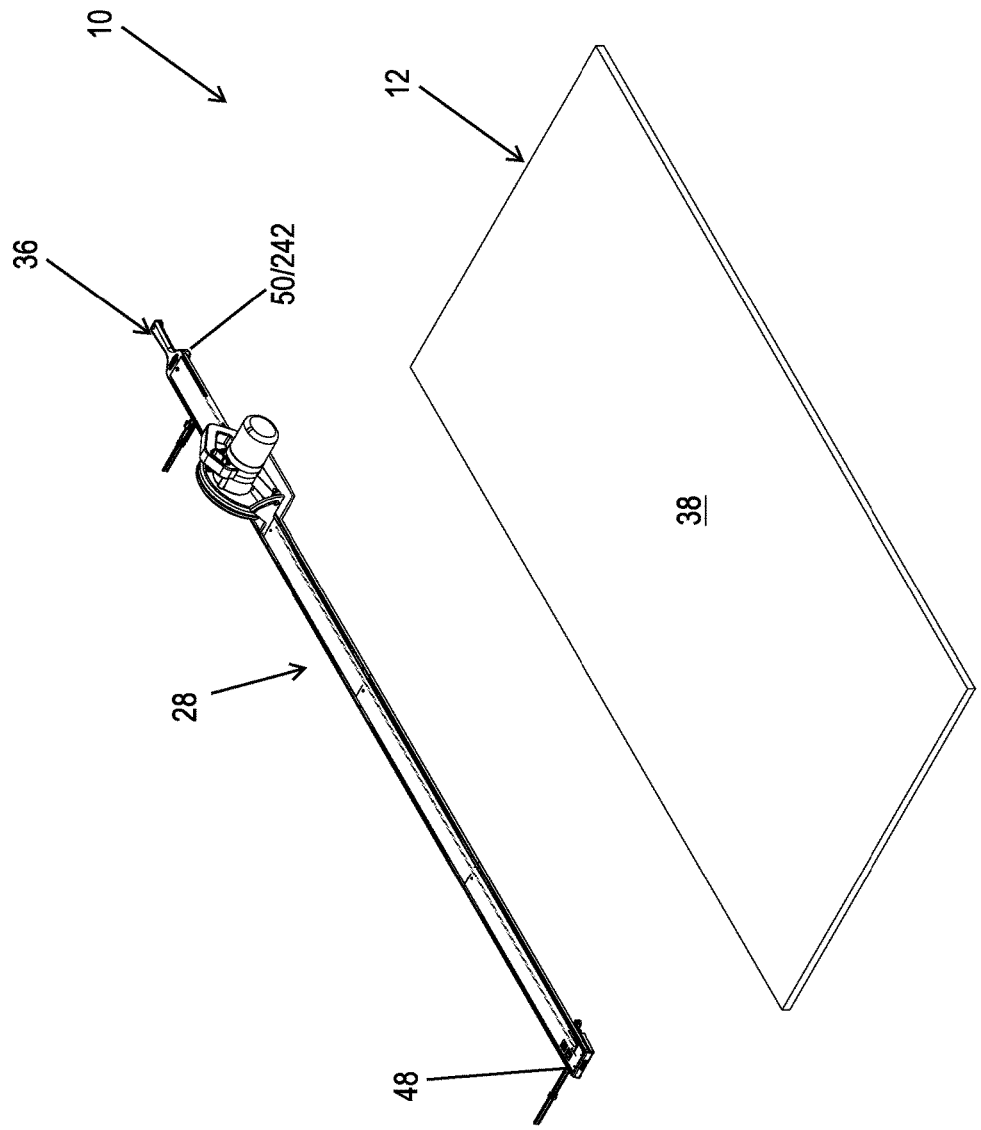
FIG. 48 shows an upper front left perspective view of a workpiece, a straight edge guide system clamped on the workpiece, and a cutting tool, in accordance with one or more embodiments.

Locked Position: As can be seen in FIG. 37, to facilitate selective locking of stop member 32 at any point along the length of guide member 28, the first end 200 of stop member 32 is tilted downward (from the upward-tilted position shown in FIG. 36) until the generally flat plane of the first end 200 of stop member 32 reaches an approximate perpendicular planar alignment to the plane formed by end 48 to end 50 length of guide member 28. In this non-tilted position, or vertical orientation position, of locked position, the portion of slide member 210 positioned within center guide 58 engaged both the lower surface 66 of center guide 58 and the upper surface 64 of center guide 58 thereby locking stop member 32 in place. In this position, stop member 32 is locked in place and is prevented from sliding either forward or back along guide member 28.

In the arrangement shown, as one example, to facilitate this functionality of allowing selective locking and selective sliding, when center guide 58 is a T-shaped slot in guide member 28, slide member 210 has a corresponding size, shape and configuration that is positioned at a tilted orientation. That is, as one example, slide member 210 includes an arm 212 that extends upward from upper surface 204 a distance that connects to outwardly extending wings 214. In this arrangement, arm 212 is sized and shaped to fit within slot 72 of center guide 58 with close and tight tolerances while also allowing for sliding movement. In this arrangement, wings 214 are sized and shaped to fit within the hollow interior 70 of center guide 58 and slide over the lower surface 66 of center guide 58 and slide just inward of the opposing side surfaces 68 of center guide 58. In the arrangement shown, the distance between the upper surface 204 of stop member 32 when stop member 32 is in a free position (where it is tilted forward) and the lower surface of wings 214 is approximately the thickness of the material that forms the lower surface 66 of center guide 58. In this way, slide member 210 provides alignment of stop member 32 to guide member 28 while also allowing for sliding of stop member 32 relative to guide member 28 when stop member 32 is in a free position.

In the arrangement shown, as one example, to facilitate locking as well as sliding of stop member 32 relative to center guide 58 of guide member 28, the portion of slide member 210 positioned within center guide 58 has an upper surface 216 and a lower surface 218 that extend in approximate parallel planar spaced relation to one another and define the upper most and lower most surfaces of the portion of slide member 210 positioned within center guide 58 when stop member 32 is in the free position.

In the arrangement shown, as one example, to facilitate locking as well as sliding of stop member 32 relative to center guide 58 of guide member 28, the portion of slide member 210 positioned within center guide 58 has an opposing forward surface 220 and an opposing rearward surface 222 that extend in approximate parallel planar spaced relation to one another and define the forward most and the rearward most surfaces of the portion of slide member 210 positioned within center guide 58 when stop member 32 is in the free position or locked position.

In the arrangement shown, as one example, to facilitate locking as well as sliding of stop member 32 relative to center guide 58 of guide member 28, the portion of slide member 210 positioned within center guide 58 has an opposing upper lock surface 224 and an opposing lower lock surface 226 that extend in approximate parallel planar spaced relation to one another and define the upper most and the lower most surfaces of the portion of slide member 210 positioned within center guide 58 when stop member 32 is in the locked position.

In the arrangement shown, as one example, the upper lock surface 224 and the lower lock surface 224 extend in approximate perpendicular planar alignment to the forward surface 220 and the rearward surface 222.

In the arrangement shown, as one example, the planes formed by upper lock surface 224 and the lower lock surface 224 extend in at an obtuse angle to the planes formed by upper surface 216 and lower surface 218. In the arrangement shown, as one example, the planes formed by forward surface 220 and rearward surface 222 extend in at an obtuse angle to the planes formed by upper surface 216 and lower surface 218.

In the arrangement shown, as one example, a smooth curve, or cam surface, connects the planar surface of the upper surface 216 to the forward surface 220. Similarly, in the arrangement shown, as one example, a smooth curve, or cam surface, connects the planar surface of the lower surface 218 to the rearward surface 222.

In the arrangement shown, as one example, an angled corner connects the planar surface of the upper surface 216 to the upper stop surface 224. Similarly, in the arrangement shown, as one example, an angled corner connects the planar surface of the lower surface 218 to the lower stop surface 226.

Grip Member 228: In the arrangement shown, as one example, upper lock surface 224 includes a grip member 228. Grip member 228 is formed of any suitable size, shape and design and is configured to provide increased grip onto center guide 58 of guide member 28 to help lock and hold stop member 32 in place when stop member 32 is in a locked position.

In the arrangement shown, as one example, grip member 228 is positioned in and is flush with or extends slightly above upper lock surface 224. In one arrangement, grip member 228 is formed of the same or similar material as grip member 160 and serves the same or a similar purpose as grip member 160. As such, for this reason, the teaching and disclosure related to grip member 160 applies equally to grip member 228, unless stated otherwise, so as to reduce redundancy.

In one arrangement, grip member 228 covers all of the surface of the upper lock surface 224. In another arrangement, grip member 228 covers only a portion of the upper lock surface 224. In one arrangement, grip member 228 is a single continuous member. In another arrangement, multiple grip members 228 are attached to or formed as part of the upper lock surface 224. In one arrangement, grip member 228 is flush with the upper lock surface 224. In another arrangement, grip member 228 protrudes or is proud of the upper lock surface 224.

In one arrangement, as is shown, grip member 228 is a layer of flexible and compressible rubber, foam or similar material that covers the vast majority of the upper lock surface 224. In this arrangement, this layer of material that forms grip member 228 is adhesively attached to the upper lock surface 224. In this arrangement, grip member 228 is formed of a generally square or rectangular shaped member that has an exterior peripheral edge that is slightly smaller than the exterior peripheral edge of the s upper lock surface 224. In the arrangement shown, as one example, grip member 228 is formed of a generally thin planar layer that is either flat or has a series or pattern of recesses therein, however any other configuration or shape or design is hereby contemplated for use.

Any other arrangement or configuration is hereby contemplated for use as grip member 160. Alternatively, or in addition to, a grip member 228 being in the upper lock surface 224, it is hereby contemplated that a grip member 228 may be placed in lower lock surface 226.

Hollow Interior 230: In the arrangement shown, as one example, stop member 32 includes a hollow interior 230. Hollow interior 230 of stop member 32 is similar to, if not identical to, hollow interior 156 of housing 138 of clamp member 30. As such, for this reason, unless explicitly stated otherwise, the disclosure and teaching related to hollow interior 156 of housing 138 applies equally to hollow interior 230 of stop member 32.

That is, hollow interior 230 is formed of any suitable size, shape and design and is configured to receive and allow body 158 of blade offset member 34 to extend and slide therethrough. In the arrangement shown, as one example, hollow interior 230 is a generally square or rectangular shaped opening that extends through stop member 32 from side surface 208 to side surface 208. However, any other size, shape and design is hereby contemplated for use. In one arrangement, the size, shape and design and configuration of hollow interior 230 is dictated by or conforms to the size, shape and design and configuration of blade offset member 34.

In the arrangement shown, as one example, when straight edge guide system 10 is placed on a workpiece 12 and workpiece 12 is clamped, the first end 200 of stop member 32 engages the rear edge 44 of workpiece 12. In one arrangement, to ensure stop member 32 and the other components of clamp member 30 have the needed structural strength and rigidity needed for operation and long life, the components of stop member 32 are formed of a strong and rigid material such as a metallic material or a plastic material or a composite material or an ultra-high molecular weight material (UHMW), or a fiberglass material, or a nylon material, or any other form or a material or combination thereof or the like. While use of a strong and rigid and hard material provides the needed strength and rigidity for stop member 32, hard and rigid materials tend to have low coefficients of friction. This means that when the first end 200 of stop member 32 engages the rear edge 44 of workpiece 12 (which itself has a relatively low coefficient of friction due to its hardness) the workpiece 12 has a tendency to slip, which can lead to inaccurate cuts not to mention being dangerous.

To overcome this potential to slip, in one arrangement the user may over-clamp the workpiece 12. That is, the user can attempt to overcome the potential for slippage by applying maximum clamping pressure on workpiece 12. This is undesirable as applying maximum clamping pressure requires strength and effort, applying maximum clamping pressure has a tendency to damage the workpiece 12, applying maximum clamping pressure causes wear and tear on the straight edge guide system 10, among multiple other disadvantages.

In one arrangement, to overcome this potential to slip, the first end 200 of stop member 32 that engages workpiece 12 may be abraded, roughened, patterned, or otherwise amended to physically impart additional friction on the rear edge 44 of workpiece 12. Alternatively, to overcome this potential to slip, the first end 200 of stop member 32 that engages workpiece 12 may include pins, nails, points or another penetration device to physically impart additional friction on the rear edge 44 of workpiece 12.

While this arrangement may be effective at increasing friction on workpiece 12 and reducing the potential for slippage, this arrangement has its drawbacks. Namely, increasing friction by providing abrasions or points in the first end 200 of stop member 32 causes marks, indentations, and/or damage to workpiece 12 which may be highly undesirable in many applications.

Grip Member 232: In one arrangement to provide both desired grip as well as desired structural rigidity, while also preventing damage to workpiece 12, first end 200 of stop member 32 includes a grip member 232.

Grip member 232 of stop member 32 is similar to, if not identical to, grip member 160 of housing 138. As such, for this reason, unless explicitly stated otherwise, the disclosure and teaching related to grip member 160 of housing 138 applies equally to hollow interior 230 of stop member 32. In fact, in the arrangement shown, as one example, first end 200 and grip member 232 of stop member 32 is a mirror-image of the second end 142 and grip member 160 of housing 138 with one noticeable difference being the presence of relief 234.

Relief 234: Relief 234 is formed of any suitable size, shape and design and is configured to provide room for stop member 32 to tilt forward so as to allow stop member 32 to move from a locked position to a free position. In the arrangement shown, as one example, relief 234 is an angled recessed that extends from upper surface 204 downward and forward at an angle to first end 200, or the front end of stop member 32 and grip member 232. In this way, relief 234 angles off or chamfers or removes the upper-forward corner of stop member 32 below guide member 28. In this way, relief 234 removes the portion of stop member 32 that would engage the lower surface 54 of guide member 28 when stop member 32 tilts forward to move from a locked position to a free position.

In the arrangement shown, as one example, relief 234 forms a generally flat surface that extends at approximately a forty-five degree angle with the planar surface of first end 200 of stop member 32 as well as extends at approximately a forty-five degree angle with the planar surface of upper surface 204 of stop member 32.

In the arrangement shown, as one example, relief 234 terminates at the outward sides of arms 212 as relief 234 is not needed at the position of arm 212 as arm 212 fits within the slot 72 of center guide 58 when stop member is tilted forward in a free position. In the arrangement shown, as one example, relief 234 terminates a distance inward from side surfaces 208 of stop member 32 as stop member 32 is slightly wider than guide member 28 and relief 234 is not needed on the portions of stop member that extend past the side surfaces 56 of guide member 28.

Any other size, shape and design and configuration is hereby contemplated for use as relief 234.

Cover Member 36:

In the arrangement shown, as one example, straight edge guide system 10 includes a cover member 36. Cover member 36 is formed of any suitable size, shape and design and is configured to close second end 50 of guide member 28. In the arrangement shown, as one example, cover member 36 tapers inward slightly as it extends from second end 50 to its rearward end 236. In the arrangement shown, as one example, cover member 36 also tapers vertically as it extends from second end 50 to its rearward end 236. In this way, cover member 36 facilitates a smooth transition to second end 50 of guide member 28. In the arrangement shown, as one example, cover member includes one or more protrusions 238 that are configured to be inserted within openings in guide member 28 that facilitate connection to and fastening of cover member 36 to guide member 28. As one example, in the arrangement shown, cover member 36 includes three protrusions 238, one that fits within center guide 58 and one that fits within each edge guide 60. However, any other size, shape or design or configuration is hereby contemplated for use as cover member 36.

Calibration Method:

In the arrangement shown, as one example stop feature 178 serves to calibrate blade offset member 34 (whether blade offset member 34 is attached to clamp member 30 or stop member 32) to precisely identify the location of the cut line for the blade 162 of cutting tool 14 so that the straight edge guide system 10 can be precisely placed on a workpiece 12.

Straight edge guide system 10 is configured to be use with practically any cutting tool 14. The width of baseplate 166 of cutting tools 14 varies greatly and as such the position of blade 162, and therefore the position of the cut line, varies greatly. As such, to precisely identify where the cut line will be on a workpiece 12 blade offset member 34 is calibrated to the cutting tool 14.

In one arrangement, blade offset member 34 is calibrated by placing an edge of the baseplate 166 of the cutting tool 14 in flat and flush aligned engagement with a side surface 56 of guide member 28. Once in this position, blade offset member 34 is fully extended through clamp member 30 or stop member 32 until the exterior surface of head 176 of body 158 is in flat and flush engagement with the nearest side of blade 162. Once in this position, stop feature 178 is slid all the way forward, away from first end 168 and toward second 170 (towards head 176) until an end 180 of stop feature 178 engages a side surface 148/208 of clamp member 30 or stop member 32. Once in this position, lock member 190 is tightened by rotating head 192 thereby forcing the end of shaft 194 to engage the side of center member 172 of body 158 of blade offset member 34 thereby locking stop feature 178 in place upon the body 158 of blade offset member 34. This defines the outward-most position that blade offset member 34 may travel, which corresponds to the position of the cut line when using the calibrated cutting tool 14.

In one arrangement, blade offset member 34 is calibrated by clamping straight edge guide system 10 to a workpiece 12. Once straight edge guide system 10 is clamped to a workpiece 12, a cutting operation is performed using cutting tool 14. That is, an edge of the baseplate 166 of cutting tool 14 is placed against a side surface 56 of guide member 28 in flat and flush aligned engagement. Next, a cutting operation is performed by powering cutting tool 14 which rotates blade 162 as the cutting tool 14 is pushed along the length of workpiece 12 which an edge of baseplate 166 slides along a side surface 56 of guide member 28 in flat and flush aligned engagement until the entire workpiece 12 is cut through. Once the test cut is performed, without moving or removing the straight edge guide system 10, the blade offset member 34 is fully extended through clamp member 30 or stop member 32 until the exterior surface of head 176 of body 158 is in flat and flush engagement with the cut line or cut edge of workpiece 12. Once in this position, stop feature 178 is slid all the way forward, away from first end 168 and toward second 170 (towards head 176) until an end 180 of stop feature 178 engages a side surface 148/208 of clamp member 30 or stop member 32. Once in this position, lock member 190 is tightened by rotating head 192 thereby forcing the end of shaft 194 to engage the side of center member 172 of body 158 of blade offset member 34 thereby locking stop feature 178 in place upon the body 158 of blade offset member 34. This defines the outward-most position that blade offset member 34 may travel, which corresponds to the position of the cut line when using the calibrated cutting tool 14.

Once calibrated, the blade offset member may slide freely through the clamp member 30 or stop member 32 that it is attached to between a fully retracted position and a fully extended position. In a fully retracted position, the interior surface of head 176 engages a side surface 148/208 of clamp member 30 or stop member 32. In a fully extended position, the end 180 of stop feature 178 (which is locked to body 158 of blade offset member 34) engages a side surface 148/208 of clamp member 30 or stop member 32.

In Operation:

In the arrangement shown, as one example, straight edge guide system 10 is used to cut a workpiece 12 using a cutting tool 14 in the following manner.

First a generally planar workpiece 12 is obtained. To perform the cutting operation, workpiece 12 may be placed on the ground, on top of a sacrificial board, on top of a work bench, on top of saw horses, or on any other support or surface.

Next, the user measures the workpiece 12 to determine where the cut line should be placed. In one arrangement, the user places a measured mark 164 at the desired position of the cut line across the entire upper surface 38 of workpiece 12 using a straight edge. Alternatively, the user only places the measured mark 164 at the front edge 42 and rear edge 44 of workpiece 12.

Next, the user places straight edge guide system 10 on the upper surface 38 of workpiece 12. Care is taken to ensure that the workpiece 12 is positioned between clamp member 30 and stop member 32 of straight edge guide system 10. If additional length is needed, stop member 32 may be moved rearward by tilting the lower end 206 of stop member 32 toward clamp member 30 which transitions stop member 32 from a locked position to a free position. Once in the free position, stop member 32 may be slid rearward upon center guide 58 until the proper position is achieved. If additional length is needed, additional sections 76 may be added to guide member 28 using connection members 74.

Next, once the lower surface 54 of guide member 28 is placed on the upper surface 38 of workpiece 12 with clamp member 30 just forward of the front edge 42 of workpiece 12 and stop member 32 just rearward of rear edge 44 of workpiece 12, the initial alignment step is performed.

This is accomplished by the user extending the calibrated blade offset members 34 all the way forward toward the measured mark. To accomplish this, the user pushes the first end 168 of body 158 of blade offset members 34 toward housing 138 of clamp member 30 or stop member 32 until the end 180 of stop feature 178 engages the side surface 148/208 at which point blade offset member 34 is fully extended. Alternatively, to accomplish this, the user pulls the second end 170 or head 176 of body 158 of blade offset members 34 away from housing 138 of clamp member 30 or stop member 32 until the end 180 of stop feature 178 engages the side surface 148/208 at which point blade offset member 34 is fully extended. In this position, the outward edge of the head 176 of the outwardly extended blade offset members 34 indicate where the cut line will be when a cutting operation is performed.

Next, the user slides the guide member 28 laterally across the upper surface 38 of workpiece 12 until the outward edge of the outwardly extended blade offset members 34 of clamp member 30 and stop member 32 precisely align with the measured mark 164 at the front edge 42 and rear edge 44 of workpiece 12.

Next, once the user has roughly placed the guide member 28 in the proper position to perform a cut, with the lower surface 54 of guide member 28 placed on the upper surface 38 of workpiece 12 with clamp member 30 forward of the front edge 42 of workpiece 12 and stop member 32 rearward of rear edge 44 of workpiece 12, the clamping operation is performed.

The user pulls the second end 50 of guide member 28 and/or cover member 36 rearward a distance. This application of force and/or rearward movement of guide member 28 causes clamp member 30 to compress. Or, more specifically, this application of force and/or rearward movement of guide member 28 causes bias member 108, which in the arrangement shown is one or more springs, which is positioned between the first section 104 and second section of clamp member 30 to compress. As bias member 108 compresses, second section 106 of clamp member 30 slides into first section 104 of clamp member 30. The greater the amount of force applied to guide member 28 pulling guide member 28 rearward, the greater the amount of compression of bias member 108.

As the user pulls the second end 50 of guide member 28 rearward, the user simultaneously slides stop member 32 forward toward rear edge 44 of workpiece 12 while stop member 32 is in a forward-tilted free position. Essentially, in doing so, as all of the slack provided by the compression of the clamp member 30 is taken up by the stop member 32 being moved forward.

Once full force has been applied to guide member 28, and clamp member 30 has been compressed to the desired amount, the user releases stop member 32 and allows stop member 32 to move from a free position, wherein the lower end 206 of stop member 32 is tilted forward, to a locked position, wherein the first end 200 of stop member 32 extends in a generally perpendicular manner to the plane formed by the bottom surface of guide member 28, and the first end 200 of stop member 32 extends in a generally parallel manner to the plane formed by the rear edge 44 workpiece 12. In this vertical orientation, the upper lock surface 224, and its grip member 228, if present, engage the upper surface 64 of center guide 58 while simultaneously the lower lock surface 226, and its grip member 228, if present, engage the lower surface 66 of center guide 58. In this position, stop member 32 is fully locked in place and will not move rearward upon application of force from clamp member 30. In fact, one of the benefits of the straight edge guide system 10 is that the locked position of stop member 32 is self-reinforcing. That is, the greater the amount of force applied to the stop member 32 when it is in the locked position, the greater the amount of hold.

Once in this position, the user releases the second end 50 of guide member 28 and the bias member 108 of clamp member 30 applies its compressed force onto the front edge 42 of workpiece 12 which transferred this force onto the stop member 32 through rear edge 44. In this position, workpiece 12 is clamped between clamp member 30 and stop member 32.

Notably, in this position the grip member 160 of clamp member 30 and the grip member 232 of stop member 32, which are slightly compressible in nature and have a high grip-factor or high coefficient of friction, act to securely hold workpiece 12 in place without any slippage.

Once in this position, the user re-checks that the blade offset members 34 precisely align with the measured mark 164. If they do, the user performs the cutting operation. If they do not, the clamping operation can be performed again. Or, alternatively, fine adjustments may be made.

To perform the cutting operation, first the user ensures that the blade offset members 34 are moved to the retracted position and out of the way of the cutting operation. This may be accomplished by pushing on the head 176 of body 158 or by pulling on the first end 168.

Once the blade offset members 34 are out of the way, the user places the baseplate 166 of cutting tool 14 on the upper surface 38 of workpiece 12. Next, the user slides the cutting tool 14 until the edge of baseplate 166 engages the side surface 56 of guide member 28. In this position the cutting operation is ready to be performed. As such, the user powers the cutting tool 14 and slides the cutting tool along the length of the workpiece 12 while maintaining engagement between the side of baseplate 166 and side surface 56 of guide member 28. In this way a cut is precisely performed using straight edge guide system 10.

To remove the straight edge guide system 10 the user may simply pull the second end 50 rearward while applying enough force to cause bias member 108 in clamp member 30 to compress. Once enough clearance is provided between rear edge 44 of workpiece 12 and first end 200 of stop member 32, the second end of guide member 28 may be lifted up until clearance is provide between stop member 32 and workpiece 12. Alternatively, to remove the straight edge guide system 10 the user may simply pull the second end 50 rearward while applying enough force to cause bias member 108 in clamp member 30 to compress. Once enough clearance is provided between rear edge 44 of workpiece 12 and first end 200 of stop member 32, the user tilts the lower end 206 of stop member 32 and tilts the stop member 32 forward from a locked position to a free position. Once in the free position, the user slides the stop member 32 rearward thereby providing sufficient clearance. Once sufficient clearance is provided, the user may release the force on guide member 28 and the straight edge guide system 10 may be removed.

One of the substantial benefits of the straight edge guide system 10 is that the clamping can be performed all on one side of the workpiece 12, and that side is the user's side. This eliminates the user from having to clamp both sides of the workpiece 12.

Another substantial benefit of the straight edge guide system 10 is that it eliminates the protruding bars and handles of conventional project clamps that tend to get in the way of a cutting operation.

That is, for these reasons, the straight edge guide system 10 is easier to use, faster to use and safer to use than prior art systems.

Singles and Multiples:

In the arrangement shown, as one example, where one of something is presented, it is hereby contemplated that multiples are contemplated. Similarly, in the arrangement shown, as one example, where multiples of something is presented, it is hereby contemplated that one is contemplated. As one example, a single slide member 210 is presented on stop member 32 that slides in a single center guide 58. It is hereby contemplated that stop member 32 may include two or more slide members 210 that fit within a corresponding number of guides in guide member 28.

Blade Offset Member Above Guide Member:

A blade offset member 34 is shown in association with the clamp member 30 at the forward most end of guide member 28, and a blade offset member 34 is shown in association with the stop member 32 at the rearward end of the workpiece 12. Especially for long cuts it may be desired to have a measurement at the middle or between clamp member 30 and stop member 32. To facilitate this, in one arrangement, one or more additional blade offset members are hereby contemplated for use. These additional blade offset members 34 may extend above guide member 28 or through guide member 28 or are associated with guide member 28 in any other manner.

Spring Loaded Blade Offset Members:

In the arrangement shown, as one example, a user must manually retract blade offset members 34 after a measurement is performed and before a cutting operation is performed. In one arrangement, blade offset members 34 are spring loaded and naturally move rearward and out of the way of a cutting operation.

Alternative Arrangement(s):

With reference to FIGS. 40-48 various additional features and alternatives of straight edge guide system 10 are presented. Some components of the system presented in FIGS. 40-48 are similar to components of the system 10 presented in FIGS. 1-39 and therefore all of the teaching presented herein with respect to FIGS. 1-39 applies equally to and is incorporated into the system 10 presented in FIGS. 40-48 unless specifically stated otherwise.

In the arrangement shown in FIGS. 40-48, as one example, straight edge guide system 10 a guide member 28, a clamp member 30, a stop member 32, a blade offset member 34, a cover member 36, among other parts and is similar to system 10 shown in FIG. 1-39 with the primary difference being cover member 360 as is described herein.

Alternative Cover Member 36:

In the arrangement shown, as one example, straight edge guide system 10 includes a cover member 36 having a handle to facilitate easy placement and clamping of straight edge guide system 10 on a workpiece 12. In the arrangement shown, as one example, cover member 36 has a forward section 244 configured to connect to second end 50 and a rearward section 246 configured to operate as a handle.

In this example arrangement, forward section 244, tapers inward from sides as it extends from forward end 242 rearward section 246. In this way, cover member 36 facilitates a smooth transition from second end 50 of guide member 28 to rearward section 246. Rearward section 246 is formed of any suitable size, shape, and design, and is configured to serve as a handle. In the arrangement shown, as one example, rearward section 246 has an elongated shape extending rearward from forward section 244 to rearward end 236 of cover member 36. In this example arrangement, rearward section 246 has curved edges to facilitate comfortable grip when held in a hand of an operator.

In the arrangement shown, as one example, forward section 244 of cover member 36 includes one or more protrusions 238 that are configured to be inserted within openings in guide member 28 that facilitate connection to and fastening of cover member 36 to guide member 28. As one example, in the arrangement shown, forward section 244 of cover member 36 includes three protrusions 238, one that fits within center guide 58 and one that fits within each edge guide 60. However, any other size, shape or design or configuration is hereby contemplated for use as cover member 36.

In operation, an operator may position system 10 so clamp member 30 at first end 48 of guide member 28 engages front edge 42 of workpiece 12. Using the handle shaped rearward section 246 of cover member, the operator, pull the system toward the operator, which tensions bias members 108 of clamp member 30, until stop member 32 is able to pull over rear edge 44 of workpiece 12. Once stop member 32 is positioned over rear edge 44 of workpiece 12. The operator can allow the bias member 108 to pull the system 10 and stop member 32 back toward the rear edge to clamp the workpiece 12 between the claim member 30 stop member 32.

From the above discussion it will be appreciated that the improved straight edge guide system 10 and related methods of use, presented herein improves upon the state of the art.

Specifically, the improved straight edge guide system 10 and related methods of use presented: is safe to use; is efficient to use; is relatively inexpensive; is capable of making long straight cuts; is accurate; is efficient to use; provides precise alignment for a cutting tool; can be used with workpieces with a wide range of thicknesses; can be used with workpieces with a wide range of lengths; can be used with workpieces with a wide range of widths; is unique; is easy to learn how to use; is relatively small in size and shape; provides the benefits of a circular saw and a table saw in a single device; holds workpieces in a firm and rigid manner; is easy to set up; is easy to take down; is easy to precisely adjust; can be precisely matched to the blade of a cutting tool; is formed of a minimum number of parts; is simple to use; is easier to use than prior art systems; is more-accurate to use than prior art systems; provides new capabilities to existing tools; has a robust design; is high quality; is durable; has a long useful life; provides accurate and clean cuts; saves time; is fun to use; can be used with workpieces of practically any material; is easily portable and can be used on a job site; makes it easier to measure cuts; makes measuring more repeatable than prior art systems; and/or can be used with practically any cutting tool, among countless other advantages and improvements.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof

What is claimed is:

1. A straight edge guide system, comprising:
a guide member;
the guide member extending a length from a first end to a second end;
the guide member having an upper surface and a lower surface;
a clamp member;
the clamp member operably connected to the guide member;
a stop member;
the stop member operably connected to the guide member;
the stop member having a front surface;
wherein the stop member is configured to tilt relative to the upper surface of the guide member between a free position and a locked position;
wherein the front surface of the stop member extends at a first angle relative to the upper surface of the guide member when the stop member is in the free position;

wherein the front surface of the stop member extends at a second angle relative to the upper surface of the guide member when the stop member is in the locked position;

wherein the stop member is configured to slide along a length of the guide member when the stop member is in the free position;

wherein when the guide member is placed on an upper surface of a workpiece, the clamp member is configured to apply a first bias force to a first edge of the workpiece and the stop member is configured to tilt to the locked position, engage a second edge of the workpiece, which is opposite the first edge, and apply a second bias force in opposing direction to the first bias force, thereby clamping the workpiece between the clamp member and the stop member;

a first blade offset member;

wherein the first blade offset member is movable between an extended position and a retracted position;

wherein the first blade offset member has a stop feature;

wherein the stop feature is configured to connect with the first blade offset member;

wherein the stop feature is repositionable along the first blade offset member;

wherein the stop feature includes a lock member configured to secure the stop feature in a desired position along the first blade offset member to set a distance that the first blade offset member can be extended to when in the extended position;

wherein while the stop feature is secured to the first blade offset member in the desired position, the stop feature is configured to:
move with the first blade offset member, when the first blade offset member is moved between the extended position and the retracted position, and
physically engage the guide member or a structure operably connected thereto to restrict the distance that the first blade offset member may be moved from the retracted position.

2. The system of claim 1, further comprising:
a cutting tool;
the cutting tool having a blade;
the blade of the cutting tool configured to cut the workpiece along a cut line;
the cutting tool aligned with the guide member;
the first blade offset member operatively connected to the clamp member;
the first blade offset member having a body that slides inward and outward from the clamp member between an extended position and a retracted position;
wherein when the body of the first blade offset member is in the extended position, the body of the first blade offset member identifies the location of the cut line of the cutting tool;
wherein when the body of the first blade offset member is in the retracted position, the body of the first blade offset member is out of the way of the blade of the cutting tool;
wherein when the guide member is placed on an upper surface of the workpiece, the body of the first blade offset member is moved to the extended position thereby identifying the cut line of the cutting tool.

3. The system of claim 2, further comprising:
a second blade offset member;
the second blade offset member operatively connected to the stop member;
the second blade offset member having a body that slides inward and outward from the stop member between an extended position and a retracted position;
wherein when the body of the second blade offset member is in the extended position, the body of the second blade offset member identifies the location of the cut line of the cutting tool;
wherein when the body of the second blade offset member is in the retracted position, the body of the second blade offset member is out of the way of the blade of the cutting tool.

4. The system of claim 1, further comprising:
wherein the first blade offset member is connected adjacent the first end of the guide member;
wherein the lock member is a set screw.

5. The system of claim 1, further comprising:
wherein the first blade offset member is configured to be aligned adjacent a front edge of the workpiece.

6. The system of claim 5, further comprising:
a second blade offset member having a body that extends outward from the second blade offset member;
wherein the second blade offset member is configured to be aligned adjacent a rear edge of the workpiece.

7. The system of claim 1, further comprising:
a cutting tool;
the cutting tool having a blade;
the cutting tool having a baseplate;
wherein an edge of the guide member is configured to contact and guide a side of the baseplate of the cutting tool.

8. The system of claim 1, further comprising:
a cutting tool;
the cutting tool having a blade;
the cutting tool having a baseplate;
wherein when the guide member is clamped onto the workpiece, the guide member guides the baseplate of the cutting tool while the cutting tool performs a cutting operation on the workpiece.

9. The system of claim 1, wherein the clamp member includes at least one spring.

10. The system of claim 1, wherein the workpiece is clamped between the clamp member and the stop member when a user pulls an end of the guide member while the user slides the stop member toward the workpiece and toward the clamp member.

11. The system of claim 1, wherein the stop member slides along a slot in the guide member.

12. The system of claim 1, wherein when the stop member is in the free position the front surface of the stop member is tilted toward the workpiece.

13. The system of claim 1, wherein when the stop member is in the locked position the front surface of the stop member extends in a perpendicular manner to a length of the guide member.

14. The system of claim 1, further comprising:
the guide member having a center guide;
the stop member having at least one grip member;
wherein the at least one grip member engages the center guide of the guide member when the stop member is in the locked position, thereby holding the stop member in the locked position.

15. The system of claim 1, further comprising the guide member having a center guide and the stop member having at least one grip member that engages the center guide of the guide member when the stop member is in the locked position, wherein the grip member has a coefficient of friction that is higher than the coefficient of friction of other portions of the stop member.

16. The system of claim 1, wherein the first angle at which the front surface of the stop member extends relative to the upper surface of the guide member is an acute angle and the second angle is greater than the first angle.

17. A straight edge guide system, comprising:
a guide member;
the guide member having an upper surface and a lower surface;
a clamp member;
the clamp member connected to the guide member;
a stop member;
the stop member connected to the guide member;
the stop member having a front surface;
wherein the stop member is configured to tilt relative to the upper surface of the guide member between a free position and a locked position;
wherein the front surface of the stop member extends at a first angle relative to the upper surface of the guide member when the stop member is in the free position;
wherein the front surface of the stop member extends at a second angle relative to the upper surface and the lower surface of the guide member when the stop member is in the locked position;
the stop member configured to slide along a length of the guide member when the stop member is in the free position; wherein when the guide member is placed on an upper surface of a workpiece, the workpiece is clamped between the clamp member and the stop member by a user pulling the guide member such that the clamp member moves toward the workpiece, while the user slides the stop member toward the clamp member and the stop member tilts to the locked position;
a cutting tool;
the cutting tool having a blade;
the blade of the cutting tool configured to cut the workpiece along a cut line;
the clamp member having a first blade offset member;
wherein, when the workpiece is clamped between the clamp member and the stop member, the first blade offset member is movable between a first extended position and a first retracted position;
wherein the first blade offset member has a first stop feature;
wherein the first blade offset member extends through an opening in the stop feature;
wherein the stop feature is repositionable along the first blade offset member;
wherein the first stop feature has a lock member configured to secure the stop feature in a desired position along the first blade offset member to set a distance that the first blade offset member is extended when moved to the first extended position;
wherein when in the first extended position an outward end of the first blade offset member indicates the cutline of the cutting tool.

18. The system of claim 17, wherein the clamp member includes at least one spring.

19. The system of claim 17, wherein the workpiece is clamped between the clamp member and the stop member under a bias force, wherein the bias force is a spring force.

20. The system of claim 17, wherein the stop member slides along a slot in the guide member.

21. The system of claim 17, wherein when the stop member is in the free position the front surface of the stop member is tilted toward the workpiece.

22. The system of claim 17, wherein when the stop member is in the locked position the front surface of the stop member extends in a perpendicular manner to a length of the guide member.

23. The system of claim 17, further comprising:
the guide member having a center guide;
the stop member having at least one grip member;
wherein the at least one grip member engages the center guide of the guide member when the stop member is in the locked position, thereby holding the stop member in the locked position.

24. The system of claim 17, further comprising the guide member having a center guide and the stop member having at least one grip member that engages the center guide of the guide member when the stop member is in the locked position, wherein the grip member has a coefficient of friction that is higher than the coefficient of friction of the other portions of the stop member.

25. The system of claim 17, further comprising:
the stop member having a second blade offset member;
wherein the second blade offset member slides outward to identify the cut line of the cutting tool.

26. The system of claim 17, wherein when the guide member is clamped onto the workpiece, an edge of the guide member contacts and guides a baseplate of the cutting tool while performing a cutting operation.

27. The system of claim 17, wherein the first angle at which the front surface of the stop member extends relative to the upper surface of the guide member is an acute angle and the second angle is greater than the first angle.

28. A straight edge guide system used in connection with a cutting tool having a blade configured to cut a workpiece along a cut line, comprising:
a guide member;
the guide member extending a length from a first end to a second end;
the guide member having an upper surface and a lower surface;
a clamp member;
the clamp member operably connected to guide member;
a stop member;
the stop member operably connected to a first guide in the guide member;
the stop member having a front surface;
wherein the stop member is configured to tilt relative to the upper surface of the guide member between a free position and a locked position;
wherein the front surface of the stop member extends at a first angle relative to the upper surface of the guide member when the stop member is in the free position;
wherein the front surface of the stop member extends at a second angle relative to the upper surface of the guide member when the stop member is in the locked position;
wherein the second angle is perpendicular to the lower surface of the guide member;
wherein the first angle is different than the second angle;
wherein the stop member is configured to slide along a length of the guide member when the stop member is in the free position;
wherein when the guide member is placed on an upper surface of the workpiece, the clamp member is configured to engage a first edge of the workpiece and the stop member is configured to tilt to the locked position and engage a second edge of the workpiece, which is opposite the first edge, thereby clamping the workpiece between the clamp member and the stop member;
a first blade offset member;
the first blade offset member operatively connected to the guide member;
the first blade offset member having a body that slides between an extended position and a retracted position;
wherein the first blade offset member has a stop feature;
wherein the stop feature is configured to set a distance that the first blade offset member is extended when moved to the extended position;
wherein the stop feature is configured to be repositionable to and secured in place in an infinite number of positions along the first blade offset member;
wherein while the stop feature is secured in place in a position along the first blade offset member, the first blade offset member is movable between the extended position and the retracted position;
wherein the stop feature is adjustable to adjust a distance that the first blade offset member is extended when in the extended position;
wherein when the stop feature has been adjusted so that the first blade offset member is calibrated with the cutting tool, the body of the first blade offset member identifies the location of the cut line of the cutting tool when the body of the first blade offset member is in the extended position;
wherein when the stop feature has been adjusted so that the first blade offset member is calibrated with the cutting tool, the body of the first blade offset member is out of the way of the blade of the cutting tool when the body of the first blade offset is in the retracted position;
wherein when the guide member is placed on the upper surface of the workpiece, the body of the first blade offset member is moved to the extended position thereby identifying the cut line of the cutting tool.

29. The system of claim 28, wherein when the guide member is clamped onto the workpiece, an edge of the guide member contacts and guides a baseplate of the cutting tool while performing a cutting operation.

30. The system of claim 28, wherein the clamp member includes at least one spring.

31. The system of claim 28, further comprising:
a second blade offset member;
the second blade offset member operatively connected to the guide member;
the second blade offset member having a body that slides between an extended position and a retracted position;
wherein when the body of the second blade offset is in the extended position, the body of the second blade offset member identifies the location of the cut line of the cutting tool;
wherein when the body of the second blade offset is in the retracted position, the body of the second blade offset member is out of the way of the blade of the cutting tool.

32. The system of claim 28, wherein the first angle at which the front surface of the stop member extends relative to the upper surface of the guide member is an acute angle and the second angle is greater than the first angle.

33. A straight edge guide system, comprising:
a guide member;
the guide member extending a length from a first end to a second end;
the guide member having an upper surface and a lower surface;
a first blade offset member;
a slide structure configured to operably connect the blade offset member to the guide member while permitting the blade offset member to slide relative to the slide structure between an extended position and a retracted position;
wherein the first blade offset member has a stop feature;
wherein the stop feature is configured to move with the first blade offset member and physically engage the guide member or a structure operably connected to the guide member to restrict the distance that the first blade offset member may be moved from the retracted position;
wherein the stop feature is repositionable along the first blade offset member to set a distance that the first blade offset member can be extended to when moved to the extended position.

34. The system of claim 33,
wherein the first blade offset member is an elongated member extending from a first end to a second end;
wherein the first blade offset member extends through the slide structure;
wherein the first end of the elongated member indicates position of a cut line when the blade offset member is moved to the extended position;
wherein the first end of the elongated member and the stop feature are positioned on opposite sides of the slide structure.

* * * * *